US012427683B2

(12) United States Patent
Liberatore

(10) Patent No.: US 12,427,683 B2
(45) **Date of Patent: *Sep. 30, 2025**

(54) DUAL SIDED RAZOR

(71) Applicant: Mack-Ray Inc., Bentonville, AR (US)

(72) Inventor: Raymond A. Liberatore, Bentonville, AR (US)

(73) Assignee: Mack-Ray Inc., Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,642

(22) Filed: Sep. 3, 2021

(65) Prior Publication Data

US 2021/0394383 A1 Dec. 23, 2021

Related U.S. Application Data

(63) Continuation of application No. 17/325,893, filed on May 20, 2021, now Pat. No. 11,642,805, which is a continuation of application No. 15/945,193, filed on Apr. 4, 2018, now Pat. No. 11,154,998, which is a continuation of application No. 15/662,864, filed on Jul. 28, 2017, now Pat. No. 10,406,706, which is a (Continued)

(51) Int. Cl.

| | |
|---|---|
| ***B26B 21/52*** | (2006.01) |
| ***B26B 21/22*** | (2006.01) |
| ***B26B 21/40*** | (2006.01) |
| ***B26B 21/44*** | (2006.01) |
| ***B26B 21/56*** | (2006.01) |

(52) U.S. Cl.

CPC .......... *B26B 21/521* (2013.01); *B26B 21/225* (2013.01); *B26B 21/4012* (2013.01); *B26B 21/4037* (2013.01); *B26B 21/443* (2013.01); *B26B 21/522* (2013.01); *B26B 21/565* (2013.01)

(58) Field of Classification Search

CPC . B26B 21/521; B26B 21/4037; B26B 21/225; B26B 21/4012; B26B 21/443; B26B 21/522; B26B 21/565

See application file for complete search history.

(56) References Cited

U.S. PATENT DOCUMENTS 1,441,016 A 1/1923 Matthews
1,890,334 A 12/1932 Muros (Continued)

FOREIGN PATENT DOCUMENTS

CN 1437524 A 8/2003
CN 101080308 A 11/2007

(Continued)

OTHER PUBLICATIONS

International Search Report with the Written Opinion issued for corresponding International Patent Application No. PCT/US2015/018872 mailed on Jun. 4, 2015.

(Continued)

*Primary Examiner* — Adam J Eiseman
*Assistant Examiner* — Fernando A Ayala
(74) *Attorney, Agent, or Firm* — Myers Wolin, LLC

(57) ABSTRACT

One embodiment of a dual sided razor comprises a handle and a cartridge attached to the handle, the cartridge further comprising a first shaving side and a second shaving side, the cartridge being switchable relative to the handle between the first and second shaving sides.

24 Claims, 60 Drawing Sheets

Related U.S. Application Data continuation-in-part of application No. 15/288,749, filed on Oct. 7, 2016, now Pat. No. 9,956,698, and a continuation of application No. PCT/US2016/015898, filed on Feb. 1, 2016, said application No. 15/288,749 is a continuation of application No. PCT/US2015/018872, filed on Mar. 5, 2015.

(60) Provisional application No. 62/249,578, filed on Nov. 2, 2015, provisional application No. 62/110,595, filed on Feb. 1, 2015, provisional application No. 61/948,203, filed on Mar. 5, 2014.

(56) References Cited

U.S. PATENT DOCUMENTS

| | | | | |
|---|---|---|---|---|
| 3,263,330 | A | 8/1966 | Ferrara | |
| 3,317,995 | A | 5/1967 | Bord | |
| 3,555,682 | A | 1/1971 | Laszlo | |
| 3,593,416 | A * | 7/1971 | Edson | B26B 21/14 30/67 |
| 3,685,150 | A * | 8/1972 | Risher | B26B 21/18 30/527 |
| 3,777,396 | A * | 12/1973 | Simonetti | B26B 21/22 30/47 |
| 4,258,471 | A | 3/1981 | Jacobson | |
| 4,475,286 | A | 10/1984 | Saito | |
| 4,926,553 | A | 5/1990 | Miskin et al. | |
| 5,133,131 | A * | 7/1992 | Hoffman | B26B 21/222 30/47 |
| 5,241,751 | A | 9/1993 | Goh | |
| 5,369,885 | A | 12/1994 | Ferraro | |
| 5,575,068 | A * | 11/1996 | Pedersen | B26B 21/222 30/47 |
| 5,784,790 | A | 7/1998 | Carson, III et al. | |
| 5,787,586 | A | 8/1998 | Apprille, Jr. et al. | |
| 5,813,293 | A | 9/1998 | Apprille, Jr. et al. | |
| 5,855,071 | A | 1/1999 | Apprille, Jr. et al. | |
| 5,918,369 | A | 7/1999 | Apprille, Jr. et al. | |
| 5,934,291 | A | 8/1999 | Andrews | |
| 5,956,851 | A | 9/1999 | Apprille, Jr. et al. | |
| 6,026,577 | A | 2/2000 | Ferraro | |
| 6,029,354 | A | 2/2000 | Apprille, Jr. et al. | |
| 6,141,875 | A | 11/2000 | Andrews | |
| 6,164,290 | A | 12/2000 | Andrews | |
| 6,311,400 | B1 | 11/2001 | Hawes et al. | |
| 6,317,990 | B1 | 11/2001 | Ferraro | |
| 6,493,950 | B1 | 12/2002 | Kludjian et al. | |
| 6,499,218 | B2 | 12/2002 | Rocha | |
| 6,502,312 | B2 * | 1/2003 | Beutel | B26B 19/063 30/216 |
| 7,086,160 | B2 | 8/2006 | Coffin et al. | |
| 7,168,173 | B2 * | 1/2007 | Worrick, III | B26B 21/4043 30/527 |
| 7,681,320 | B2 | 3/2010 | Szczepanowski et al. | |
| 7,690,122 | B2 | 4/2010 | Worrick, III et al. | |
| 7,721,451 | B2 | 5/2010 | Psimadas et al. | |
| 7,770,294 | B2 | 8/2010 | Bruno et al. | |
| 7,937,837 | B2 | 5/2011 | Psimadas et al. | |
| 8,745,876 | B2 * | 6/2014 | Hage | B26B 21/10 30/34.1 |
| 9,132,560 | B2 | 9/2015 | Shimizu et al. | |
| 9,259,846 | B1 * | 2/2016 | Robertson | B26B 21/4062 |
| 9,550,303 | B2 * | 1/2017 | Robertson | B26B 21/4062 |
| 2001/0003869 | A1 * | 6/2001 | Rocha | B26B 21/222 30/41 |
| 2004/0123467 | A1 | 7/2004 | Policappelli | |
| 2005/0034314 | A1 | 2/2005 | Cuisinier | |
| 2005/0223568 | A1 | 10/2005 | Walker et al. | |
| 2008/0216329 | A1 * | 9/2008 | Leventhal | B26B 21/24 30/526 |
| 2009/0013534 | A1 | 1/2009 | Mallaridas | |
| 2010/0043242 | A1 | 2/2010 | Stevens | |
| 2010/0170094 | A1 * | 7/2010 | Hayashi | B26B 21/222 30/50 |
| 2016/0121498 | A1 | 5/2016 | Johnson | |

FOREIGN PATENT DOCUMENTS

| | | | |
|---|---|---|---|
| GB | 143536 | | 3/1921 |
| KR | 20130012529 | A | 2/2013 |
| RU | 63734 | U1 | 6/2007 |
| RU | 108335 | U1 | 9/2011 |
| WO | 99/04938 | A1 | 2/1999 |
| WO | 2012/028413 | A1 | 3/2012 |
| WO | 2012/172381 | A1 | 12/2012 |

OTHER PUBLICATIONS

International Search Report with the Written Opinion issued for corresponding International Patent Application No. PCT/US2016/015898 mailed on May 26, 2016.

Notice of First Office Action for corresponding Chinese Patent Application No. 2015800221562 dispatched on Dec. 1, 2017 with a partially summarized English translation.

Non-Final Office Action issued by the United States Patent and Trademark Office for corresponding U.S. Appl. No. 15/945,193, electronically delivered on Oct. 4, 2019.

Final Office Action issued by the United States Patent and Trademark Office for corresponding U.S. Appl. No. 15/945,193, electronically delivered on Apr. 20, 2020.

Notice of Allowance issued by the United States Patent and Trademark Office for corresponding U.S. Appl. No. 15/945,193, electronically delivered on Jun. 30, 2021.

Non-Final Office Action issued by the United States Patent and Trademark Office for corresponding U.S. Appl. No. 29/577,229, electronically delivered on Jul. 30, 2018.

Notice of Allowance issued by the United States Patent and Trademark Office for corresponding U.S. Appl. No. 29/577,229, electronically delivered on Jan. 8, 2019.

Non-Final Office Action issued by the United States Patent and Trademark Office for corresponding U.S. Appl. No. 15/662,854, electronically delivered on May 9, 2018.

Final Office Action issued by the United States Patent and Trademark Office for corresponding U.S. Appl. No. 15/662,854, electronically delivered on Sep. 11, 2018.

Non-Final Office Action issued by the United States Patent and Trademark Office for corresponding U.S. Appl. No. 15/662,854, electronically delivered on Dec. 27, 2018.

Final Office Action issued by the United States Patent and Trademark Office for corresponding U.S. Appl. No. 15/662,854, electronically delivered on Mar. 14, 2019.

Notice of Allowance issued by the United States Patent and Trademark Office for corresponding U.S. Appl. No. 15/662,854, electronically delivered on May 31, 2019.

Non-Final Office Action issued by the United States Patent and Trademark Office for corresponding U.S. Appl. No. 15/662,864, electronically delivered on Sep. 24, 2018.

Final Office Action issued by the United States Patent and Trademark Office for corresponding U.S. Appl. No. 15/662,864, electronically delivered on Feb. 26, 2019.

Notice of Allowance issued by the United States Patent and Trademark Office for corresponding U.S. Appl. No. 15/662,864, electronically delivered on Jun. 7, 2019.

Notice of Allowance issued by the United States Patent and Trademark Office for corresponding U.S. Appl. No. 29/686,834, electronically delivered on Jan. 8, 2020.

Non-Final Office Action issued by the United States Patent and Trademark Office for corresponding U.S. Appl. No. 29/577,229, electronically delivered on Feb. 16, 2018.

Non-Final Office Action issued by the United States Patent and Trademark Office for corresponding U.S. Appl. No. 15/945,193, electronically delivered on Oct. 6, 2020.

(56) References Cited

OTHER PUBLICATIONS

Non-Final Office Action issued by the United States Patent and Trademark Office for corresponding U.S. Appl. No. 15/288,749, electronically delivered on Apr. 5, 2017.
Final Office Action issued by the United States Patent and Trademark Office for corresponding U.S. Appl. No. 15/288,749, electronically delivered on Aug. 10, 2017.
Notice of Allowance issued by the United States Patent and Trademark Office for corresponding U.S. Appl. No. 15/288,749, electronically delivered on Jan. 25, 2018.
Notice of Allowance issued by the United States Patent and Trademark Office for corresponding U.S. Appl. No. 15/288,749, electronically delivered on Mar. 21, 2018.

* cited by examiner

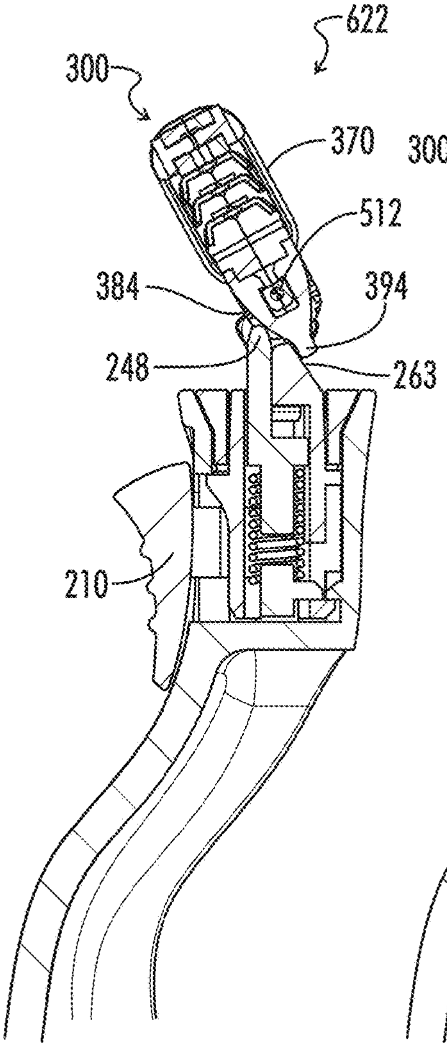
FIG. 29B
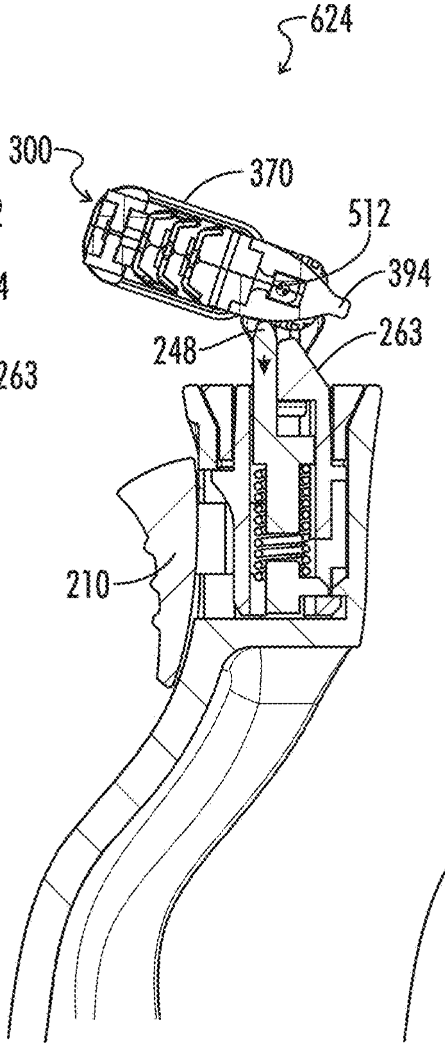
FIG. 29C
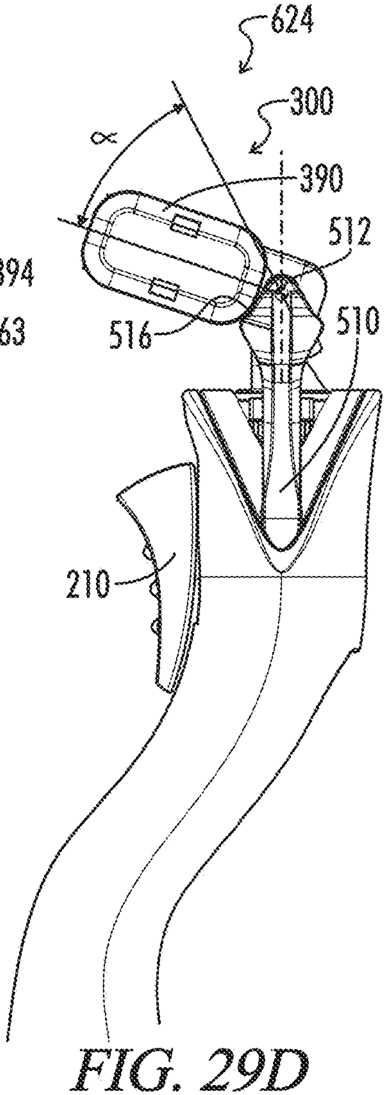
FIG. 29D
FIG. 29E
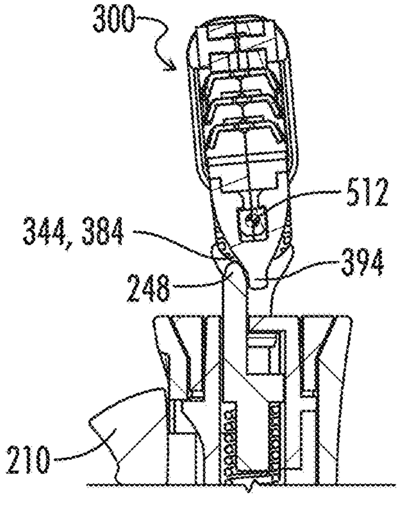

DUAL SIDED RAZOR

CROSS-REFERENCE TO RELATED APPLICATIONS

This application is a continuation of U.S. patent application Ser. No. 17/325,893, filed May 20, 2021, which is a continuation of U.S. patent application Ser. No. 15/945,193, filed Apr. 4, 2018, which is a continuation of U.S. patent application Ser. No. 15/662,864, filed Jul. 28, 2017, which is a continuation of international Application No. PCT/US2016/015898, filed on Feb. 1, 2016, which claims the benefit of U.S. Provisional Patent Application No. 62/110,595, filed Feb. 1, 2015 and U.S. Provisional Patent Application No. 62/249,578, filed Nov. 2, 2015, the contents of each of which are incorporated by reference herein in their entirety. U.S. patent application Ser. No. 15/662,864 is also a continuation in part of U.S. patent application Ser. No. 15/288,749, filed on Oct. 7, 2016 which is a continuation of International Application No. PCT/US2015/18872, Filed on Mar. 5, 2015, which claims the benefit of U.S. Provisional Patent Application No. 61/948,203, filed Mar. 5, 2014, the contents of each of which are hereby incorporated by reference in their entirety.

FIELD OF THE INVENTION

The present invention relates generally to shaving systems, and more particularly to a replaceable, double-sided blade unit for a shaving system.

BACKGROUND

Typical shaving razors usually have from one to five blades on only one side of a razor head or cartridge, and when the blades get dull, the razor or cartridge is thrown away. A typical consumer usually buys either disposable razors or replacement cartridge type razors. Disposable razors tend to be less expensive, while the replacement cartridge type razors tend to cost significantly more. One problem is that while consumers pay high prices for razors with cartridges, and even higher prices for the replacement cartridges, the amount of shaving achieved with a replacement cartridge is not that much greater than with a disposable razor. Further, conventional disposable razors and replacement cartridges use only one side of the exposed blade or blades, resulting in each razor or cartridge having a limited life span.

SUMMARY

A dual sided razor allows consumers to have a longer shave by having a razor system or cartridge that allows the consumer to use both sides of the cartridge, and thus saving consumers money since they don't have to buy as many razor replacement cartridges during the year and is therefore green friendly and better for the environment. The razor system of the present disclosure gives consumers another choice in shaving by offering consumers a double shave, preserving quality, and saving consumers money. Embodiments of the present disclosure allow consumers to save money and protect the environment by providing possibly twice the shave as normal razors and cartridges. This way, consumers can spend less money a year on razors and save the environment by sending fewer cartridges to landfills.

In one embodiment, there are from one to five (or more) blades in a dual sided razor cartridge, each blade having a sharp edge for shaving on each side of the blade. This way, the consumer can use one side of the razor or razor cartridge until it is dull, and then use the other side of the razor or razor cartridge, thereby shaving twice as long. One embodiment of the razor system of the present disclosure uses both sides of a razor blade instead of wasting the other side of the razor blade that is not used for shaving or is not designed for shaving. In one embodiment, a user would disconnect the double-sided razor cartridge from the handle, flip or turn the cartridge over or around, and then re-attach the cartridge to the handle so that the other side of the cartridge is exposed for shaving. The user would then use the second side of the razor cartridge until it's dull and then apply a new dual sided cartridge to the razor handle, thereby giving consumers double the shave utilizing by using both sides of the razor blades or both sides of the cartridge. In another embodiment, a user would switch between first and second sides of the cartridge without removing the cartridge from the handle. There are many ways of connecting or disconnecting the razor cartridge from the handle, and there are many ways of using the first and second sides of the razor cartridge and flipping between the first and second sides. While certain embodiments are described herein, it will be appreciated that other embodiments are contemplated.

In one embodiment, a user could purchase a razor system that comes with the dual sided cartridges already attached. Or, the user could buy replacement cartridges and replace the existing dual sided razor cartridges.

Embodiments of the dual sided razor designed as a dual sided disposable razor can have all the specifications of a replaceable cartridge and elements described herein. The dual sided disposable razor can be any shape, design, size and be made of any material or combination of materials known now or developed in the future. Further, the location or placement of the various parts and elements of the described razors, razor systems, and razor cartridges may vary and may be interchangeable or rearranged as desired. One non-limiting difference between a dual sided disposable razor and a dual sided non-disposable razor is that the disposable razor blades and cartridges might be made of less expensive materials and designed to be used only a limited number of times and thrown away. Alternatively, the cartridges may be made of plastic, rubber, metal, or other materials or combinations of materials. In one embodiment, certain materials may be used to ease gripping of the cartridge under wet conditions, for example. Further various surfaces may include textures or other gripping surfaces to ease gripping of the cartridge.

Embodiments of the cartridge, along with other components, may be assembled by, for example, snap fitting, heat welding, ultrasonically welding, screwing, press fitting, or any other type of assembly method or combinations of assembly methods now known or developed in the future.

Embodiments of a disposable razor cartridge may be designed to fit only certain razors or razor systems or certain handles and may not be compatible with certain other structures. In accordance with certain embodiments, cartridges may be designed for engagement with certain handles such as, for example, razor systems with handles designed to be disposable may only be used with certain cartridges designed to be disposable, while certain embodiments razor systems with handles designed to be non-disposable may only be used with certain non-disposable cartridges designed to be engaged with such non-disposable handles. Other embodiments, structures and engagements are contemplated.

BRIEF DESCRIPTION OF THE DRAWINGS

FIGS. 29B-29C is a cross section of the embodiment of FIG. 29A with the cartridge in two different orientations.

FIG. 29D is the embodiment of FIG. 29A with the cartridge in a fully rotated orientation.

FIG. 29E is an alternate embodiment of a portion of a razor assembly of the present disclosure.

DETAILED DESCRIPTION OF THE PREFERRED EMBODIMENTS

Figure 1:
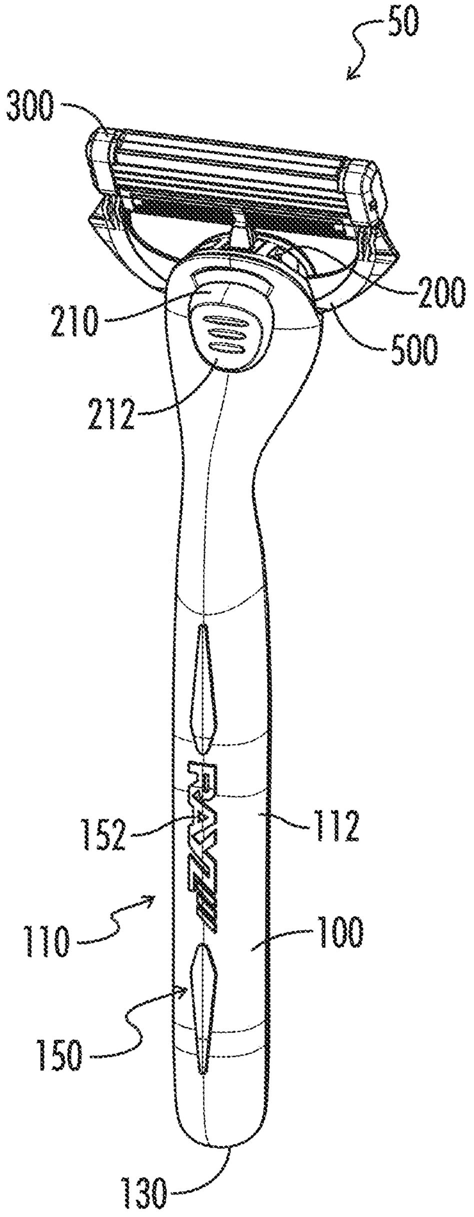
FIG. 1 is a front perspective view.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
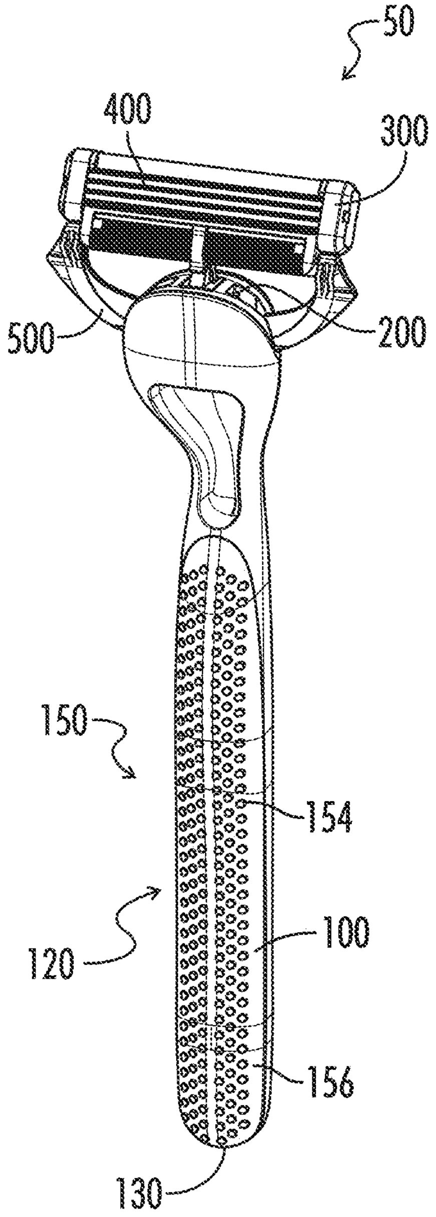
FIG. 2 is a rear perspective view.
Figure 3:
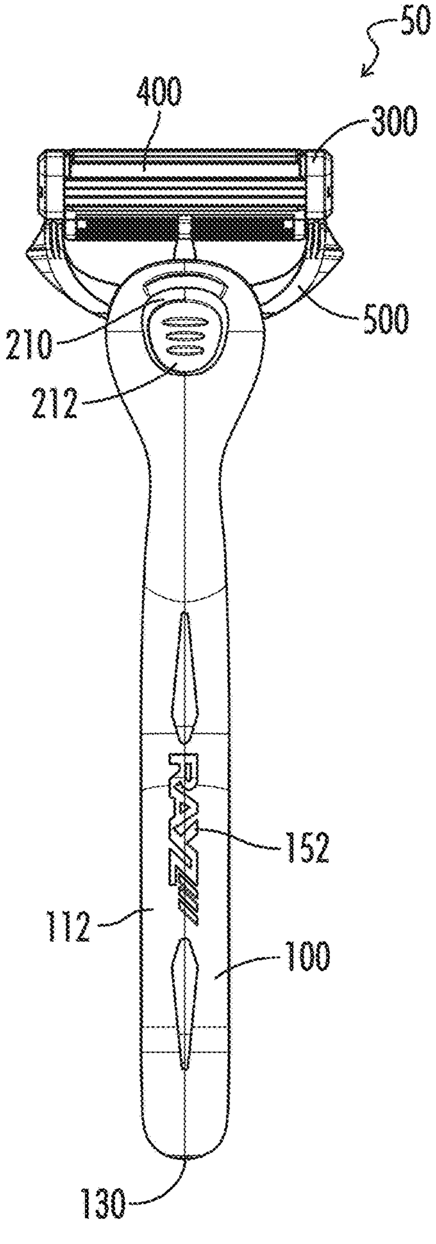
FIG. 3 is a front view.
Figure 4:
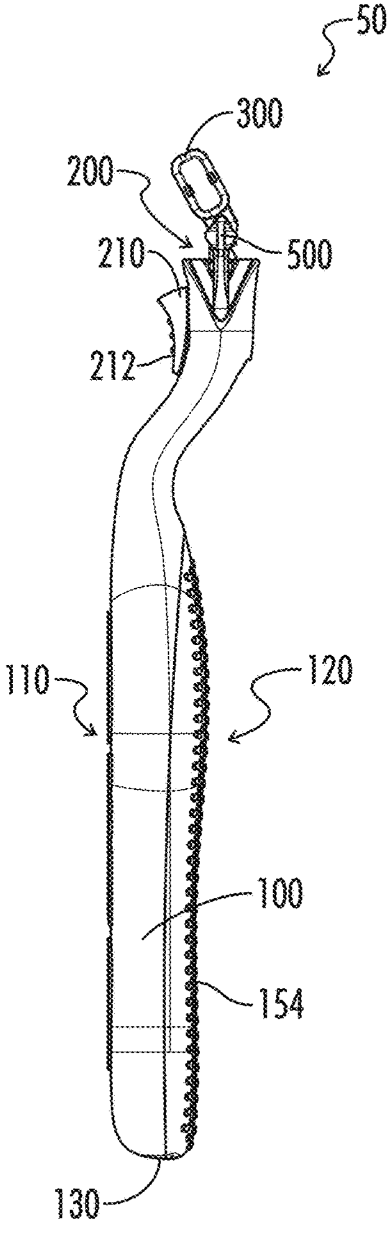
FIG. 4 is a side view and FIG. 5 is a rear view of one embodiment of a razor of the present disclosure.
Figure 5:
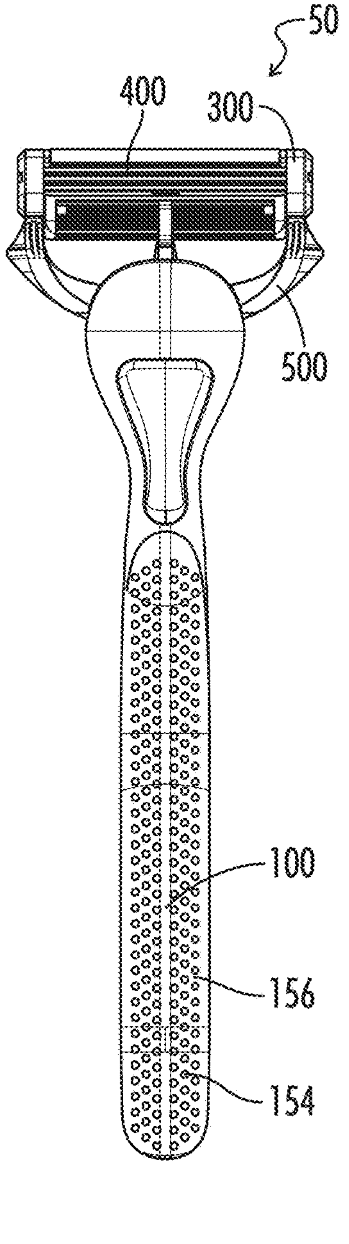
Figure 6:
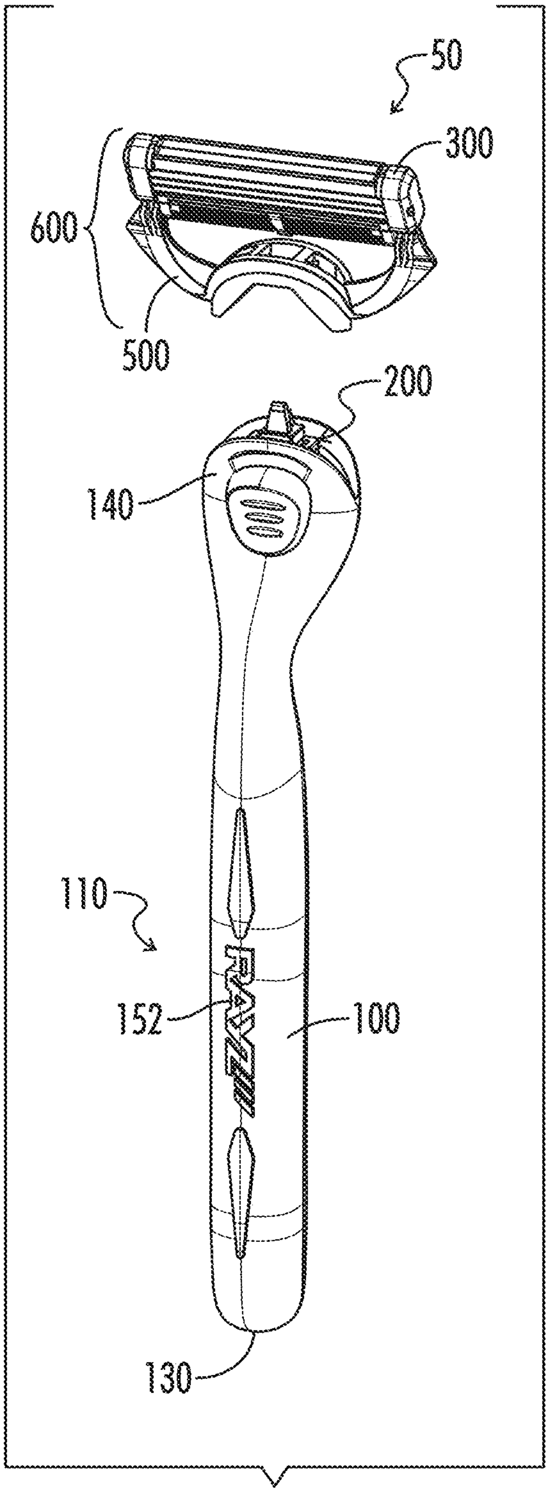
FIG. 6 is one embodiment of a partially exploded view of the razor of FIG. 1.
Figure 7:
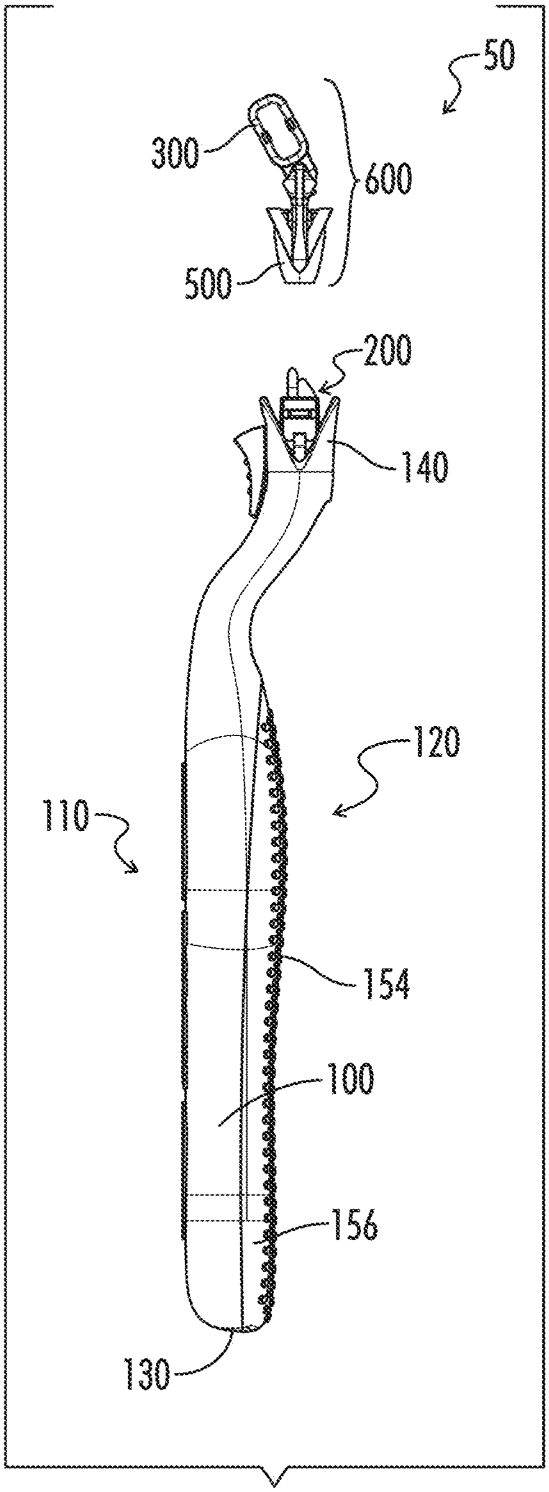
FIG. 7 is one embodiment of a partially exploded view of the razor of FIG. 4.

FIG. 1 is a front perspective view, FIG. 2 is a rear perspective view, FIG. 3 is a front view, FIG. 4 is a side view and FIG. 5 is a rear view of one embodiment of a razor 50 comprising one embodiment of a handle 100 and one embodiment of a cartridge 300 with blades 400 being attached to the handle 100 by one embodiment of a connector structure 200 within the handle 100 that interfaces with one embodiment of a swivel arm connection 500 that is preferably attached to the cartridge 300 to form an assembly 600 (FIGS. 6-7), the cartridge 300 preferably being removable from the handle 100 and configured to be disposable and replaceable. In an alternate embodiment where the entire razor including the handle and cartridge are designed to be disposable, the swivel arm connection 500 might be fixed to the handle instead of being removable therefrom, and the cartridge 300 might also be fixed to the handle 100 and not be removable therefrom, but where each side is able to be accessed for dual-sided shaving. For purposes of the following discussion, one embodiment of the razor 50 will be described as having a cartridge 300 that is removable from the handle 100 during normal use as described herein. In all embodiments, it is preferable that the handle 100 is ergonomically designed and comfortable to hold and use in dry and wet conditions. The various aspects of the razor components will be described in terms of certain constructions having certain shapes, dimensions, components, orientations, placement locations, configurations and the like, it being understood that the various embodiments described herein are meant to be interpreted in a non-limiting sense.

Figure 8A:
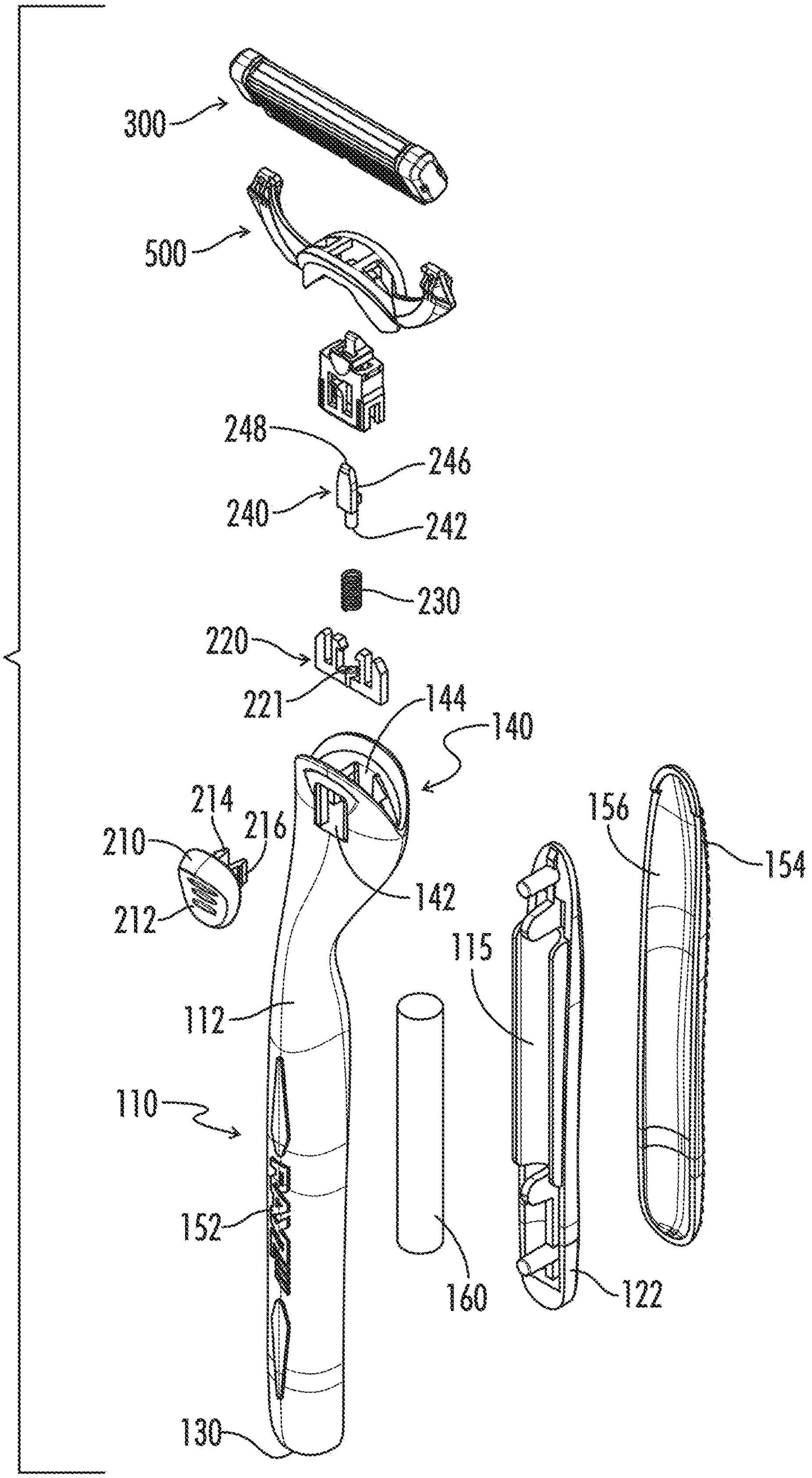
FIG. 8A is one embodiment of an exploded view of the razor of FIG. 1.
Figure 8B:
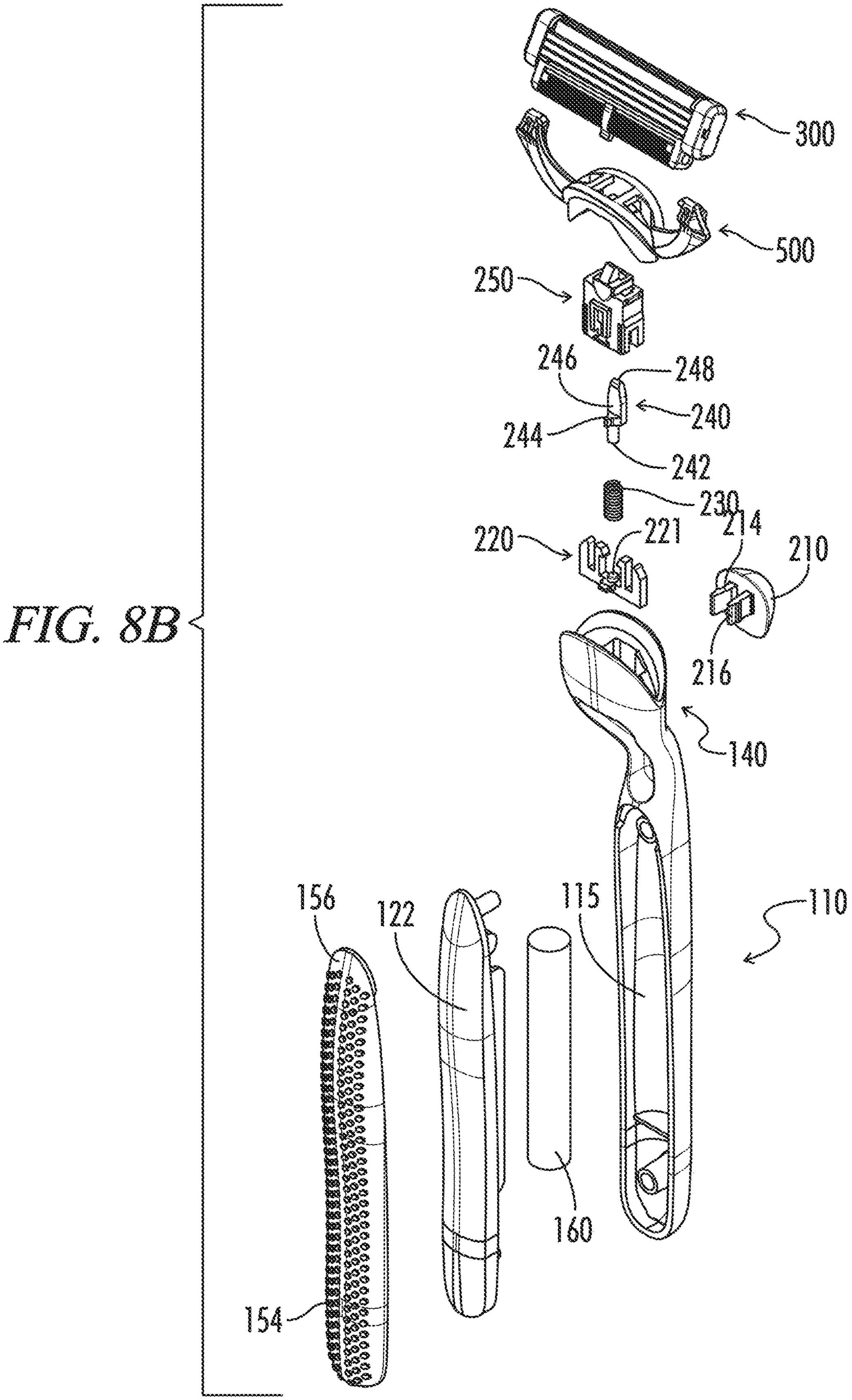
FIG. 8B is one embodiment of an exploded view of the razor of FIG. 2.

The handle 100 further comprises a first side 110 having an outer surface 112, a second side 120 opposite the first side 110 and having an outer surface 122 (FIG. 8A-8B), a free end 130 and an engagement end 140 opposite the free end 130 for engaging the handle 100 with the cartridge 300. Each side 110, 120 of the handle 100 is optionally provided with surface features 150, such as, but not limited to branding 152 (FIGS. 1, 3, 6), texture 154, decoration, color, shape, styling, and the like. While certain surface features 150 are shown in the present embodiment on the first side 110 or the second side 120, it will be appreciated that one or both sides 110, 120 may be provided with a variety of different surface features 150 of any shape, size, dimension, color, texture, depth, tactile feel, and such surface features may range in number from none (or an absence of surface features) to some to many. In the present embodiment, it is preferred that at least one side of the handle 100, or in this embodiment the second side 120, is provided with some type of texture 154 to enhance the grip feel and enhance the overall gripability of the handle 100 during use and in dry or wet conditions. The surface features 150 may be integrally formed into the sides 110, 120 of the handle 100, or as shown in the embodiment of FIGS. 8A-8B, the texture 154 may be formed separately as a texture pad 156 that is adhered to or molded onto the outer surface 122 of the second side 120. Thus, the surface features 150 may be integrally formed on the outer surfaces 112, 122, or attached or formed thereon, or a combination of integrally forming and attaching. Other combinations of surface features are possible.

As shown in the embodiment of FIGS. 8A-8B, the first side 110 and second side 120 are each preferably formed as a separate part of the handle 100 that are joined through traditional manufacturing methods, such as by sonic welding, adhesive, snap fit, press fit or a variety of other manufacturing methods now known or hereinafter developed. In this embodiment, there is defined an interior chamber 115 between the first side 110 and the second side 120 that is configured to retain one or more of a variety of different objects. In a first embodiment, the chamber 115 preferably retains a weight 160 that is designed to give a strong, secure feel to the handle 100 while shaving. In other embodiments, the chamber 115 may retain a weight 160 and/or shaving accessories such as gels, creams, shaving compositions, after shave compositions, lubricants, medicines, actives or the like, or combinations of the same. In other embodiments, the handle may contain a battery or some type of power source for energizing a vibrating feature or to provide power for a trimmer on one end of the razor (shown in FIG. 38) or for providing power to a different powered element or accessory now known or hereinafter developed. In a preferred embodiment, the razor 50 is not powered and the chamber 115 contains a weight 160 and is not accessible during normal use and the first side 110 is permanently joined to the second side 120 during the handle manufacture. In an alternate embodiment, the weight 160 is optional and the chamber 115 may be empty or may not exist, or the handle 100 may be solid as the case may be.

The handle 100 may be any size, shape, configuration, weight, etc., now known or hereinafter developed and is preferably formed to have an ergonomic design for ease of holding and using. FIGS. 42A-42E show one embodiment of a razor having one embodiment of a handle of a certain shape and dimensional configuration that includes a variety of different surface textures, gripping features, surface appearances and the like. In one embodiment, the handle may have the appearance of metal or be shiny to appeal more to a male user base. FIGS. 43A-43E show one embodiment of a razor having one embodiment of a handle of a certain shape and dimensional configuration that includes a variety of different surface textures, gripping features, surface appearances and the like. In one embodiment, the handle may be more rounded to appeal more to a female user base. Other shapes, configurations, surface constructions and the like and combinations of the same are contemplated. Further, any configuration of any cartridge embodiment described herein may be used with any handle and or cartridge-handle connection embodiment described herein.

Figure 9A:
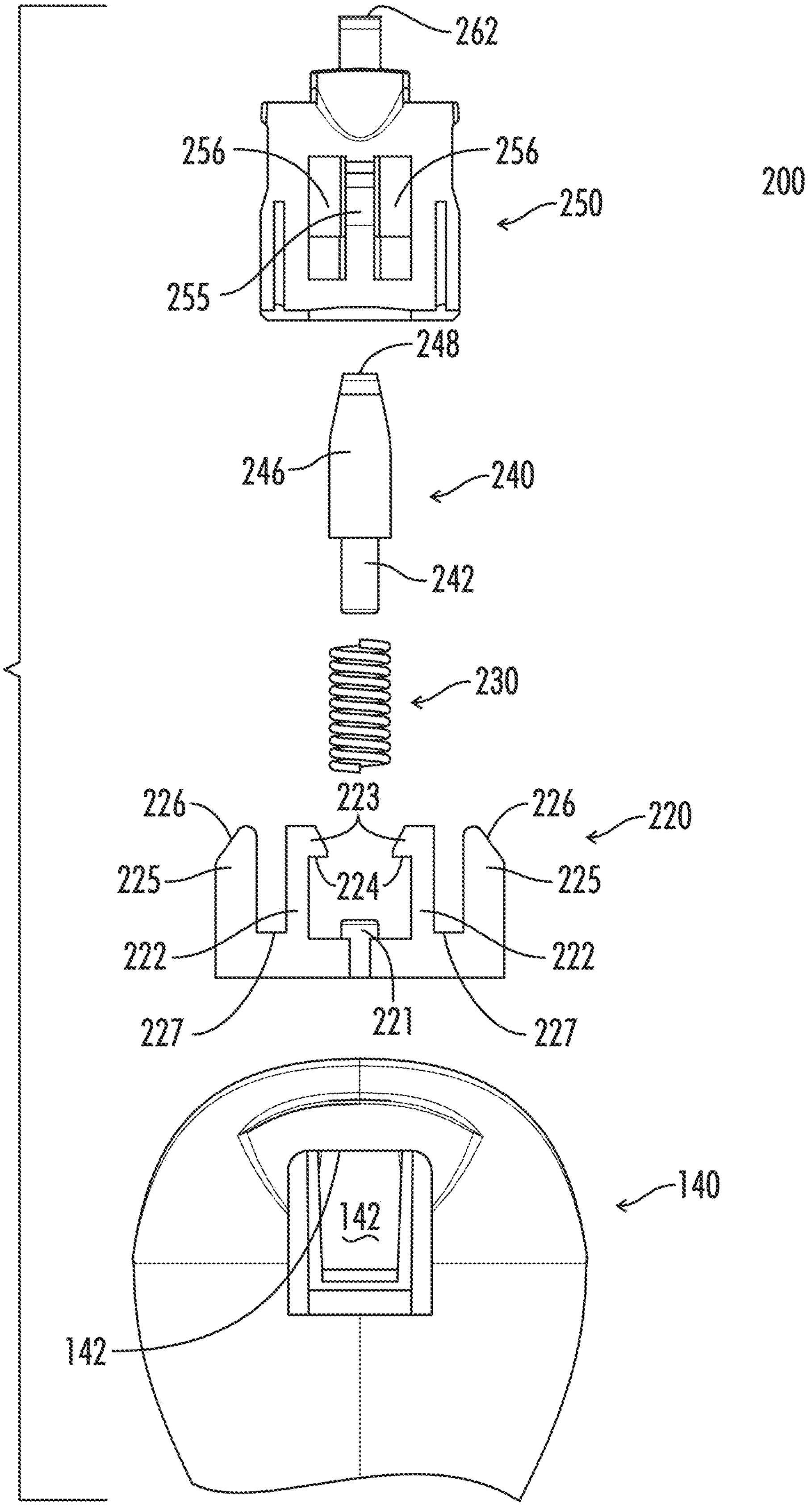
FIG. 9A is one embodiment of an exploded front view of a portion of a razor in accordance with the present disclosure.
Figure 9B:
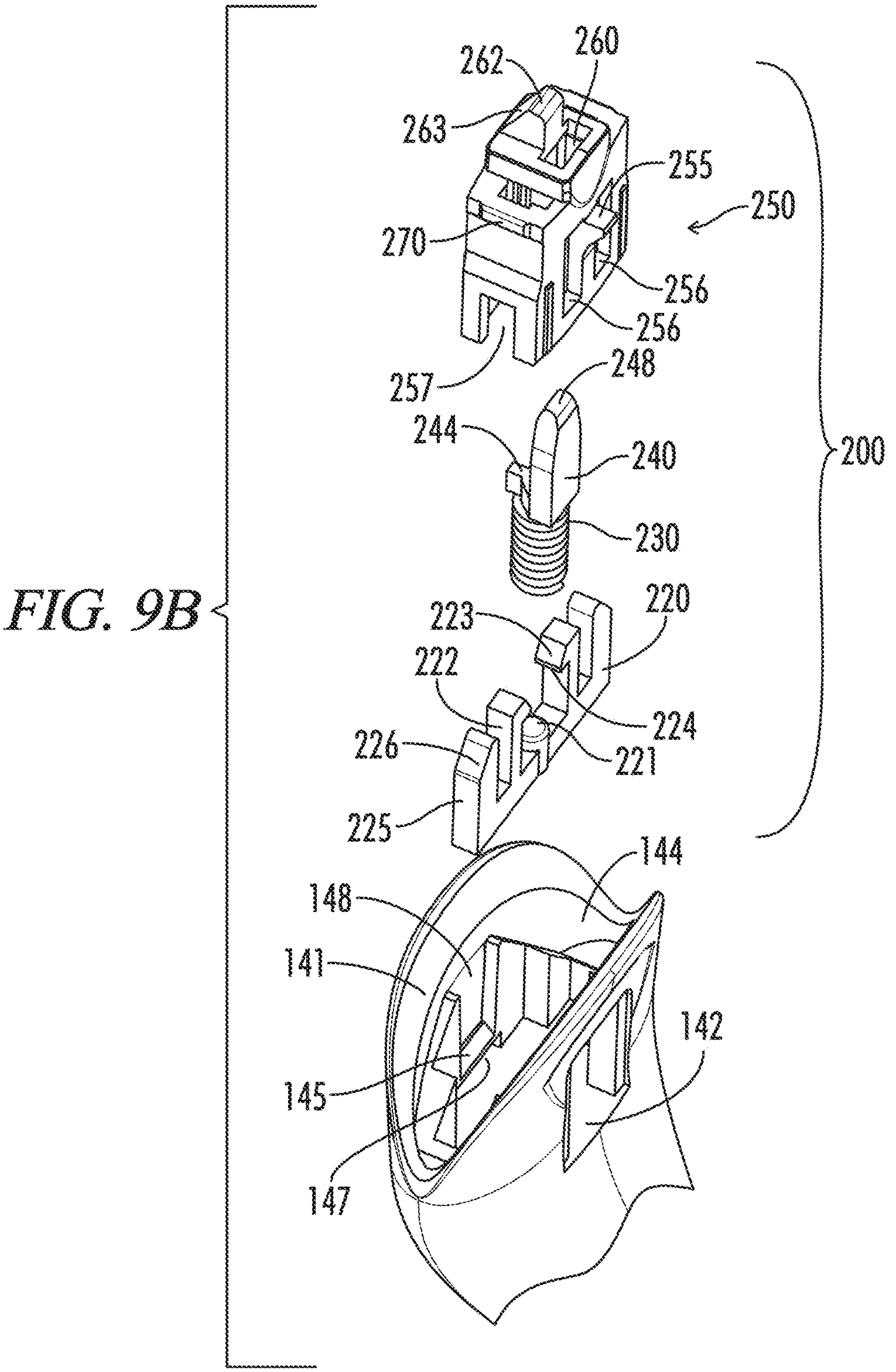
FIG. 9B is one embodiment of an exploded perspective view of a portion of a razor in accordance with the present disclosure.
Figure 10:
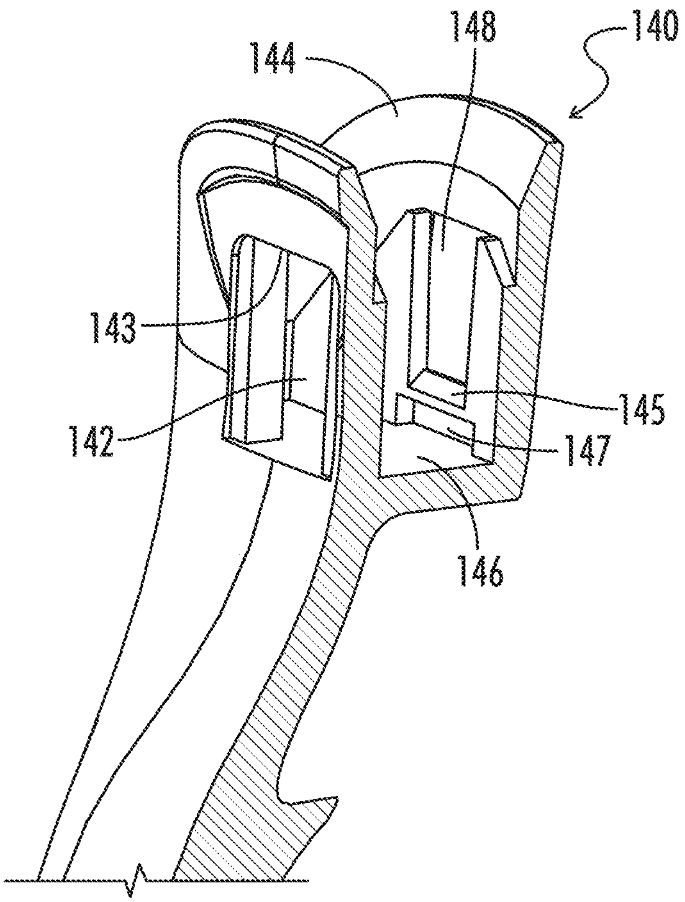
FIG. 10 is one embodiment of a portion of a razor handle in accordance with the present disclosure.
Figure 13:
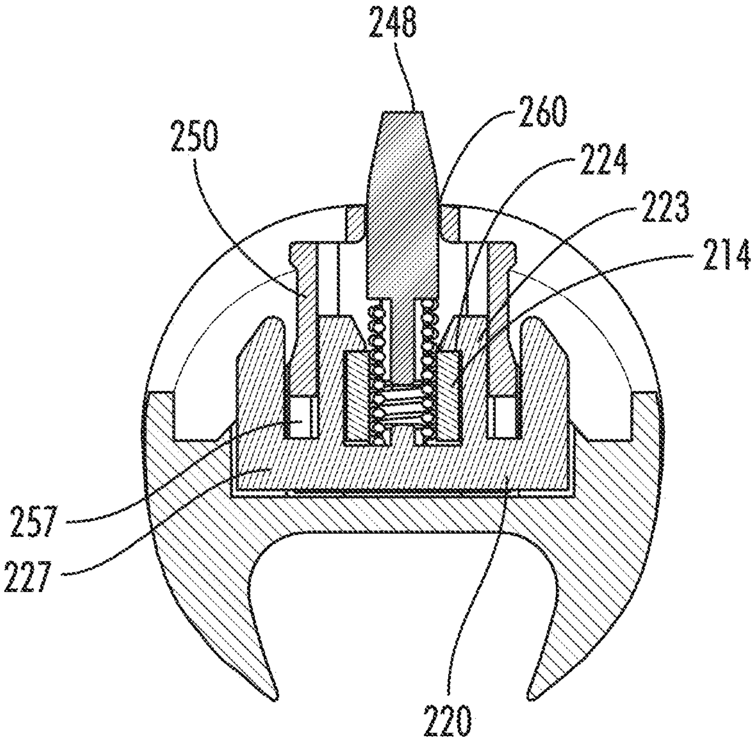
FIG. 13 is a section view of the fully assembled portion of a razor of FIG. 9A.
Figure 14B:
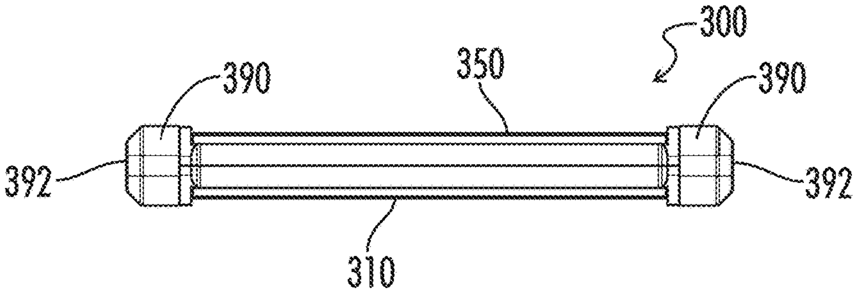
FIG. 14B is a top view.
Figure 14A:
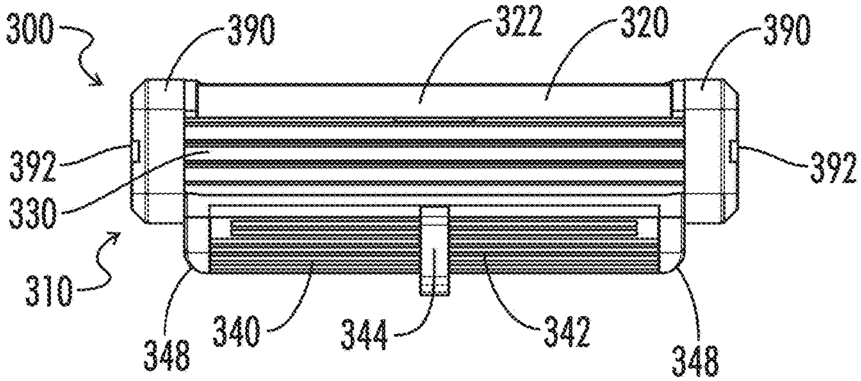
FIG. 14A is a front view.
Figure 14D:
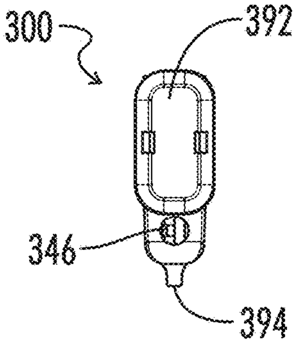
FIG. 14D is a side view.
Figure 14C:
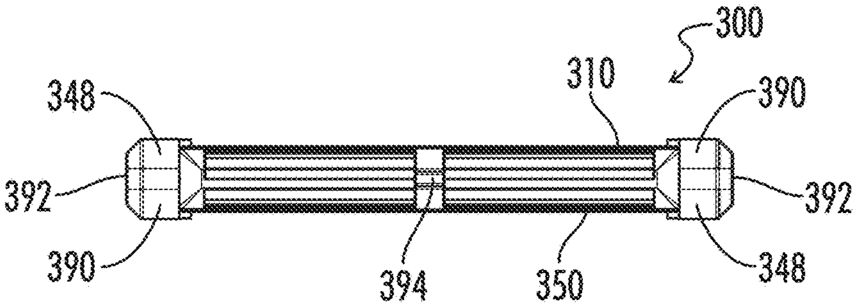
FIG. 14C is a bottom view.
Figure 14E:
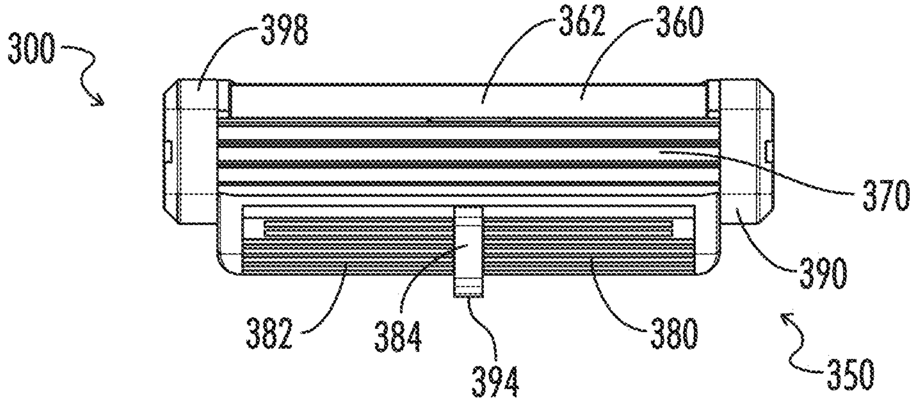
FIG. 14E is a rear view.
Figure 14F:
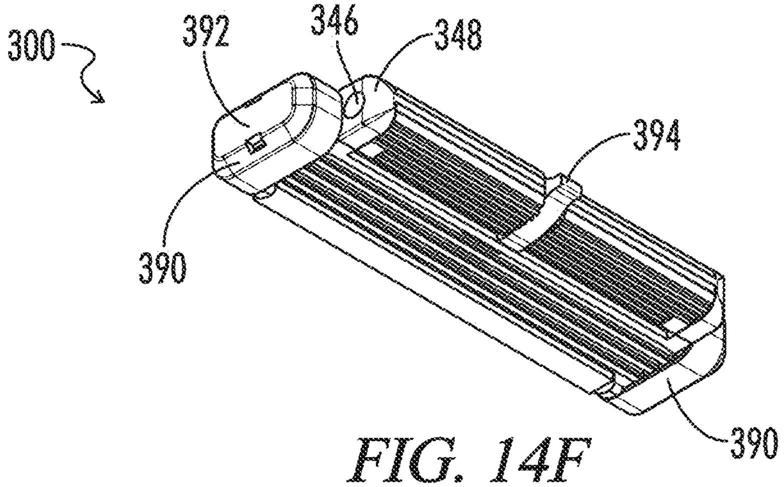
FIG. 14F is a front perspective view taken from the bottom.
Figure 14G:
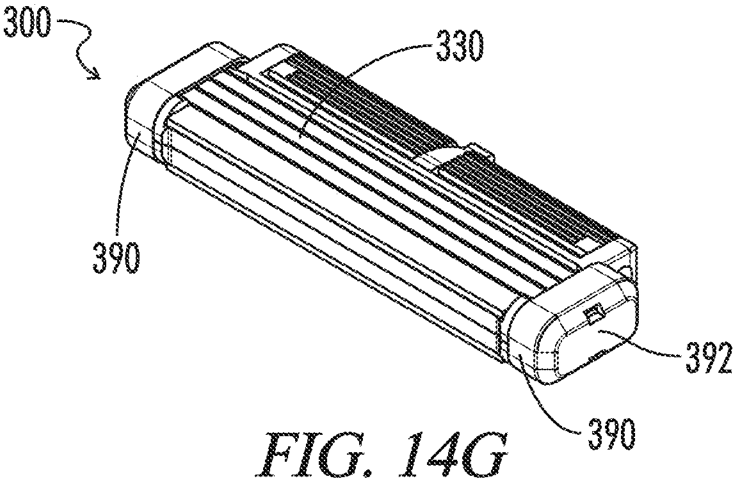
FIG. 14G is a rear perspective view taken from the top of one embodiment of a cartridge in accordance with the present disclosure.

The engagement end 140 of the handle 100 further comprises a connector structure 200 (see also FIGS. 9A-11A) including a button 210 (FIGS. 8A-8B) having a thumb-engaging surface 212 and a plurality of arms 214 with cam tips 216 that extend through a button opening 142 into a chamber 144 in the engagement end 140 (FIG. 10). The chamber 144 houses a button release slider 220 (FIGS. 9A-9B, 13) that is engaged by the button arms 214, the button release slider 220 having a spring seat 221 for receiving a spring 230, a plurality of inner arms 222 having catch tips 223 with an undersurface 224, a plurality of outer arms 225 having cam end surfaces 226, and bridges 227 defined between the inner arms 222 and outer arms 225. Seated within the spring 230 is a pushpin 240 having a spring insert 242 that extends into the spring 230, the pushpin 240 further comprising a ledge 244, and main body 246 and guide tip 248.

Figure 11A:
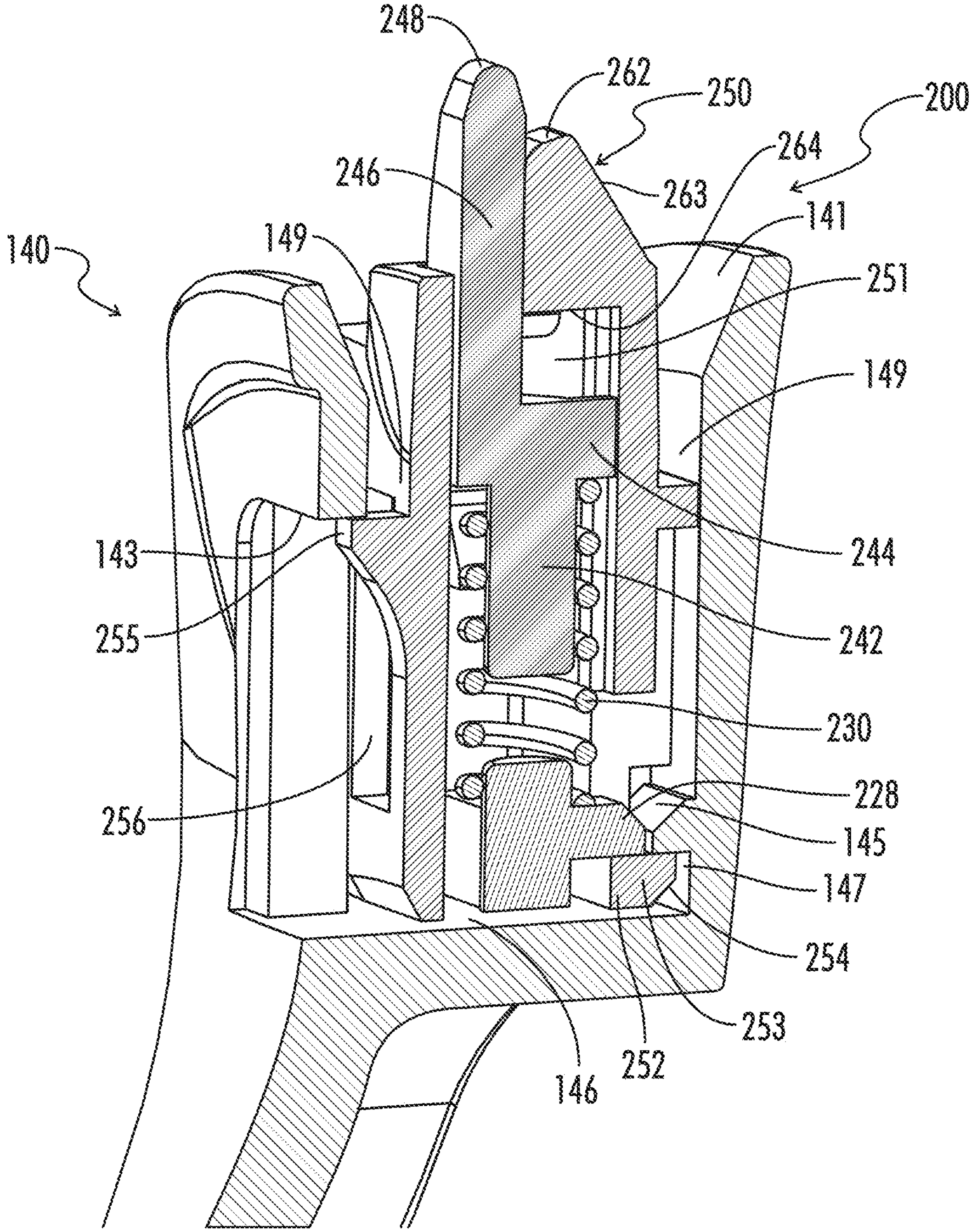
FIG. 11A is one embodiment of a cross-section of a perspective view of an assembly of the components illustrated in FIGS. 9A and 9B.
Figure 11B:
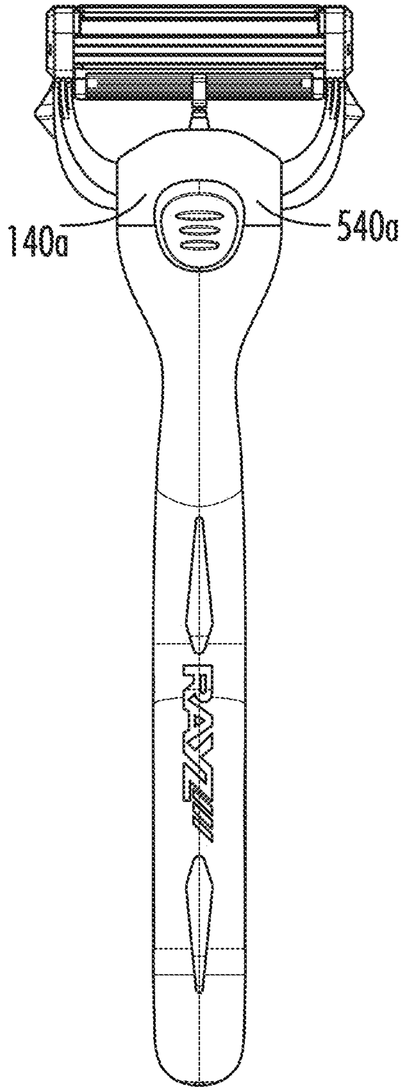
FIGS. 11B-11C illustrate an alternate embodiment of an assembly of components of the present disclosure.
Figure 11C:
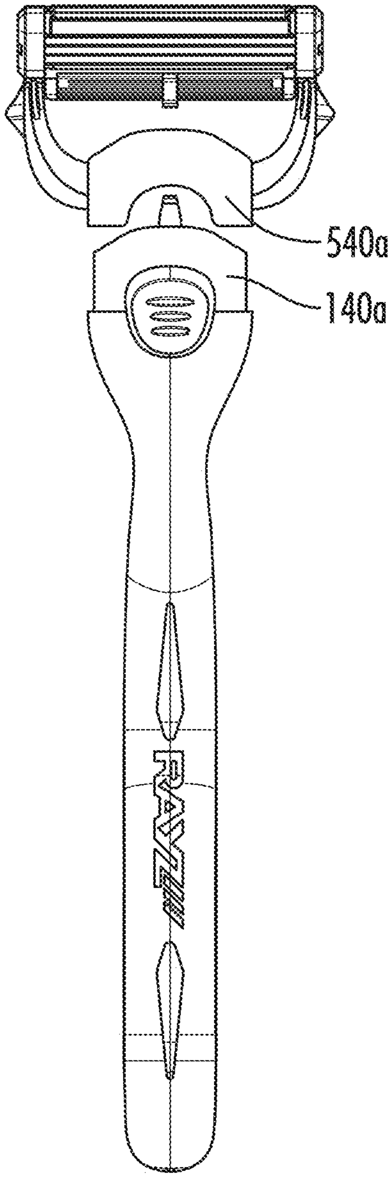

The pushpin 240 seated on the spring 230 and the button release slider 220 are encased within an interior 251 of a connection block 250 (FIGS. 12A-12E). The connection block 250 is secured within the chamber 144 by a first catch 252 having a ledge 253 with a cam surface 254 that engages a ramp 145 near the chamber floor 146 and the ledge 253 is then secured within a sub-chamber 147 under the ramp 145 adjacent the chamber floor 146 (FIGS. 10-11A). The connection block 250 is also secured to the button opening periphery 143 by a second catch 255 defined between a plurality of openings 256 that accommodate the button arms 214. More specifically, the button arms 214 extend through the openings 256 in the connection block 250, and are then compressed through the engagement of the cam tips 216 with the inner arms 222 of the button release slider 220, and then spring out into engagement of the cam tips 216 with the inner arms 222. The button arms 214 are further retained relative to the button release slider 220 by the undersurface 224 of the catch tips 223.

When a user (not shown) moves the button 210 upward within the button opening 142, the button arms 214 urge the button release slider 220 upward through the engagement of the button arms 214 with the undersurface 224 of the catch tips 223. The movement of the button release slider 220 relative to the connection block 250 is limited to the travel of the bridges 227 (FIG. 13) within side slots 257 in the connection block 250. The movement of the button release slider 220 is also guided by the travel of a spring seat extension 228 (FIG. 11A) within a rear slot 258 in the connection block 250, the rear slot being partially surrounded by a rear slot periphery 259 that is received within a guide slot 148 (FIG. 10) in the chamber 144 of the engagement end 140. The connection block 250 does not move relative to the engagement end 140 of the handle 100.

The guide tip 248 of the pushpin 240 extends through an upper opening 260 in the connection block 250 adjacent an upper extension 262 having an upper surface 263 (FIGS. 12A-12E) that is preferably sloped and an undersurface 264 (FIG. 11A) that functions as a stop for the travel of the pushpin ledge 244 of the pushpin 240 within the interior 251 of the connection block 250. The pushpin 240 does not move in response to the movement of the button 210, but instead moves relative to the connection block 250 in response to movement of the cartridge 300 as will be described below.

Figure 12A:
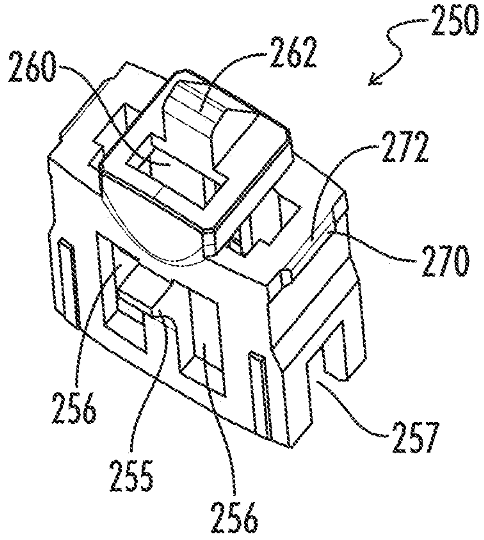
FIG. 12A is a front perspective view taken from the top.
Figure 12B:
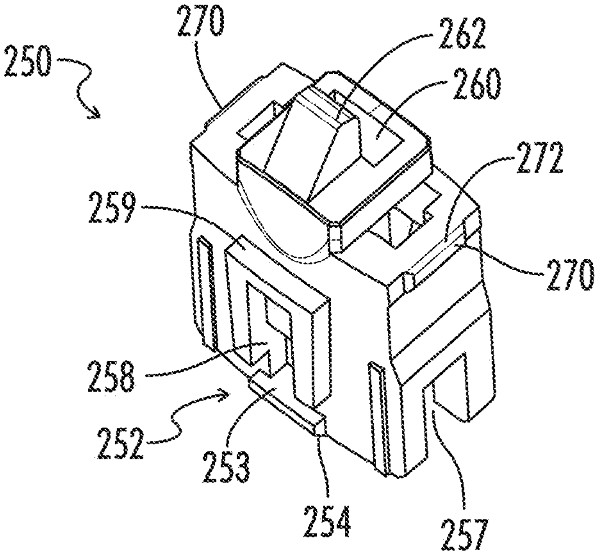
FIG. 12B is a rear perspective view taken from the top.
Figure 12C:
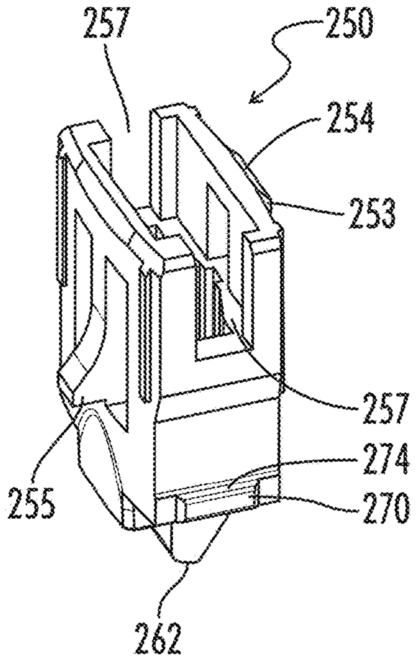
FIG. 12C is a front perspective view taken from the bottom.
Figure 12D:
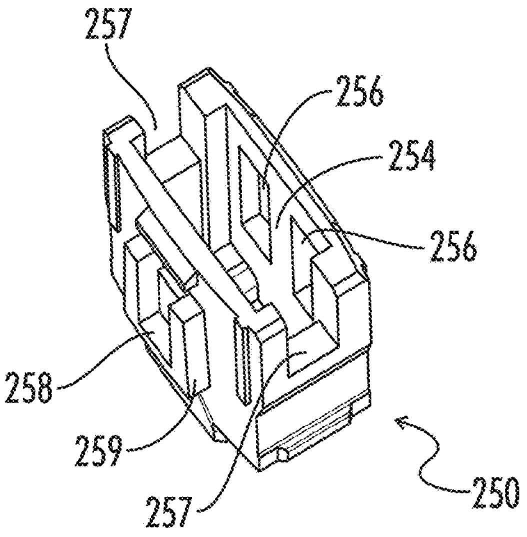
FIGS. 12D and 12E are a rear perspective views taken from the bottom of one embodiment of a portion of a connection block of a razor in accordance with the present disclosure.
Figure 12E:
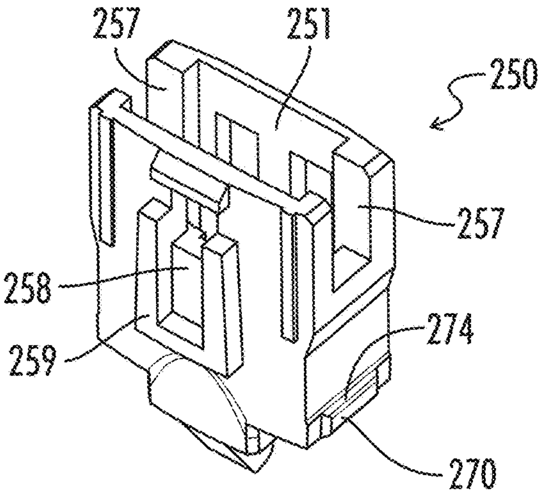
Figure 12F:
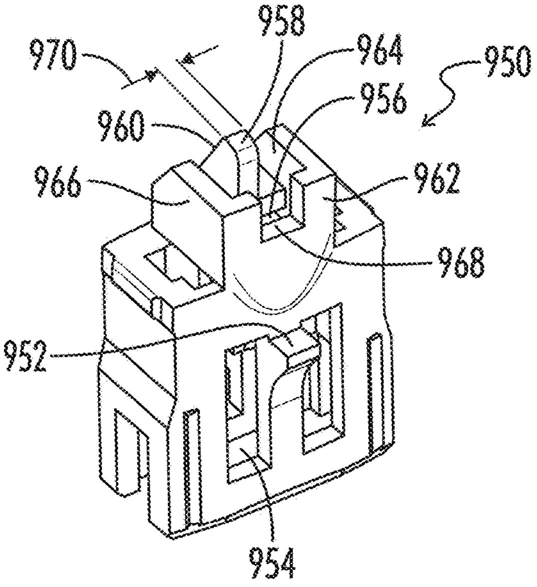
FIG. 12F is an alternate embodiment of a connection block of a razor in accordance with the present disclosure.
Figure 12G:
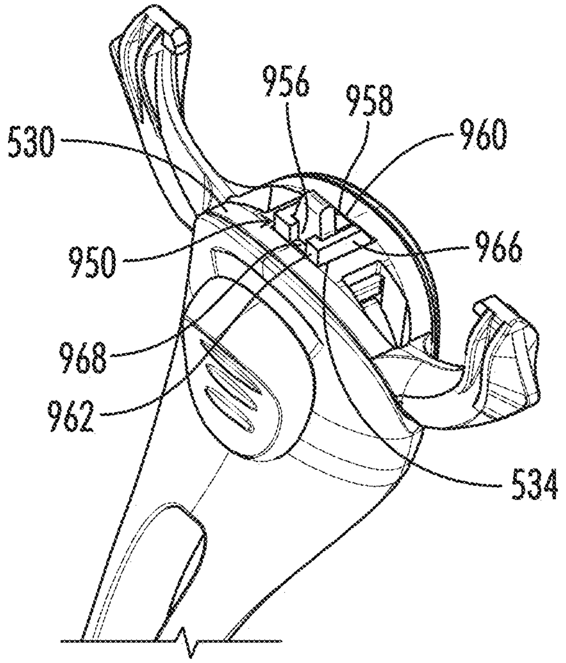
FIG. 12G shows a swivel arm connection fixed to the connection block of FIG. 12F in a front perspective view of a razor incorporating the connection block.

In some embodiments, an alternative connection block 950 is provided, as shown in FIGS. 12F and 12G. In such an embodiment, when assembled, the connection block 950 is secured within the chamber 144 in the same manner as that of connection block 250. As in connection block 250, the connection block 950 is secured to the button opening periphery 143 by a second catch 952 defined between a plurality of opening 954 that accommodate the button arms 214 in the connection block 950. The guide tip 258 of the pushpin 240 extends through an upper opening 956 in the connection block 950 adjacent an upper extension 958 with a sloped upper surface 960. As shown, the upper opening 956 is surrounded by sidewalls 962 which accommodate the pushpin 240.

The connection block 950 is designed to mate with the connection body 560. Accordingly, the upper opening 956 along with the inner surfaces 964 of the sidewalls 962 accommodate the pushpin 270 while the outer surfaces 966 of the sidewalls 962 accommodate a central opening 564 of the connection body 530. Such a construction may stabilize the connection body 530 about the sidewalls 962. The sidewalls 962 of the connection block 950 may incorporate a notch 968, and the notch may be wider than a width 970 of the upper extension 958.

The pushpin 240 can have one to any number of sides, shapes, and lengths. The pushpin can be designed to have areas on the upper most portion to stick outward toward the engagement area on the cartridge 300. This extra extended area of the pushpin can be any shape, size, or angle. This extra extended area will help keep pressure on the cartridge head 300 to push the cartridge head 300 forward. The extra extended area is an added feature because as the user uses the razor the pushpin has a lot of wear and tear and can wear the material on the top of the pushpin. The top pf the push pin can have an added part that is permanent or removable and strong to endure the wear and tear of the pushpin. Or it can be made of a plastic or any material that does not wear, such as steel.

As shown in FIGS. 14A-14G, the cartridge 300 generally comprises a first side 310 having a first side housing 312, a first upper pad area 320, a first shaving region 330, and a first lower pad area 340. The cartridge 300 also comprises a second side 350 having a second side housing 352, second upper pad area 360, a second shaving region 370, and a second lower pad area 380. While features of embodiments of the upper and lower pad areas will be described, it will be appreciated that such features may be positioned on any location on the cartridge 300, or that such features may be optional, varied in composition or effect, or interchangeable as desired, or that the upper and lower pad areas may be joined and may collectively surround the shaving blades to form a continuous pad area around the blades. Portions of the first and second sides 310, 350 are preferably held together by a plurality of end caps 390 that may be provided with gripping surfaces 392 for handling by a user (not shown). While the use of end caps 390 are preferred, embodiments are contemplated where the end caps are integrally manufactured into the structures of the first and second sides, or the end caps might be optional, or the cartridge is held together with metal bands or the like, or other manufacturing embodiments are possible. For example, the portions of the first and second side housings 312, 352 may, instead of being connected by end caps, be attached through a variety of methods, such as by snapping together, welding, heat welding, ultrasonic welding, adhesively connecting, press fitting, or any method now known or hereinafter developed. The first and second sides 310, 350 may each be independently positioned relative to the handle 100 so that a user may shave with the first side 310 of the cartridge 300, and then re-orient the cartridge 300 relative to the handle 100 so that the user may then shave with the second side 350 of the cartridge 300, and vice versa.

Figure 15:
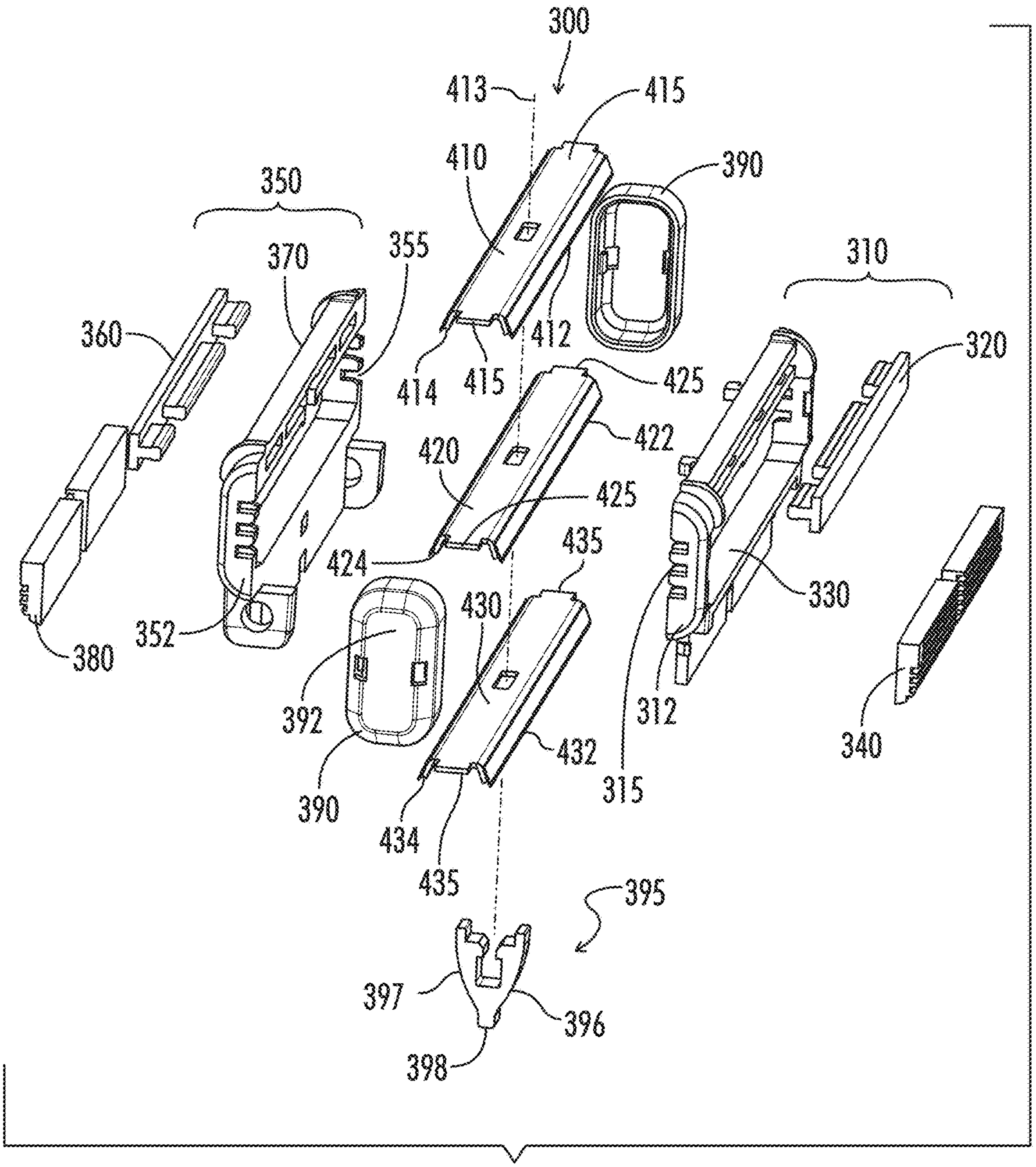
FIG. 15 is one embodiment of an exploded view of a razor cartridge in accordance with the present disclosure.
Figure 16A:
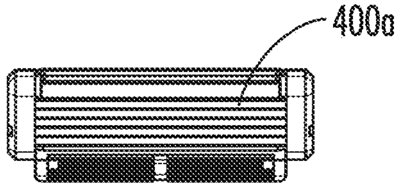
FIG. 16A is one embodiment of a front view of a razor cartridge in accordance with the present disclosure.
Figure 16B:
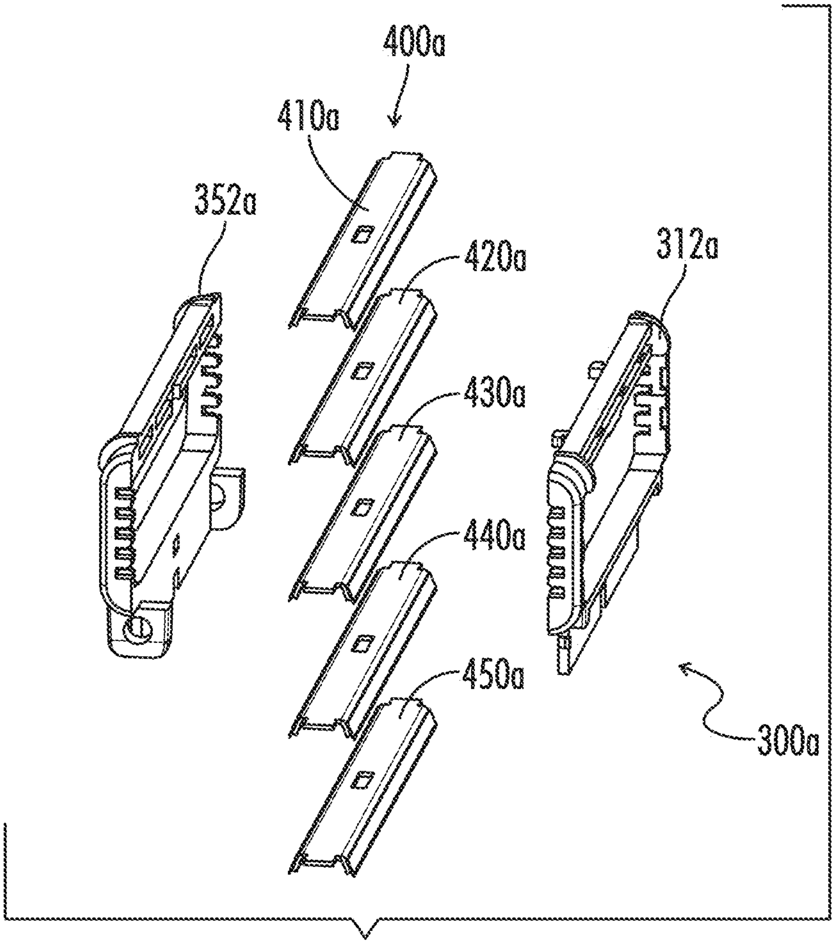
FIG. 16B is one embodiment of an exploded view of a razor cartridge in accordance with the present disclosure.

In the embodiment of FIG. 15, a plurality of blades 400, and more specifically three blades 410-430, extends between the first and second shaving regions 330, 370 respectively, such that first blade edges 412-432 of the blades 410-430 are exposed in the first shaving region 330, while second blade edges 414-434 of the blades 410-430 are exposed in the second shaving region 370. While three blades 410-430 are described in the present embodiment, it will be appreciated that any number of blades may be used as long as at there is at least one blade edge exposed in the first shaving region 330 and at least one blade edge exposed in the second shaving region 370. For example, FIGS. 16A-16B show an alternate embodiment of blades 400*a* in a cartridge 300*a* having five blades 410*a*-450*a* secured between housings 312*a*, 352*a*. Any number of blades may be used. It will be understood that in certain embodiments, blades pass through the entirety of the cartridge 300, and blades exposed on either face of the cartridge 300 are different ends of single blades.

Figure 39A:
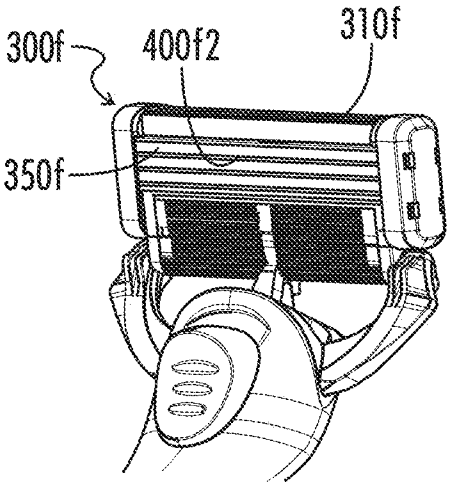
FIGS. 39A-39B illustrate one embodiment of a razor of the present disclosure.
Figure 39B:
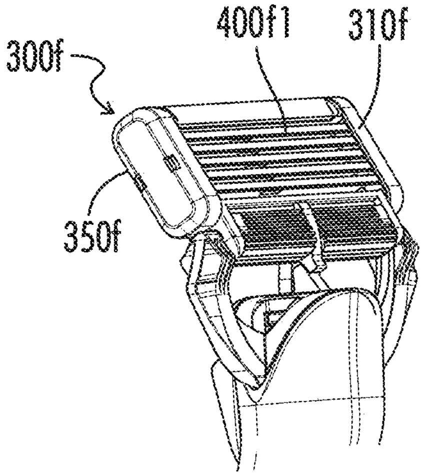
Figure 40A:
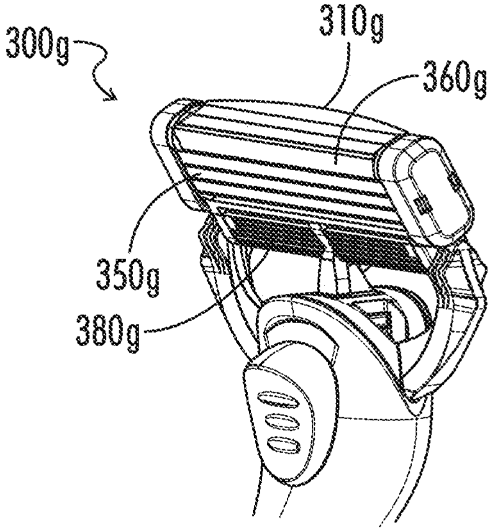
FIGS. 40A-40B illustrate one embodiment of a razor of the present disclosure.
Figure 40B:
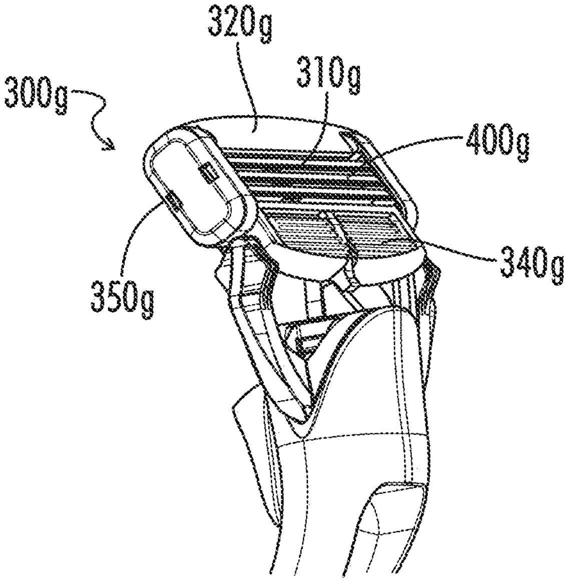
Figure 41A:
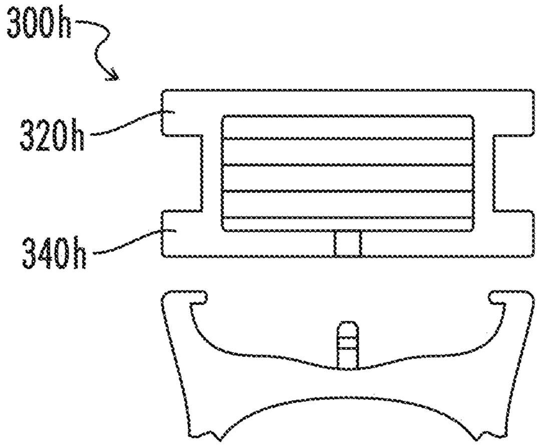
FIGS. 41A-41C illustrate one embodiment of a razor of the present disclosure.
Figure 41B:
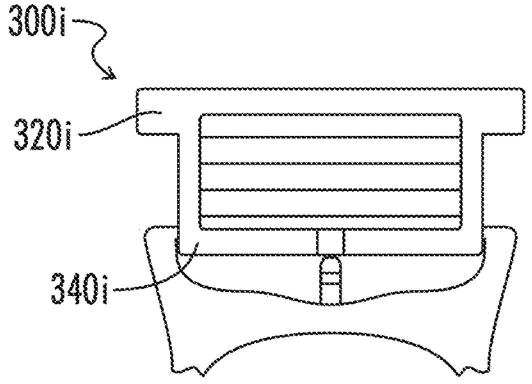
Figure 41C:
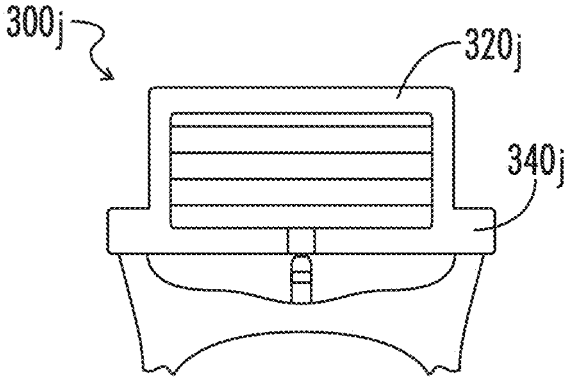
Figure 42A:
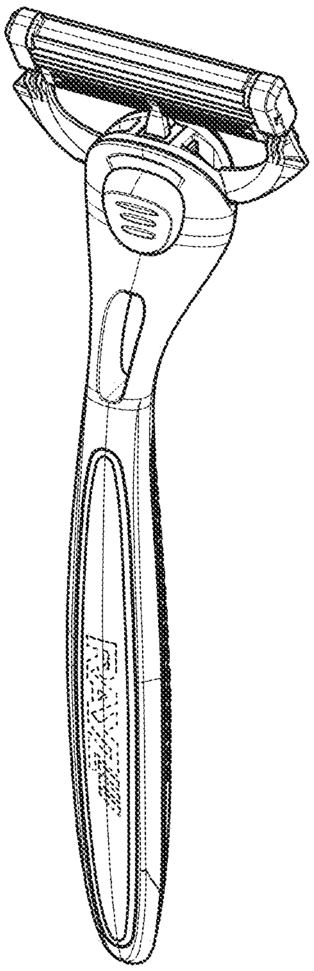
FIG. 42A is a front perspective view.
Figure 42B:
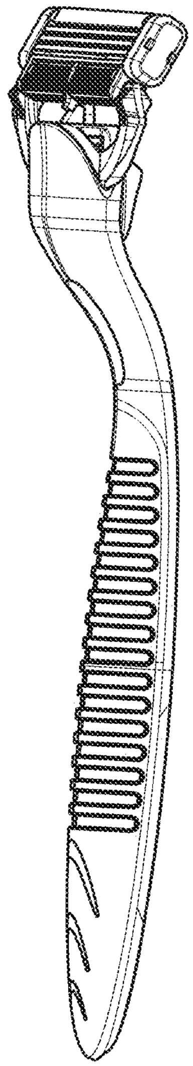
FIG. 42B is a rear perspective view.
Figure 42C:
FIG. 42C is a top view.
Figure 42D:
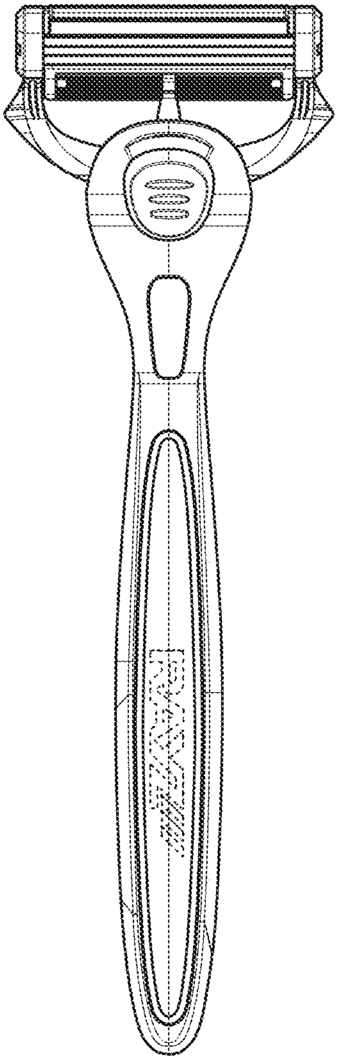
FIG. 42D is a front elevation view.
Figure 42F:
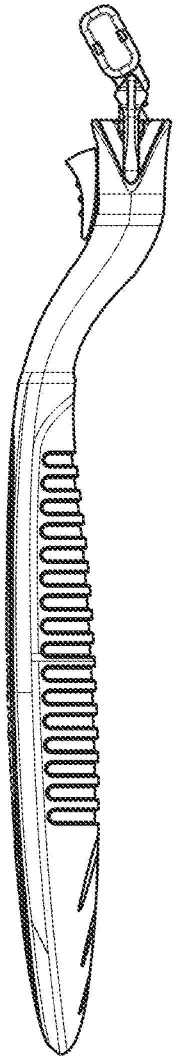
FIG. 42F is a side view.
Figure 42G:
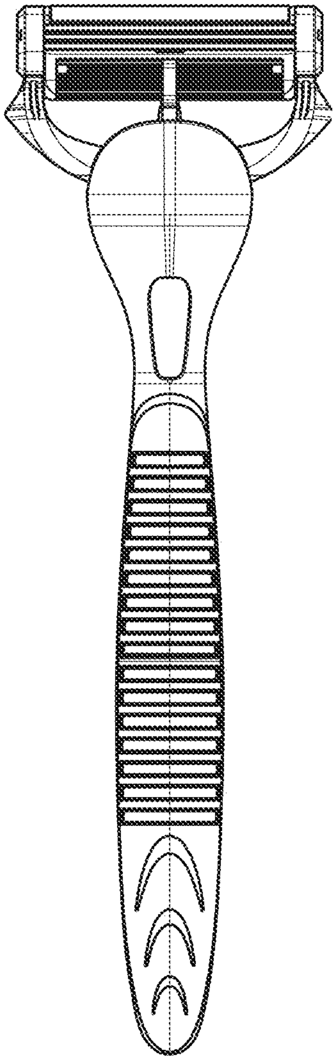
FIG. 42G is a rear elevation view of one embodiment of a razor of the present disclosure.
Figure 42E:
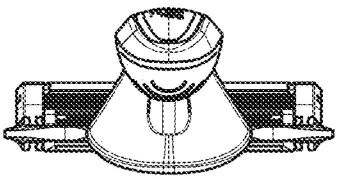
FIG. 42E is a bottom view.
Figure 43A:
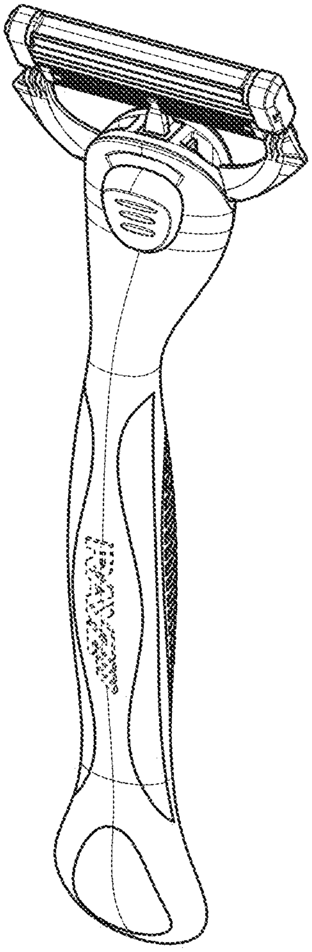
FIG. 43A is a front perspective view.
Figure 43B:
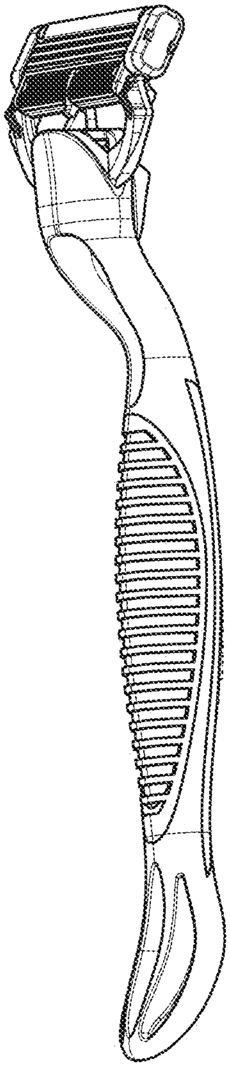
FIG. 43B is a rear perspective view.
Figure 43C:
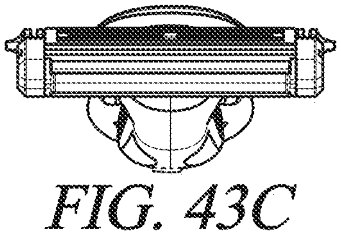
FIG. 43C is a top view.
Figure 43D:
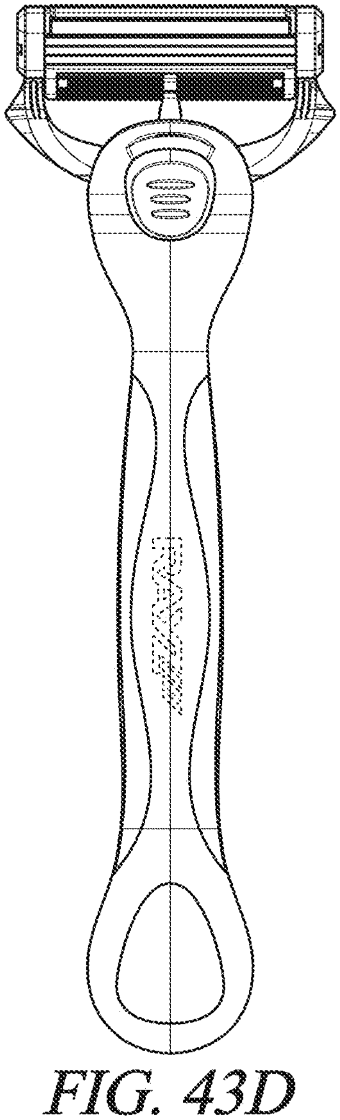
FIG. 43D is a front elevation view.
Figure 43F:
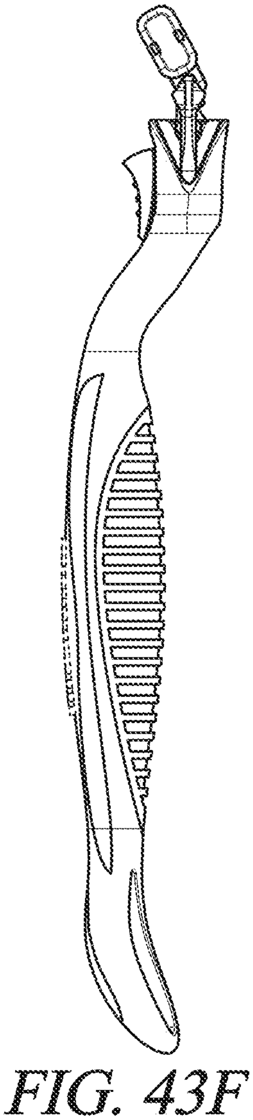
FIG. 43F is a side view.
Figure 43G:
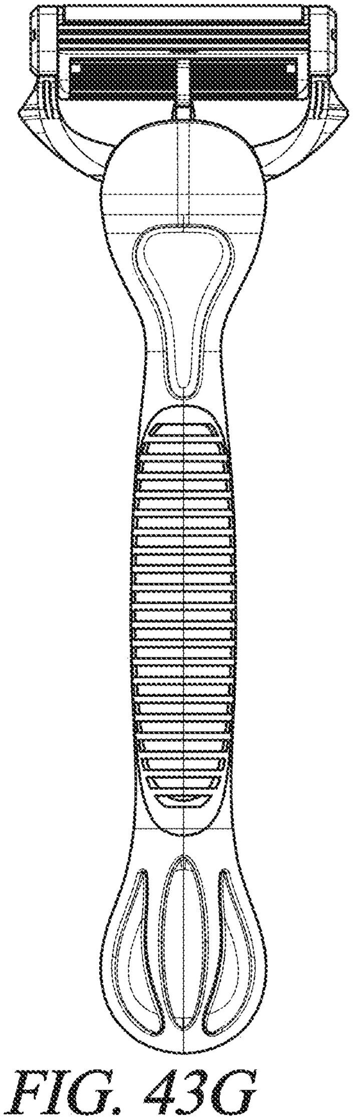
FIG. 43G is a rear elevation view of one embodiment of a razor of the present disclosure.
Figure 43E:
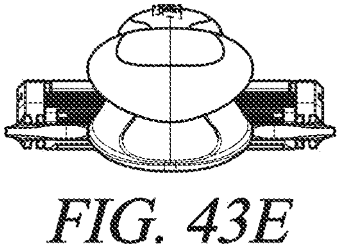
FIG. 43E is a bottom view.
Figure 44A:
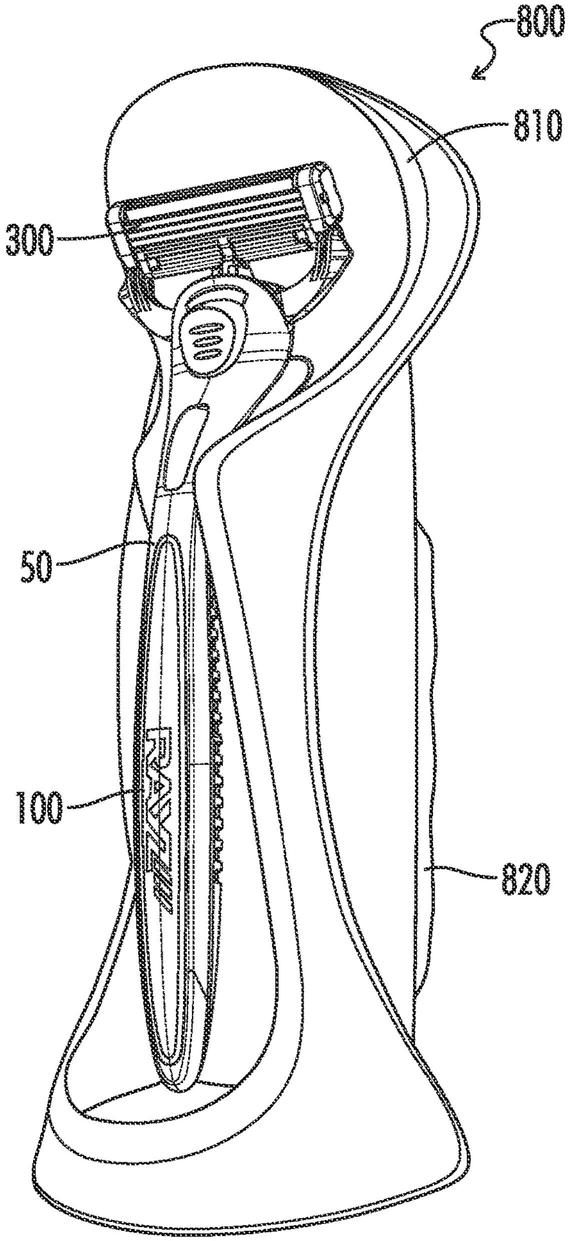
FIGS. 44A through 44D are various views of one embodiment of a razor, razor holder and cartridge holder of the present disclosure.
Figure 44B:
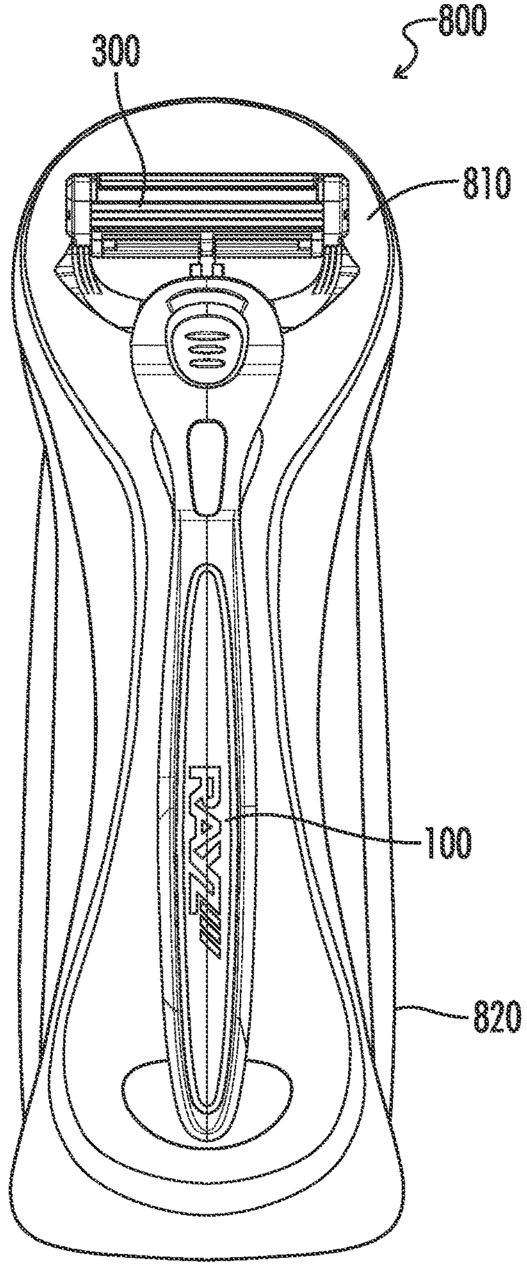
Figure 44C:
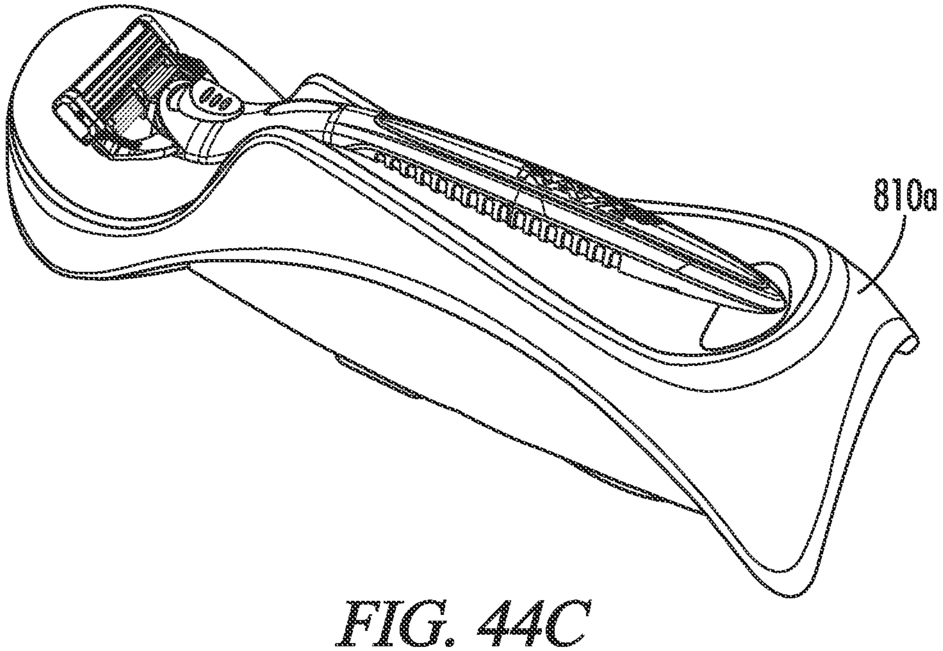
Figure 44D:
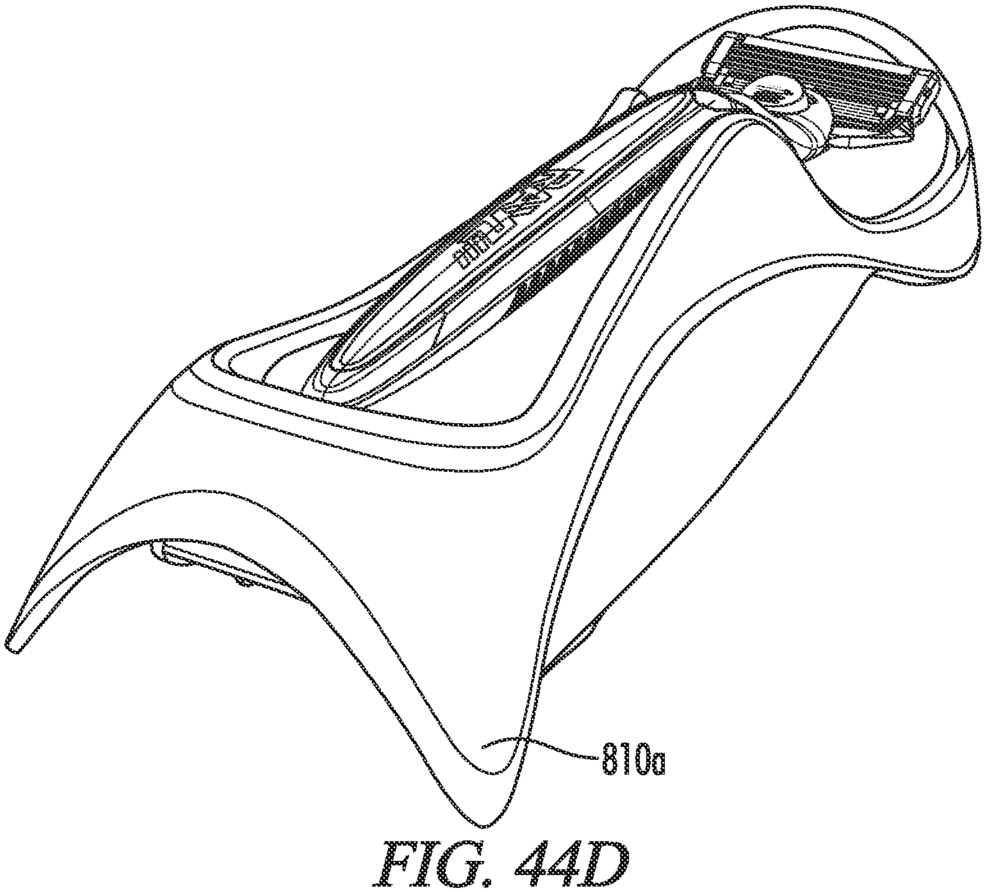

In other embodiments, the number or configuration of blades or the appearance may be entirely dependent on either face of the cartridge, and each face may, in such embodiments, contain different blades, blade configurations, numbers of blades, different appearances including different blade configurations, and combinations of blades and/or appearances. For example, in the embodiment shown in the cartridge 300*f* of FIGS. 39A-39B, one side 310*f* (FIG. 39B) has five blades 400*f*1, while the other side 350*f* (FIG. 39A) has three blades 400*f*2. In another example, in the embodiment shown in the cartridge 300*g* of FIGS. 40A-40B that has three blades 400*g* on each side 310*g*, 350*g*, one side 310*g* (FIG. 39B) has upper and lower pad areas 320*g*, 340*g* that are rounded to create the appearance of a female razor side, while the other side 350*g* (FIG. 39A) has upper and lower pad areas 360*g*, 380*g* that are more linear to create the appearance of a male razor side. Thus, each side of the cartridge can have a different overall appearance. The cartridge 300*g* embodiment of FIGS. 40A-40B may also have different numbers of blades or blade configurations on each side. In another example, in the embodiments shown in the cartridges 300*h*-300*j* of FIGS. 41A-41C, the upper and lower pad areas may have similar or different configurations. For example, the upper pad area 320*h* may be the same width as the lower pad area 340*h* (FIG. 41A), or the upper pad area 320*i* may be wider than the lower pad area 340*i* (FIG. 41B), or the upper pad area 320*j* may be narrower than the lower pad area 340*j* (FIG. 41C). Other cartridge side shapes, configurations, blade combinations, or combinations of the same, are possible.

For example, in some embodiments, such as those shown in FIG. 47A-E, a woman's razor is shown, characterized by a larger head portion than other configurations. The larger head cartridge 300 has two identical sides of cartridges creating a dual sided razor, however they can be different sides or have different functions. For example, one side can be a pre shaving side with moisturizing strips or shaving cream lotion or additive, including any known now or developed in the future, and the other side may be used for shaving. As an alternative, one side may have one to any number of blades and the other side can have a different number of blades. In some embodiments, one side may have a large rounded cartridge head and the other side may not have a large rounded cartridge 300 head, and may instead have a standard cartridge head such as those already described in this application. In such embodiments, one side can be used for a man and the others side for a woman, which is great for traveling.

The woman's big rounded cartridge head can be any shape or size. In some embodiments, a normal cartridge head described in this application can be connected to an outer rounded cartridge head assembly 930, such as that shown in the figures. This outer rounded head assembly 930 can have any a shape or contour or any number of surfaces and can have one to any number of parts, any number of pieces and any type of materials. The cartridge head described can have any number of rubber pads, moisturizing reservoirs and moisturizing strips, or any type of razor cartridge parts known now or developed in the future. The outer perimeter 932 can be any shape, any angle or size or be of any thickness. The assembly 930 can have flex areas where any side or portion can flex in out or any direction while being used for shaving and when it follows the contour of the users skin, any portion of the razor can flex in any direction.

The larger cartridge head can have flex blades where any portion of the blades on both sides of the cartridge flex, both sides of the blades can flex or bend or bend or flex in any direction depending on the shaving angle being shaved.

The two sides of the assembly 930 can be part of the cartridge or can be a separate piece or pieces. If separate from the main cartridge body and assembled onto the main cartridge body, the cartridge body and the assembly can be implemented as a permanent or non-permanent connection. For example, the assembly 930 may be attached to main cartridge body by permanent snap or connection or any way known now or developed in the future. The woman's larger head can have end caps 934 enclosed within the larger head or may be separate from the cartridge head. When the assembly 930 is connected, it can connect so it can enclose a portion of the cartridge as a clamshell, and this may enclose the end caps 934, so they form a permanent connection when attached and cannot come out of the assembly 930.

The assembly 930 can have connection points 936 such as male or female connections and may have a corresponding and opposite connection on the main cartridge body. Let it be known that the connection can be done any many ways, sonic welding or many other ways and that the assembly 930 may be attached both non permanently and permanently in many ways know now or developed in the future. Any portion or area between the cartridge and the larger rounded head assembly 930 can have connections and can be configured such that the assembly 930 encases and holds the main cartridge body together.

Figure 47A:
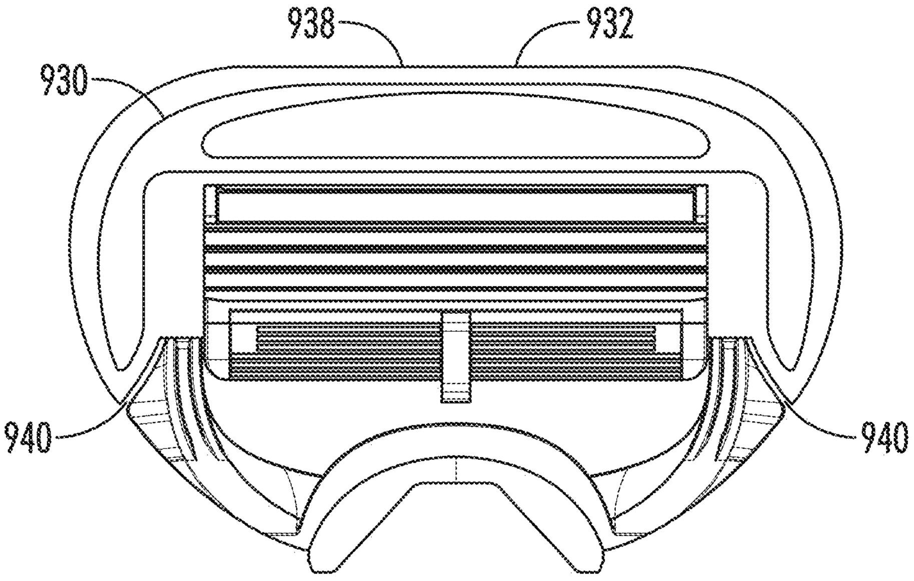
FIGS. 47A through 47E illustrate a larger rounded head that can be used with the razor of the present disclosure.
Figure 47B:
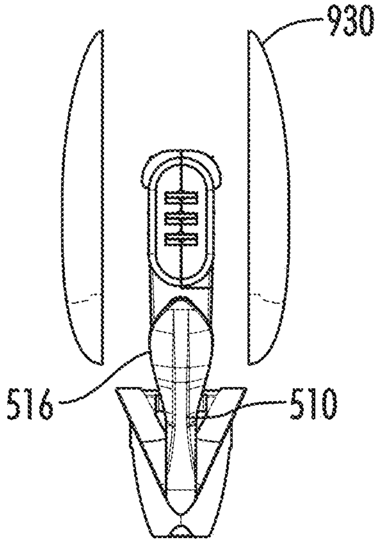
Figure 47C:
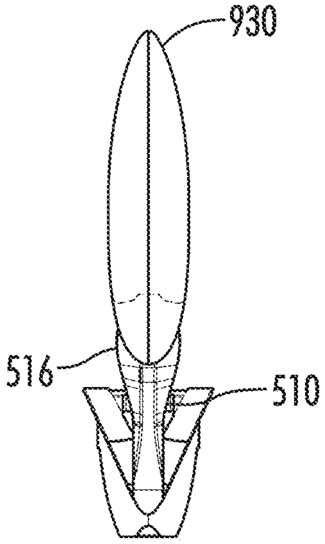

As shown in FIGS. 47A, the bottom section of the larger rounded head cartridge main body can have rubber pads or moisturizing strips and may not have a big rounded section, just a small portion less than all other sides. Most women's rounded razors have a bottom section that extends beyond the bottom portion of the blades that's usually rounded and has moisturizing strips and pads.

The larger rounded head shown has a bottom-rounded portion missing, and therefore the bottom does not parallel the top rounded portion. Such a configuration allows for the swivel arms to be connected and function properly and so the user can switch sides and flip the razor to the other side or to the second shaving side of the cartridge.

The larger rounded head shown has an outer perimeter 932 flat top portion 938 that can be rounded or any shape or size and then it extends towards both ends of the cartridge, then it's rounded and extends downward towards the swivel arms and stops so there's a gap between the cartridge lowest outer most portion perimeter and the swivel arm, then it angles upward toward the main cartridge body. The angle or gap 940 depends on the shape of the swivel arms 510. This gap 940 is vital to the assembly because it allows the cartridge to swivel back and forth easily and allows for the user to switch sides to the second shaving side of the cartridge with no problems. This gap 940 also allows the swivel arms to be connected to the cartridge and freely swivel back and forth.

The drawings show two pieces for the larger rounded head and cartridge holder, but there can be one to any number of pieces. The drawings further show that the assembled cartridge main body can be places in the grooves or a cavity or a portion of the inside of the assembly 930, both cartridge ends or any part are placed In the grooves or cavities 936 and then the other half of the woman's big head is placed over the exposed cartridge and cartridge ends. The two big rounded head and holder pieces are then snapped or sonic welded or connected in some other way known now or developed in the future. The drawings show one way of attaching the assembly 930 to a cartridge, let it be known that assembly 930 can be part of the actual cartridge structure and can be permanently or non-permanently attached or molded together.

Figure 46A:
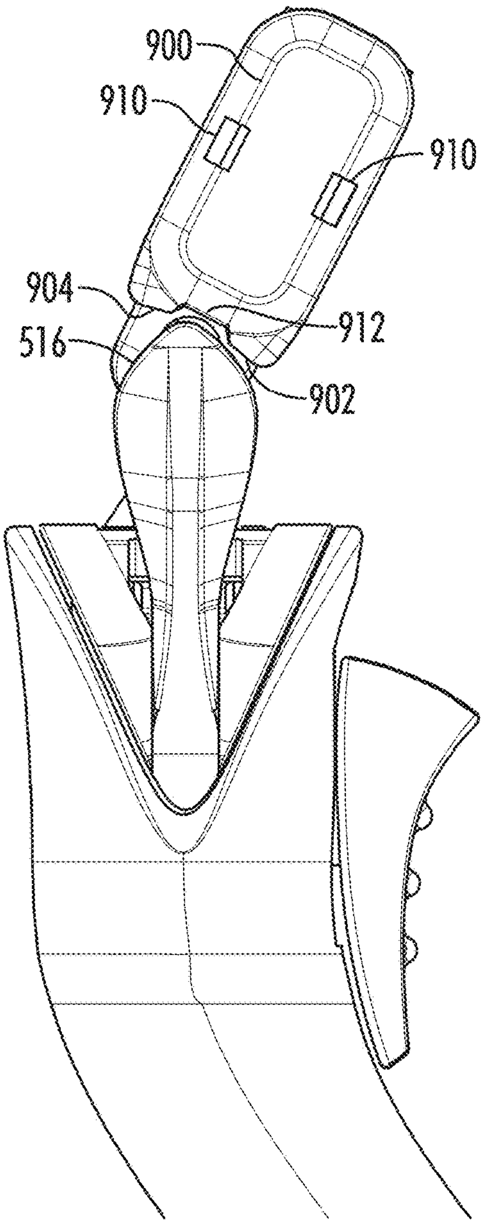
FIGS. 46A through 46C illustrate end caps having angled points for contacting abutment portions of swivel arms.
Figure 46B:
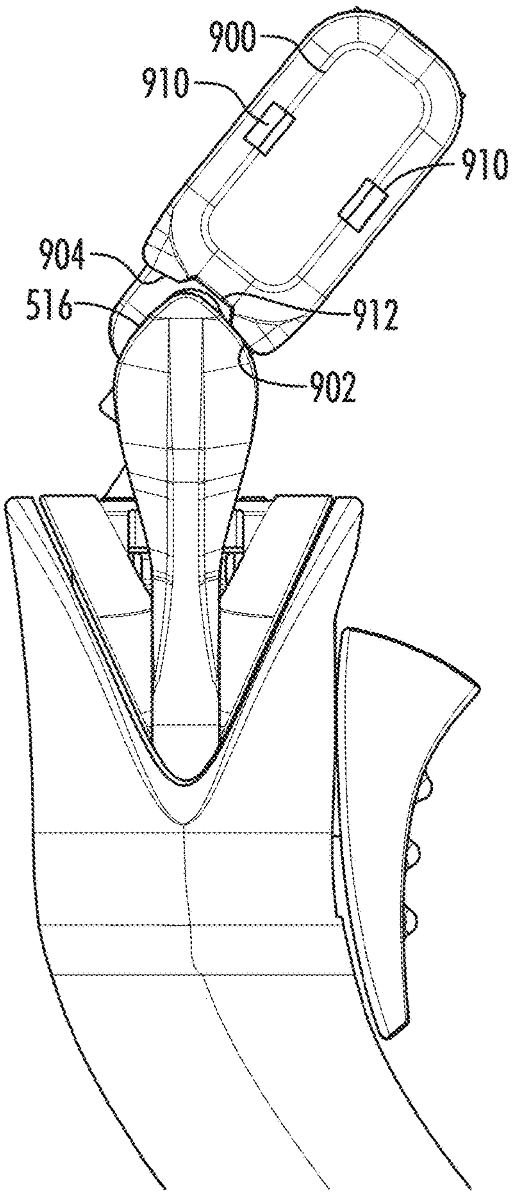
Figure 46C:
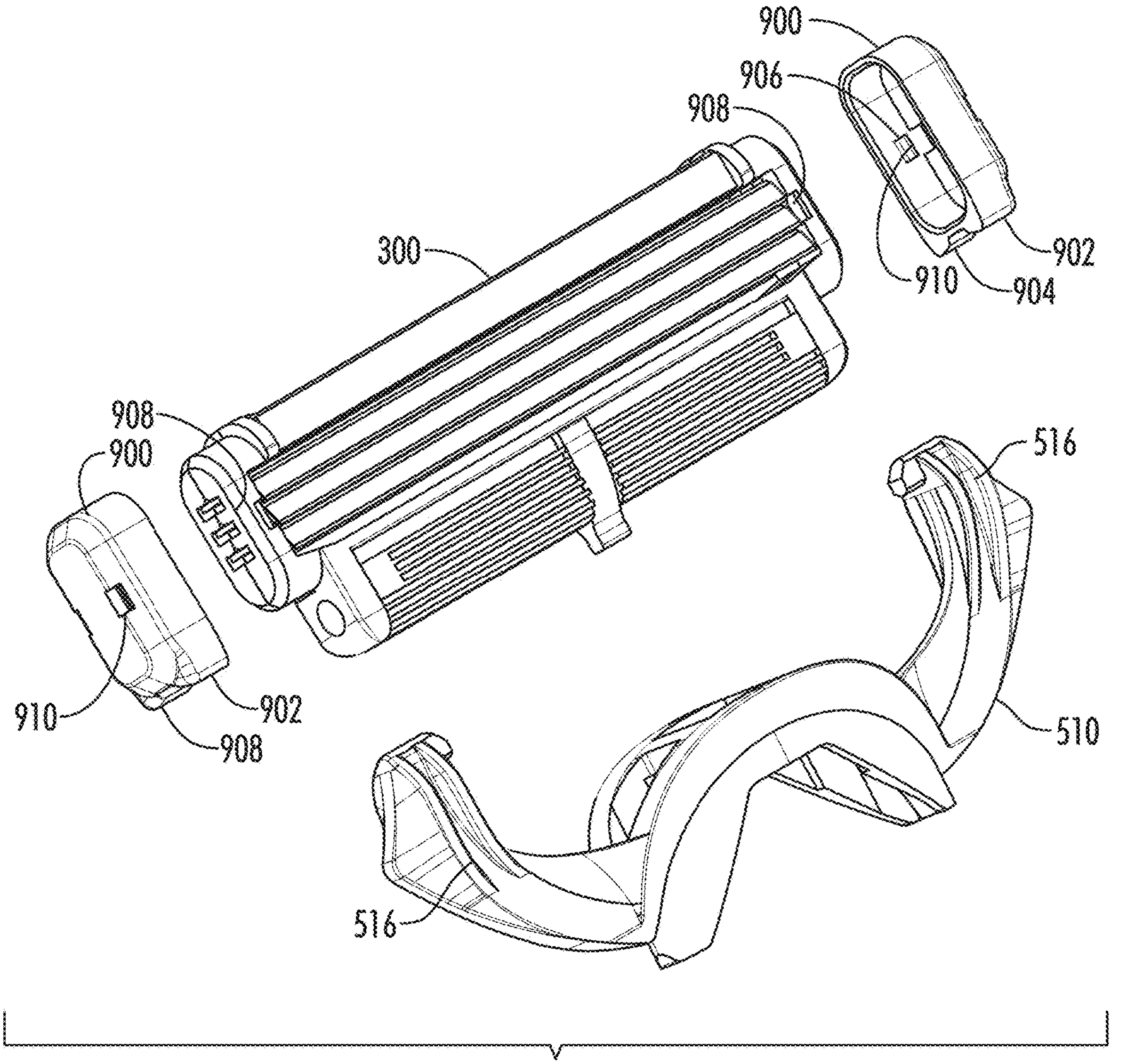
Figure 47D:
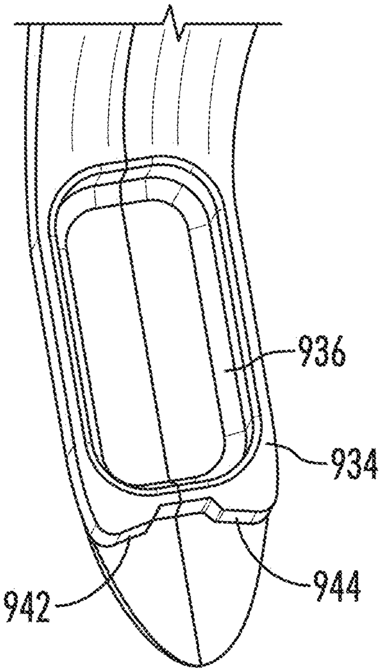
Figure 47E:
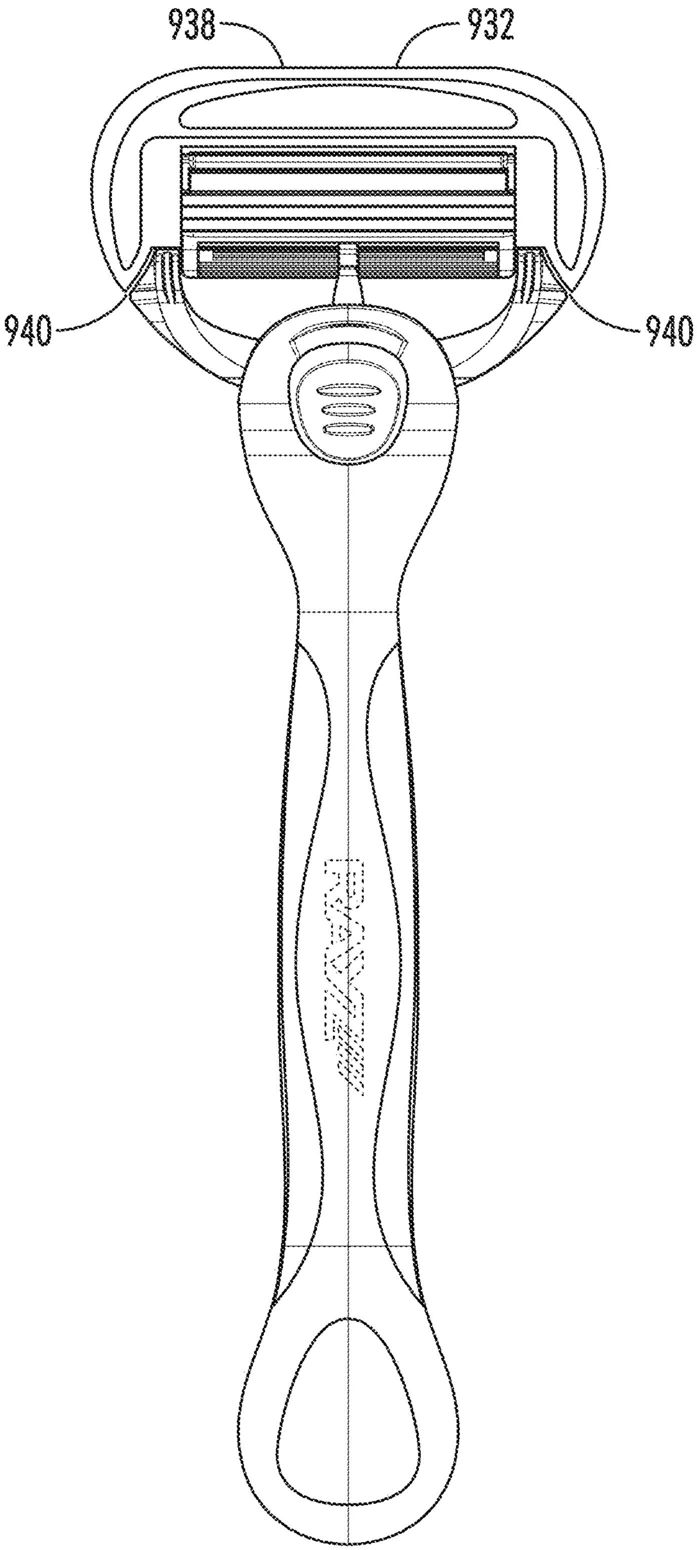
Figure 48A:
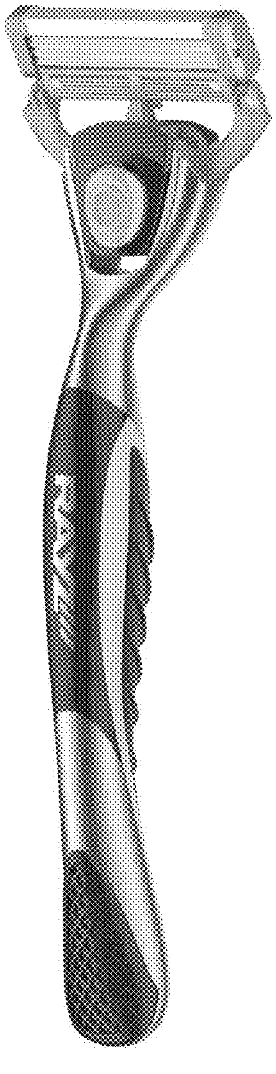
FIGS. 48A through 48C are various views of a razor of the present disclosure.
Figure 48B:
Figure 48C:
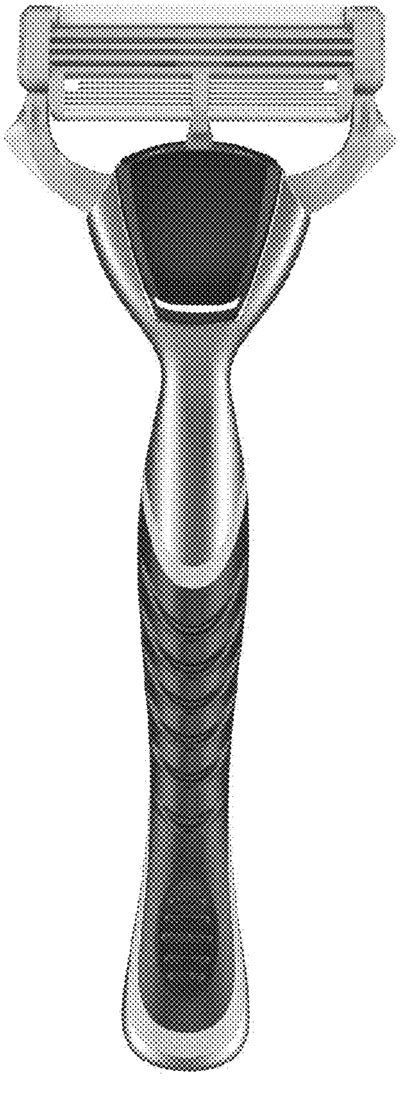

As shown in FIG. 47D, the inside portion of the assembly 930, when combined, provides a cavity 936 for fixing to the cartridge 300. The sides of the assembly further function as an end cap 900, and further comprise a first angled surface 942 and a second angled surface 944. The various components of the assembly 930 function similarly to those described below with respect to FIG. 46. As such, the first angled surface 942 and the second angled surface 944 contact an abutment portion 516 of the swivel arm 510.

In some embodiments, the cartridge head may be provided in different configurations. For example, the cartridge head may be shaped like a triangle. In such an embodiment, the top of the razor cartridge is the top of the triangle cartridge. Each side of the triangle has a shaving surface with blades, rubber pads, and moisturizing strips, as discussed above. The bottom of the triangle is where the handle connects to the triangle cartridge. The handle and triangle cartridge connection can be any connection mentioned in this application or known now or developed in the future. With this triangle cartridge the handle can be any handle shape or design. This handle can be designed so each side of the handle is the same design and can fit hands comfortably when shaving the first shaving side or the second shaving side. With this design, you just connect the handle to the cartridge and shave one side of the dual sided razor and when the first side is dull, then simply rotate and turn the whole handle and cartridge completely around and start shaving with the second shaving side of the triangle cartridge. The user would not have to disconnect the cartridge and handle when switching from the 1st shaving side to the second shaving side. The angle of the triangle shaving side surface can be the perfect angle for shaving. The triangle sides can flex inwards toward each other, (toward the middle of the triangle), so that a user may achieve a more comfortable shave. There can be stops that prevent the flexing or to limit flexing within certain desired angles. The top of the triangle can have a flex hinge so the shaving surfaces of the dual sided triangle razor can flex inwards towards each other.

While in one embodiment it is preferred to have a single blade extend between the first and second shaving regions 330, 370 for ease of manufacture and efficient assembly of blades in the cartridge, it will be appreciated that separate blades may be used to populate each shaving region even though such an arrangement may involve more complex manufacturing. Further, in certain embodiments, such as FIGS. 39A-39B, each shave region may be populated by different numbers of blades, so that one shave region has more exposed blades than the other shave region, and vice versa.

Figure 17:
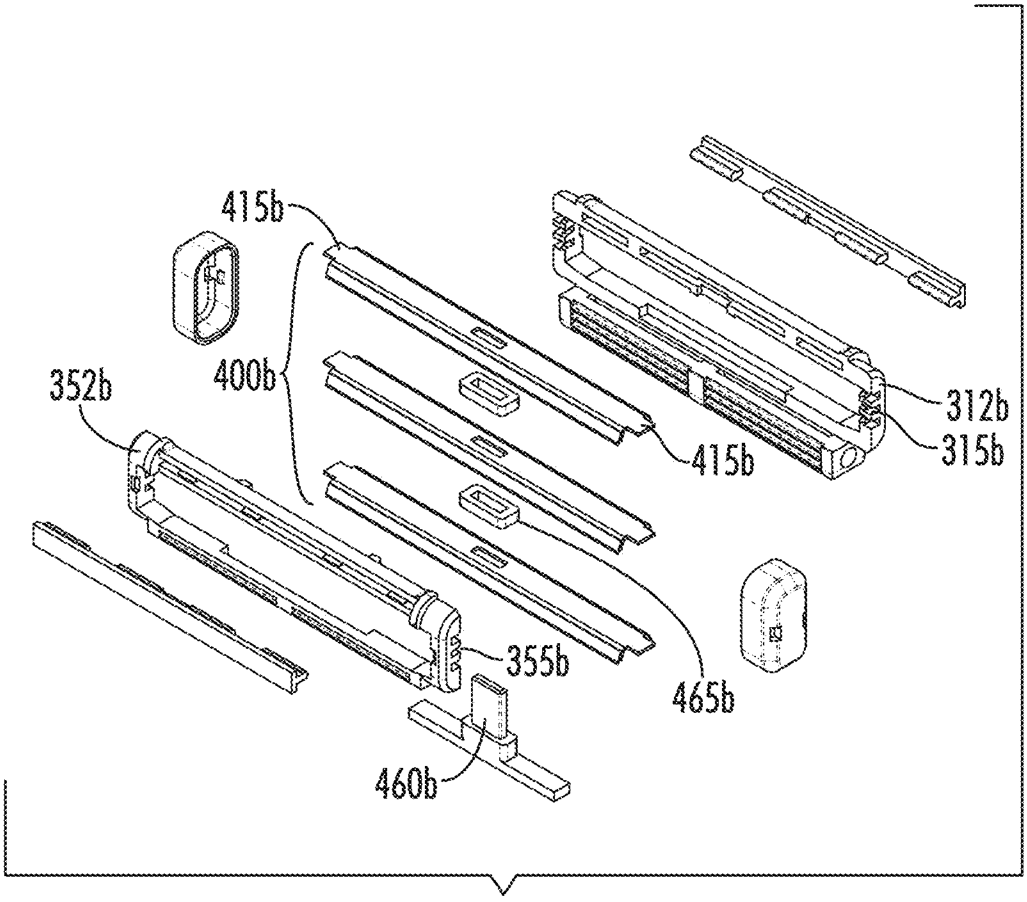
FIG. 17 is one embodiment of an exploded view of a razor cartridge in accordance with the present disclosure.

Blades 400 may be secured in a stacked, spaced-apart relationship within the cartridge 300 using a variety of manufacturing methods now known or hereinafter developed. In a preferred embodiment shown in FIG. 15, blade ends 415-435 are captured between slots 315, 355 defined in the first side and second side housings 312, 352 respectively. In an alternate embodiment of a cartridge 300*b* shown in FIG. 17, blades 400*b* are aligned along a positioning spine 460*b* and spaced-apart using spacer elements 465*b* that are secured to the spine 460*b* and extend between blades 400*b*. In such alternate embodiment, slots 315*b*, 355*b* may also be provided in housings 312*b*, 322*b* to capture the blade ends 415*b* to further support the blades 400*b* within the cartridge 300*b*. In certain embodiments, a positioning spine may or may not be used in combination with spacer elements, or the spacer elements may be optional. Further, the spacer elements may vary in height or thickness to vary individual blade configurations.

Figure 18A:
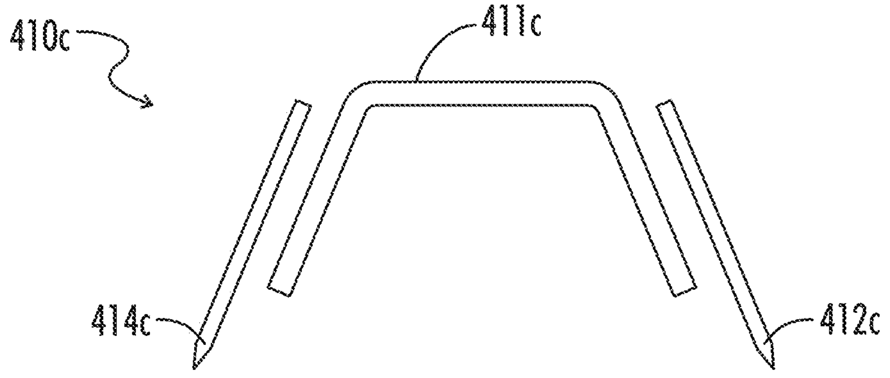
FIG. 18A is one embodiment of an exploded view and FIG. 18B is an assembled view of one embodiment of a razor blade in accordance with the present disclosure.
Figure 18B:
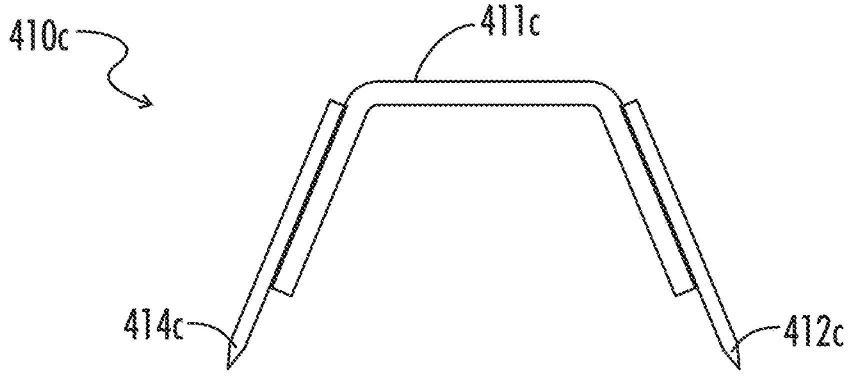
Figure 18C:
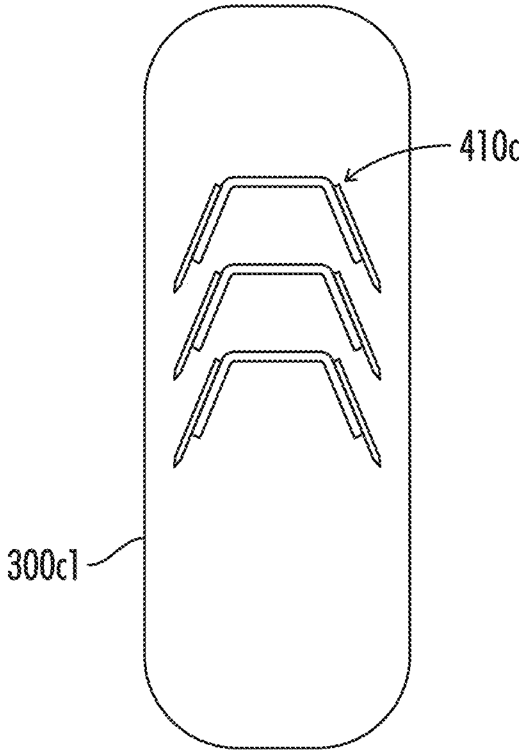
FIG. 18C is a diagrammatic view of one embodiment of a cartridge including a plurality of razors in a stacked apart relationship.
Figure 18D:
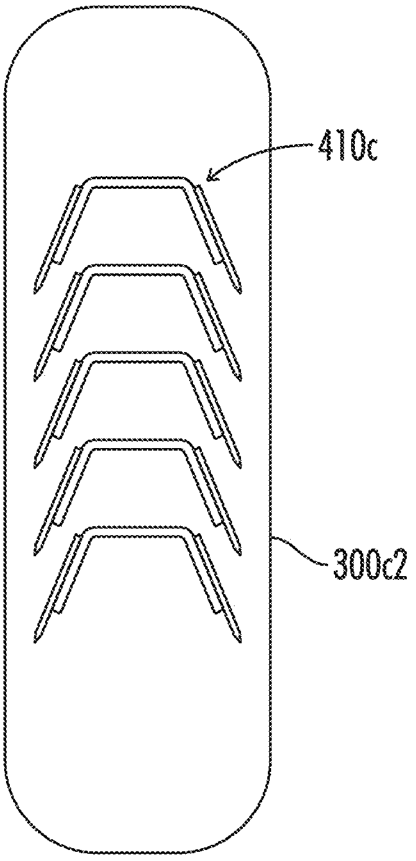
FIG. 18D is a diagrammatic view of one embodiment of a cartridge including a plurality of razors in a stacked apart relationship.

The blades 400 may be formed using a variety of manufacturing methods, and may be any shape, design, material, composition or configuration now known or hereinafter developed. With reference to FIG. 15 and using blade 410 as a basis for discussion, in one embodiment the blade 410 is a single piece of metal or other material having blade edges 412, 414 that are each oriented in an angularly downward configuration relative to a blade central axis 413 when the blade is positioned within the cartridge 300, where such single piece of metal or other material might be stamped or otherwise molded into shape using manufacturing methods now known or hereinafter developed. The angular orientation of the blade edge 412, 414 is configured to provide a user with a close, comfortable and effective shave. In an alternate embodiment shown in FIGS. 18A-18B, a blade 410*c* may be formed from multiple components wherein blade edge pieces 412*c*, 414*c* are fixed onto a support carrier 411*c* at a weld 416*c*, and then multiple blades 410*c*, each comprising the carrier 411*c* and edge pieces 412*c*, 414*c*, are stacked in a spaced-apart relation. The support carrier 411*c* and/or edge pieces 412*c*, 414*c* may be any shape, design, material, composition or configuration. FIG. 18C illustrates a cartridge 300*c*1 having three stacked blades 410*c*, while FIG. 18D illustrates a cartridge 300*c*2 having five stacked blades 410*c*. Any number of blades may be assembled within a cartridge. The support carrier 411*c* imparts structural stability to the entirety of the blade 410*c* and keeps the edge pieces 412*c*, 414*c* from bowing, flexing or otherwise moving during use.

Figure 19A:
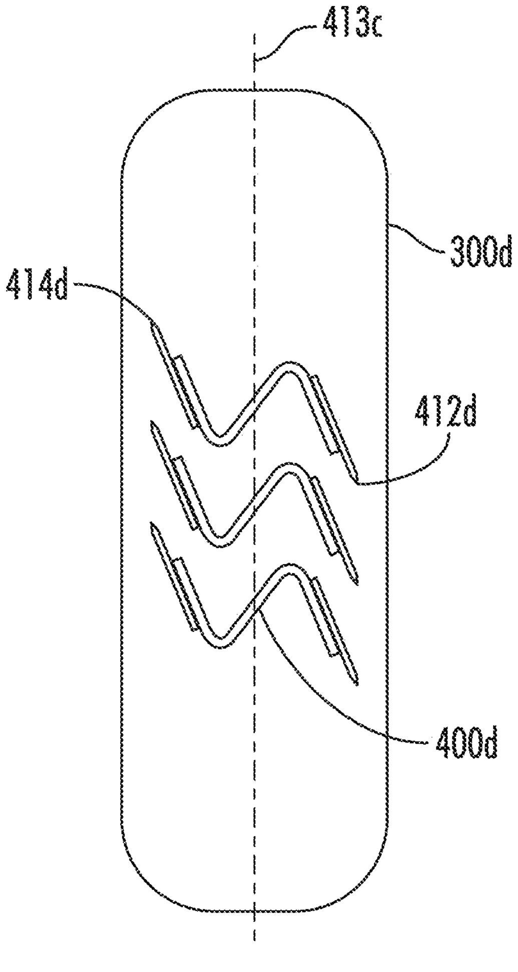
FIG. 19A is a diagrammatic view of one embodiment of a cartridge including a plurality of razors in a stacked apart relationship.
Figure 19B:
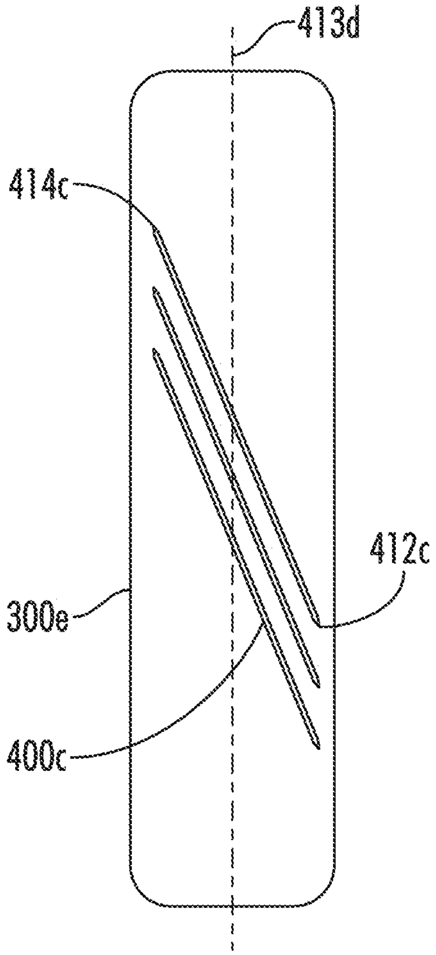
FIG. 19B is a diagrammatic view of one embodiment of a cartridge including a plurality of razors in a stacked apart relationship.

In a further alternate embodiment shown in FIG. 19A, a razor cartridge 300*d* comprises blades 400*d* that have oppositely-oriented blade edges 412*d*, 414*d* relative to a central axis 413*d* of the blade 400*d*. In a further alternate embodiment shown in FIG. 19B, a razor cartridge 300*e* comprises diagonal blades 400*e* that have oppositely-oriented blade edges 412*e*, 414*e* relative to a central axis 413*e*. In the embodiments of FIGS. 19A-19B, the cartridge 300*d*, 300*e* would typically be flipped along the central axis 413*d*, 413*e* of the blades in order to facilitate shaving using either side of the cartridge 300*d*, 300*e*.

In any configuration described, the blades be implemented with an approach angle appropriate for shaving. Such an angle may be sixty degrees, or it may vary or be any angle depending on preference. For example, the blades may be adjustable by a user in some configurations. Other angular orientations, dimensions and configurations are possible. Further, the blades may be any shape, design, thickness, dimension, weight, construction, configuration, angular position within the cartridge, or combinations of the same.

In some embodiments, the blades themselves are flex blades, where any portion of the blades on both sides of the cartridge can flex or bend in any direction depending on the shaving angle being shaved. Each blade can flex independently or at the same time or when the razor cartridge passes over contours or uneven surfaces. In some embodiments, a portion of the cartridge body or blades can flex or bend while shaving. Each side of the dual sided razor can have the body or razor blades flex in any direction or each side can have different flex points in the blades or body. In some embodiments, one side can have flexing or moving blades and the other side can have none.

Returning now to the cartridge 300 (FIGS. 14A-15), the upper pad areas 320, 360 are preferably provided with delivery systems 322, 362 having shaving enhancers or facilitators such as lubricating strips, moisturizing strips, hydrating gels, creams, vitamins, water activated products, moisturizers, and the like. While delivery systems 322, 362 in the nature of strips have been described, it will be appreciated that delivery systems other than strips that are now known or hereinafter developed may be utilized. Further, the delivery systems 322, 362 may be positioned other than in the upper pad areas 320, 360 if desired, although the upper pad areas 320, 360 tend to be the most popular location given the such areas 320, 360 follow the engagement of the blades 400 with a user's skin and therefore such delivery systems 322, 362 tend to provide healing or soothing benefits to the skin to combat sensitivity and irritation resulting from the blades scraping across the skin. The delivery systems 322, 362 may be in the form of strips that extend between the end caps 390 or any location on the shaving surface, or they may have a different shape, or a variety of shapes, or may employ texture or have a surface feature that is otherwise pleasing to the skin. Further, the delivery systems 322, 362 may be formed into the housings 312, 352 (FIG. 15) during the manufacturing process, or they may be applied to the housings 312, 352 by way of adhesive, press fit, molding or otherwise. Further, the delivery systems 322, 362 may be integrated into the housings 312, 352 or removable and replaceable as desired.

In some embodiments, a coating may be applied to the moisturizing strips so it can protect the moisturizing strip from water, soap, shaving créme, or gel or any substance it might be exposed to when the razor is being used. As such the only way it will dispense or release the Moisturizer from the strip is when the strip is actually being used and the surface of the moisturizing strip is being rubbed against another surface like skin. This will protect the moisturizing strip of the second shaving side of the dual sided razor until it's used.

The lower pad areas 340, 380 are preferably provided with gripping pads 342, 382 that are preferably configured to prepare the shaving surface prior to engagement by the first and second shaving regions 330, 370. In one embodiment, the gripping pads 342, 382 are formed from spaced-apart fins that stretch skin to provide a closer shave. Other configurations of pads having different shapes, configurations, textures, and constructions now known or hereinafter developed are possible as well, including a gripping pad having a smooth surface. Alternatively, the lower pad areas 340, 380 may be provided with certain features configured to engage the skin in other than a gripping relationship, or configured to engage other aspects of the razor 50 such as the handle 100.

In a preferred embodiment, each lower pad area 340, 380 is respectively provided with a first and second track 344, 384 for engagement with the guide tip 248 of the pushpin 240 as will be described below. An interrupt 394 is defined at the terminus of and between each track 344, 384 and further defines a point of inflection between the first side 310 and the second side 350 of the cartridge 300. As will be described herein, the interrupt 394 inhibits the inadvertent switching of the cartridge 300 between the first and second shaving sides 310, 350 during normal use of the razor 50. The tracks 344, 384 and interrupt 394 may be integrally formed into the lower pad areas 340, 380. Alternatively, in one embodiment shown in FIG. 15, a separate track member 395 having a first arm 396, a second arm 396, and an interrupt 398 defined therebetween, is attached to the cartridge 300 so that the first arm 396 forms track 344, the second arm 396 forms track 384, and extensions of the tracks 344, 384 forms interrupt 394. As will be described in more detail below, the guide tip 248 of the pushpin 240 rides along first track 344 while the user shaves with the second side 350, the guide tip 248 of the pushpin 240 rides along second track 384 while the user shaves with the first side 310, and the interrupt 394 prevents the guide pin 248 from crossing from the first track 344 to the second track 384, and vice versa, during normal use of the razor 50.

It will be understood that interrupt 394 may be any size or shape, and it may be made of any materials, although it will typically be an extension of tracks 344, 384. In some embodiments, the shape of the interrupt 394 may be configured to dictate the starting angle of the cartridge 300 relative to the swivel arms 510.

The ends of the lower pad areas 340, 380 are provided with swivel arm engagement openings 346 (FIGS. 14D, 14F) along certain edge regions of the cartridge 300 and swivel arm engagement cam surfaces 348 for engagement with a swivel arm connection 500 (FIGS. 20-20G and FIGS. 21A-21C) that interfaces between the cartridge 300 and the connector structure 200 on the handle 100. While the swivel arm openings 346 are shown in a particular edge location on the cartridge 300, it will be appreciated that the openings 346 can be located anywhere on the cartridge 300, and similarly that the swivel arms 510 can be configured to engage the openings 346 wherever they are located. In one embodiment as shown, the openings 346 are positioned along the edges of the cartridge 300 independent of the first and second shave regions 310, 370 and independent of the end caps 390. In other embodiments, the openings 346 may be positioned on the end caps, or in another location. The swivel arm connection 500 further comprises a plurality of swivel arms 510 and a connection body 530 defined therebetween. The swivel arms 510 further comprise engagement pins 512 having cam surfaces 514 that, upon forceful engagement of the cartridge 300 with the swivel arm connection 500, impact the cam surfaces 348 on the cartridge 300, which causes the swivel arms 510 to flex outwardly (FIG. 21B) in order to allow the engagement pins 512 to enter the swivel arm engagement openings 346, whereupon the swivel arms 510 would flex back (FIG. 21C) and retain the engagement pins 512 securely within the swivel arm engagement openings 346. While the openings are shown adjacent the lower pad areas and movement tracks, it will be appreciated that the openings can be in other locations on the cartridge. Further, it will be understood that the engagement pins 514 may be inserted into the swivel arm engagement openings 346 one at a time, and may be engaged and/or disengaged with the openings 346 through the assistance of the cam surfaces 514, 348 or not. For example, one pin 514 may be inserted into one opening 346 without the assistance of the cam surfaces 348, 514, and then the other pin may be inserted into the other opening by using the cam surfaces to spread the swivel arm outward, or by manually stretching the swivel arm outward and then dropping the pin into the opening, with or without the assistance of the cam surfaces. In one embodiment, the swivel arm connection 500 is permanently attached to the handle 100 and the user must switch between cartridge sides by detaching the cartridge 300 from the swivel arms, flipping the cartridge around an axis and re-attaching the cartridge to the swivel arms, which would occur when a user is finished shaving with one side of the cartridge and desires to shave with the other side of the cartridge. In another embodiment, as described herein, once the cartridge 300 is assembled to the swivel arm connection 500 to form the assembly 600, whether this occurs at the point of manufacture or by the user, the cartridge 300 is configured so that it is not to be removed from the swivel arm connection 500 during normal use. In certain embodiments, the connection between the cartridge 300 and the swivel arm connection 500 is configured to be removable during normal use, while in other embodiments the connection is configured to be more permanent or semi-permanent during normal use.

It will be understood that while the embodiments shown and discussed herein rely on swivel arms 510, other embodiments are contemplated that rely on a pushpin assembly combined with a central connection that would control and limit the tilting of the cartridge 300.

The connection between the handle 100 and the cartridge 300, which may be by way of the connector structure 200, may be recessed or even with the shaving surface of the cartridge. The connection may be to the lowest middle section of the cartridge 300, or it may be around the edges of the lowest section of the cartridge as shown with respect to engagement openings 346, or any other location. The connection may be surrounded by other features of the cartridge 300, such as moisturizing strips, and the connection may result in a swivel connection, such as that shown and described, or it may be by way of a fixed connection.

In a preferred embodiment, the cartridge 300 and the swivel arm connection 500 are joined together to form an assembly 600 prior to engagement of the cartridge 300 with the handle 100. The assembly of the cartridge 300 and the swivel arm connection 500 can occur prior to distribution to a user, such as at the point of manufacture. In one embodiment, the cartridge 300 and swivel arm connection 500 are each manufactured in the same manufacturing facility and then joined together. In another embodiment, the cartridge 300 and swivel arm connection 500 are each manufactured in a different facility and then joined together at one of the facilities. In another embodiment, the cartridge 300 and swivel arm connection 500 are each manufactured in a different facility and then joined together at a completely different facility. Further, a plurality of assemblies 600 may be vended together in a multi-pack (not shown) for distribution to users, or a user can connect the cartridge 300 to the swivel arm connection 500 together to form the assembly 600, and then attach the assembly 600 to the handle 100.

Figure 22A:
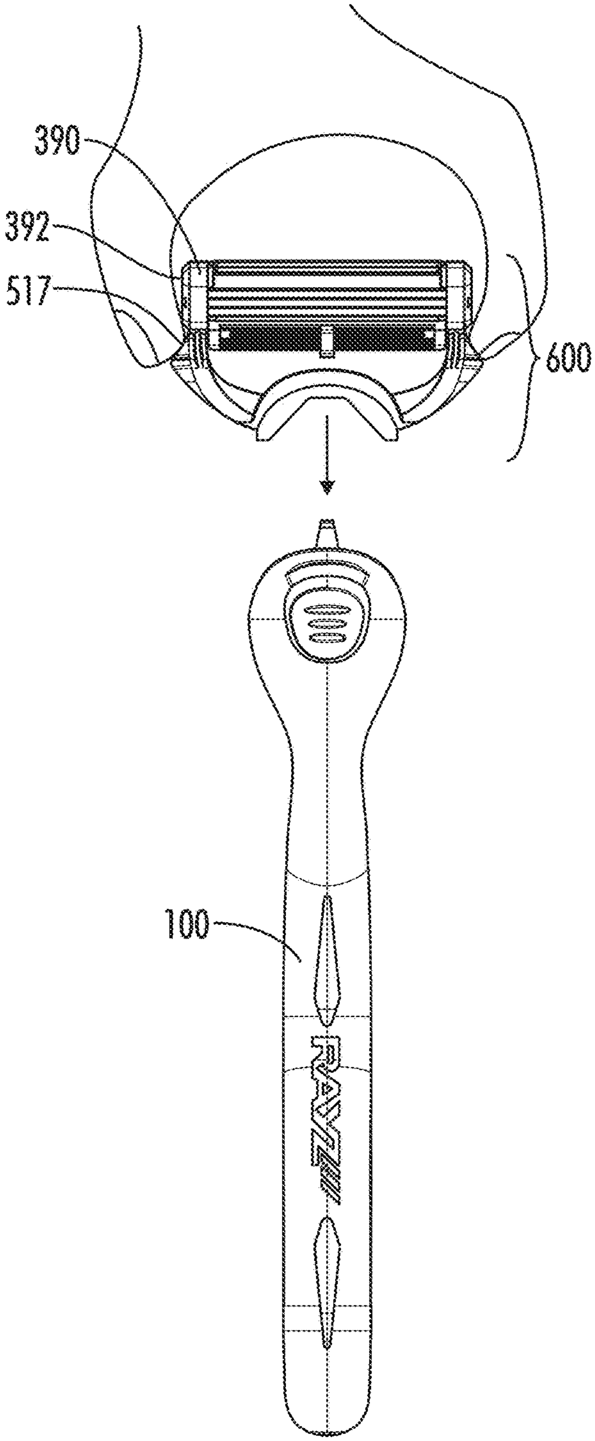
FIGS. 22A-22B illustrate one embodiment of an attachment of one embodiment of a razor cartridge assembly to one embodiment of a razor handle.
Figure 22B:
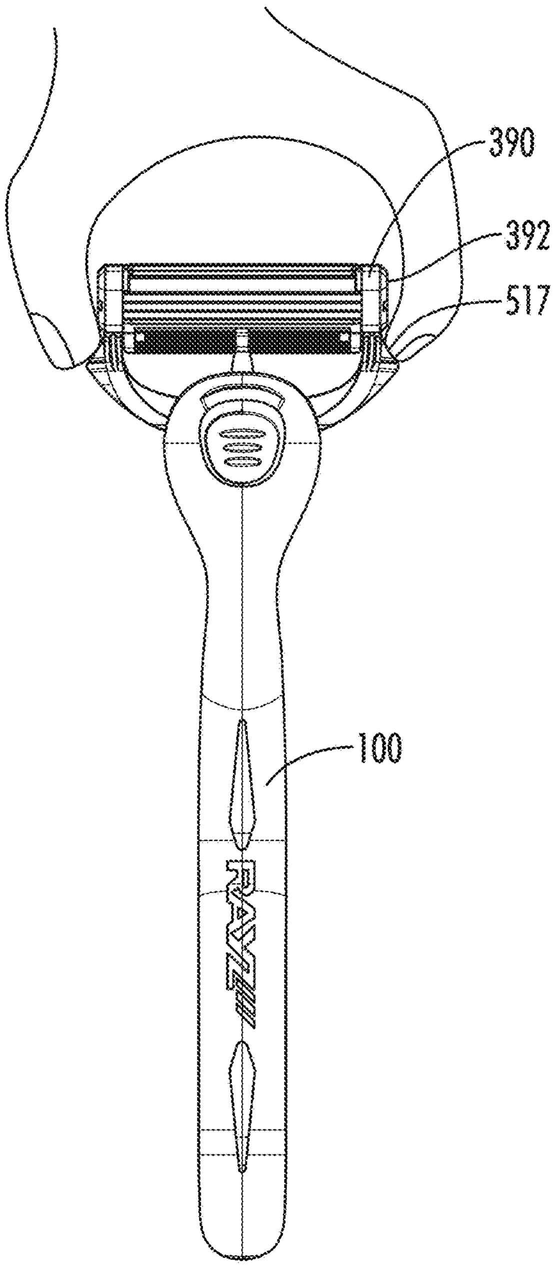
Figure 23A:
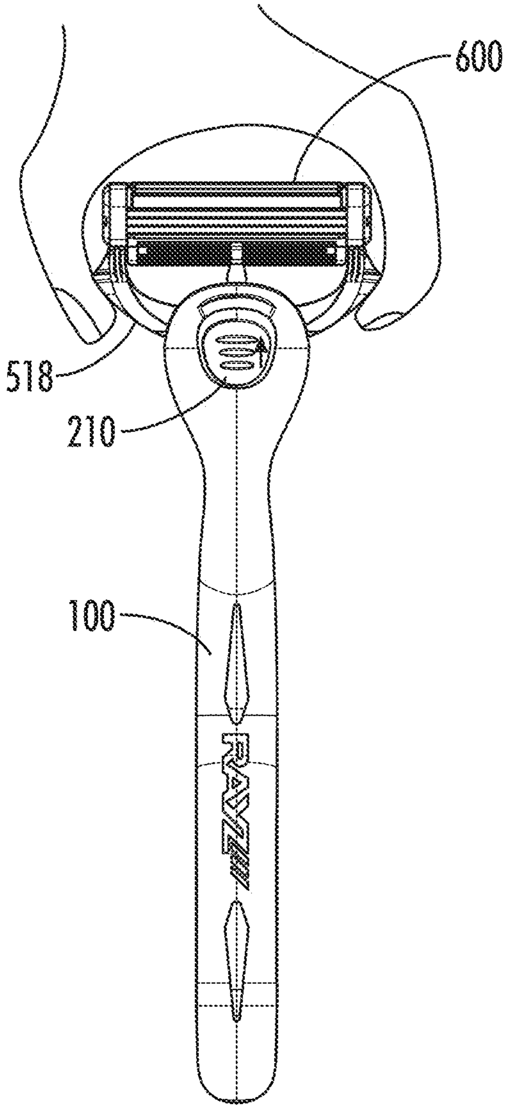
FIGS. 23A-23B illustrate one embodiment of the detachment of one embodiment of a razor cartridge assembly from one embodiment of a razor handle.
Figure 23B:
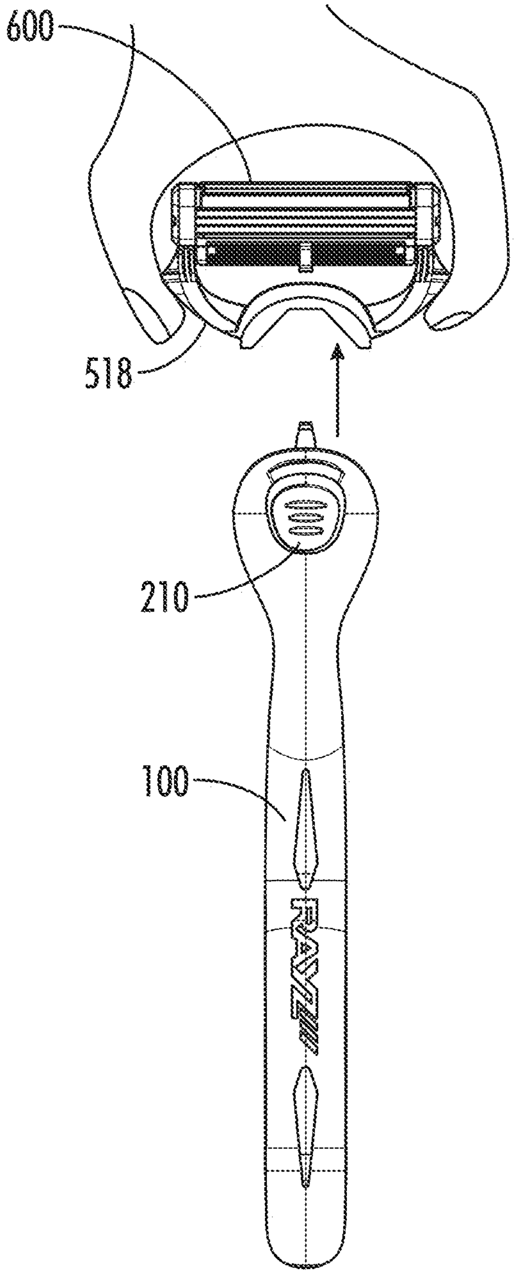
Figure 23C:
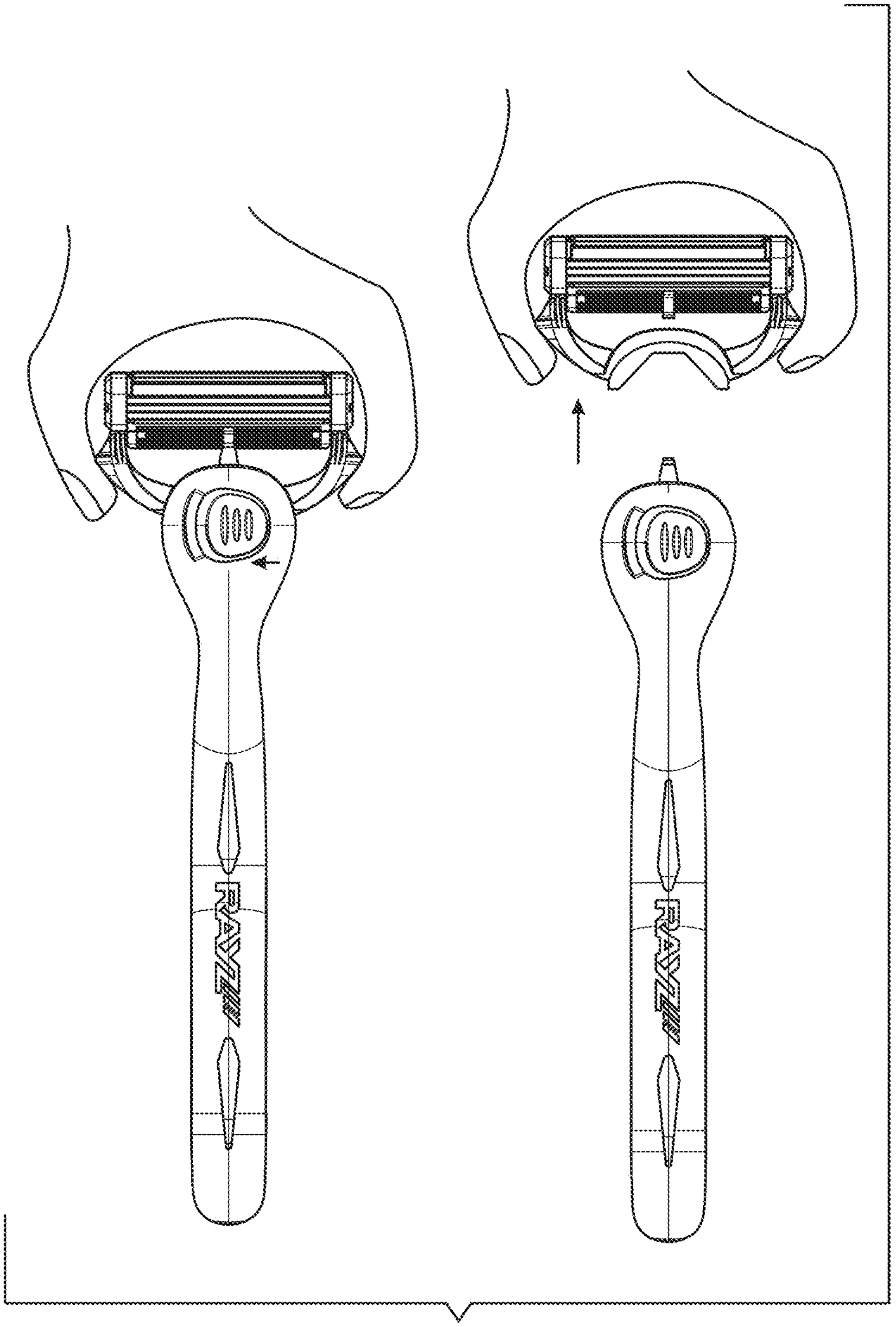
FIG. 23C illustrates one embodiment of the detachment of one embodiment of a razor cartridge assembly from one embodiment of a razor handle.

The swivel arms 510, 520 are further provided with abutment portions 516 and gripping portions 518 that provide a user (not shown) with various options for gripping the swivel arms 510 of the swivel arm connection 500. The gripping portion 518 has an upper slope 517 having any shape for pushing the swivel arms 510 downwards, or towards the handle 100, and a lower slope having any shape for pulling the swivel arms 510 upward, or away from the handle 100, the upper and lower slopes of the swivel arms being shaped and configured to fit a user's finger comfortably so that each slope is easy and comfortable to grasp and engage. For example, if it is desired to attach the assembly 600 to the handle 100 as described below, a user may wish to grip the assembly 600 by primarily engaging the upper slope 517 of the gripping portions 518 on the swivel arms 510 and simultaneously engaging the gripping surfaces 392 on the end caps 390 of the cartridge 300 to create pushing leverage and impart a pushing motion of the assembly 600 against the handle 100 (FIGS. 22A-22B). If it is desired to disengage the assembly 600 from the connector structure 200 by pulling the assembly 600 upward relative to the handle 100, a user may instead wish to grip the lower slope of the gripping portions 518 of the swivel arms 510 and possibly the end caps 390 in order to provide a pulling force upon the assembly 600 (FIGS. 23A-23B) while the button 210 is pressed upward. In an alternative embodiment shown in FIG. 23C, the button may be moved in a direction other than upward, such as sideways (FIG. 23C), or downwards (not shown), or in any other direction as long as movement of the button translates into a release of the cartridge and swivel arm connection assembly from the handle. The cartridge and swivel arm can be held any way by the consumer for attaching and dis connecting.

Figure 23D:
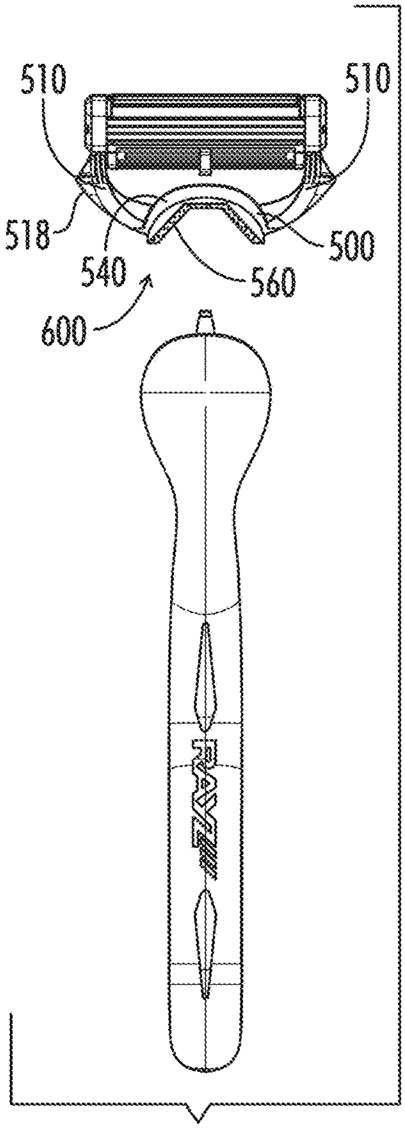
FIG. 23D illustrates one embodiment of the detachment of one embodiment of a razor cartridge assembly from one embodiment of a razor handle.

In another alternative embodiment shown in FIG. 23D, no button is necessary, and the assembly 600 is engaged to a corresponding connector structure by a magnetic connector 560. Such a magnetic connector 560 may be on a hood, similar to 540 discussed with respect to other embodiments (see, in particular FIGS. 11B-11C, and others), or any location on the swivel arms, handle connection or cartridge. Accordingly, to disengage the assembly, a user may grip the lower slope of the gripping portions 518 of the swivel arms 510 and apply a pulling force upon the assembly 600 sufficient to overcome a magnetic force at the magnetic connector 560. Such a magnetic connection would allow for quick transitions, and would allow for a user to switch configurations when high precision is impossible, such as during shaving, for example. Magnetic materials may be provided integrated into the handle to mate with the magnetic connector 560 on the swivel arm connection 500, or any location. Alternatively, the magnetic connection may be present on the handle and the swivel arm connector may be formed of magnetic materials, or vice versa, or a combination of the same. Or the magnetic elements may be on other locations on the razor. Further, such a connection does not require the variety of intricate parts described above with respect to other embodiments. Accordingly, such a connection may be a simple sliding connection reinforced by a magnetic connection, and may be provided in a wide variety of shapes.

Figure 23E:
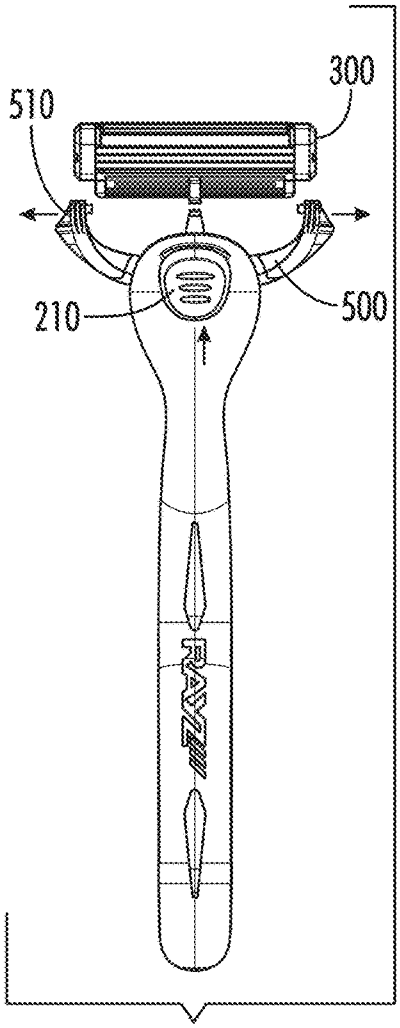
FIGS. 23E-23F illustrate one embodiment of the attachment of one embodiment of a razor cartridge to one embodiment of a razor handle.
Figure 23F:
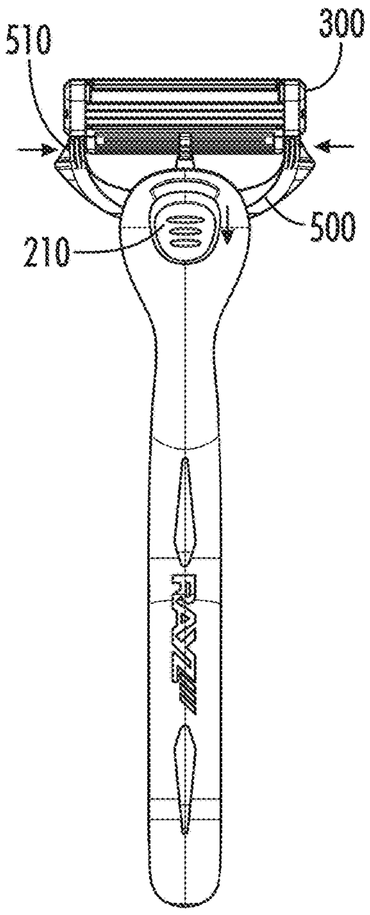

In another alternative embodiment (FIG. 23E-23F) the button 210 may disengage the cartridge 300 from the swivel arm connection 500 and the swivel arm connection 500 may be permanently fixed to the handle 100 or it can be removable. The button may then be moved upwards in order to translate the swivel arms 510 horizontally outwardly so that they release a cartridge 300 held therebetween. Then the user can flip or turn the cartridge around and use the other shaving side of the cartridge. The button, or the swivel arms 510, may be spring loaded so that when the button is released, the swivel arms 510 translate inwardly to their original position. Alternatively, a user (not shown) may move the button in a first direction to translate the swivel arms 510 outwardly and in a second direction to translate the swivel arms 510 inwardly. Alternatively, a user may release the cartridge 300 from the swivel arms 510 without using the button, but may instead manually release the cartridge 300 by pulling the swivel arms 510 away from the cartridge 300 and disengaging the cartridge 300 from the swivel arms 510.

Figure 28A:
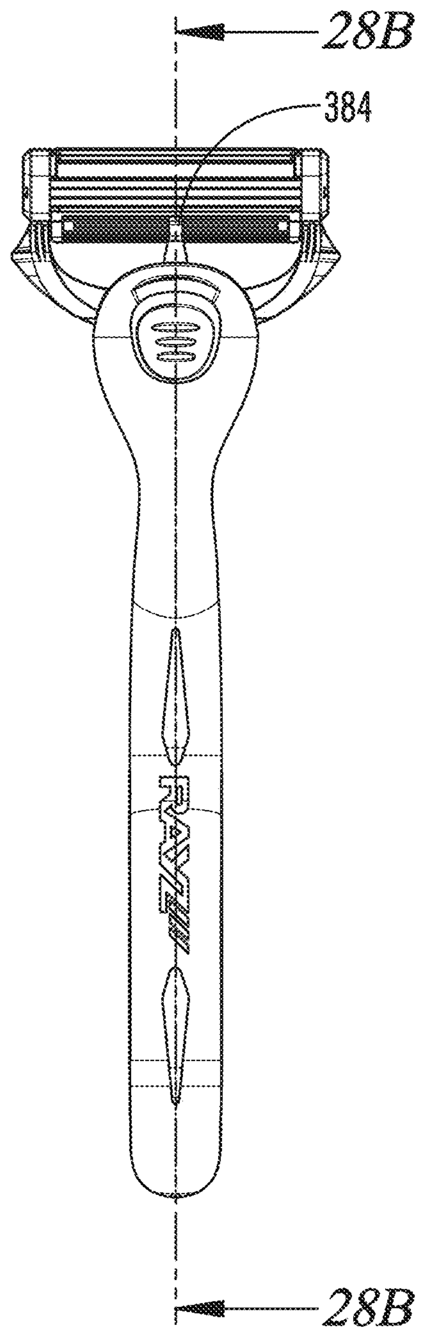
FIG. 28A illustrates one embodiment of a razor assembly with a cartridge in an in a fully upright orientation.
Figures 28B, 28C, 28D:
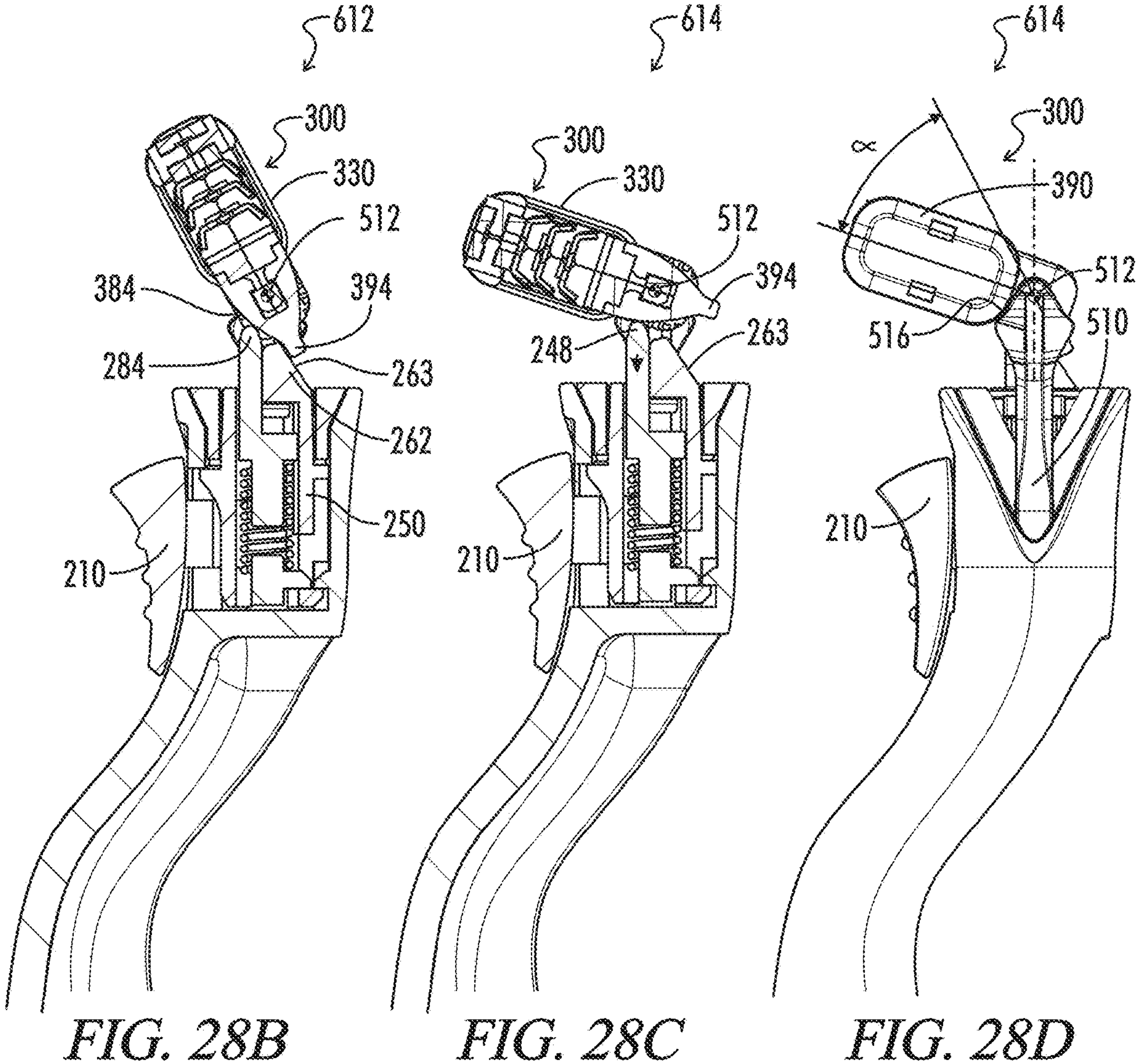
FIGS. 28B-28C is a cross section of the embodiment of FIG. 28A with the cartridge in two different orientations.
FIG. 28D is the embodiment of FIG. 28A with the cartridge in a fully rotated orientation.

The abutment portions 516 also prevent over-rotation of the cartridge 300 relative to the swivel arm connection 500 by functioning as a stop for the movement of the end caps 390 during a rearward rotation of the cartridge 300 as will be described below (and shown in FIG. 28D).

Figure 24:
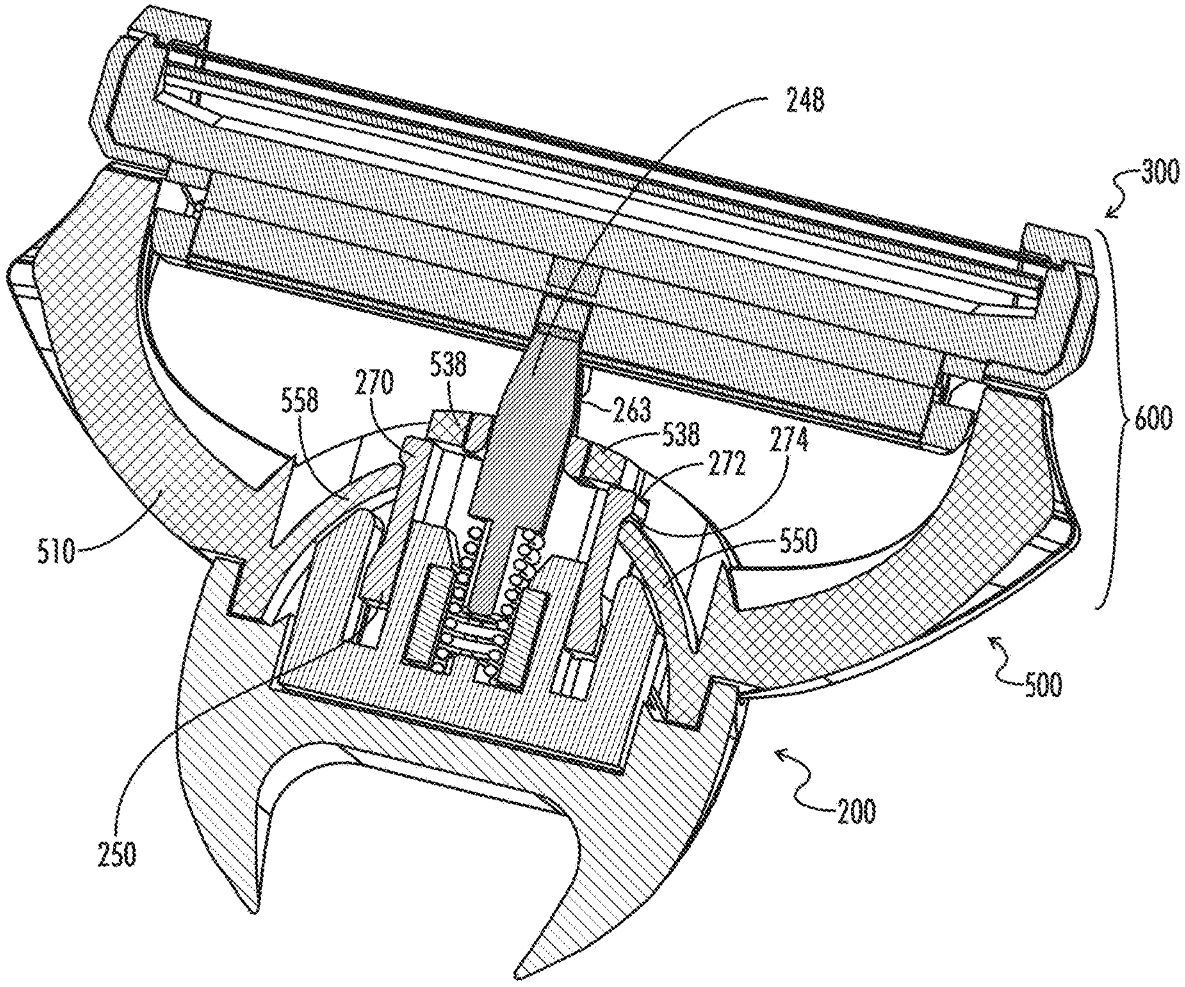
FIG. 24 is one embodiment of a cross-section of a portion of a razor assembly in accordance with the present disclosure.
Figure 25A:
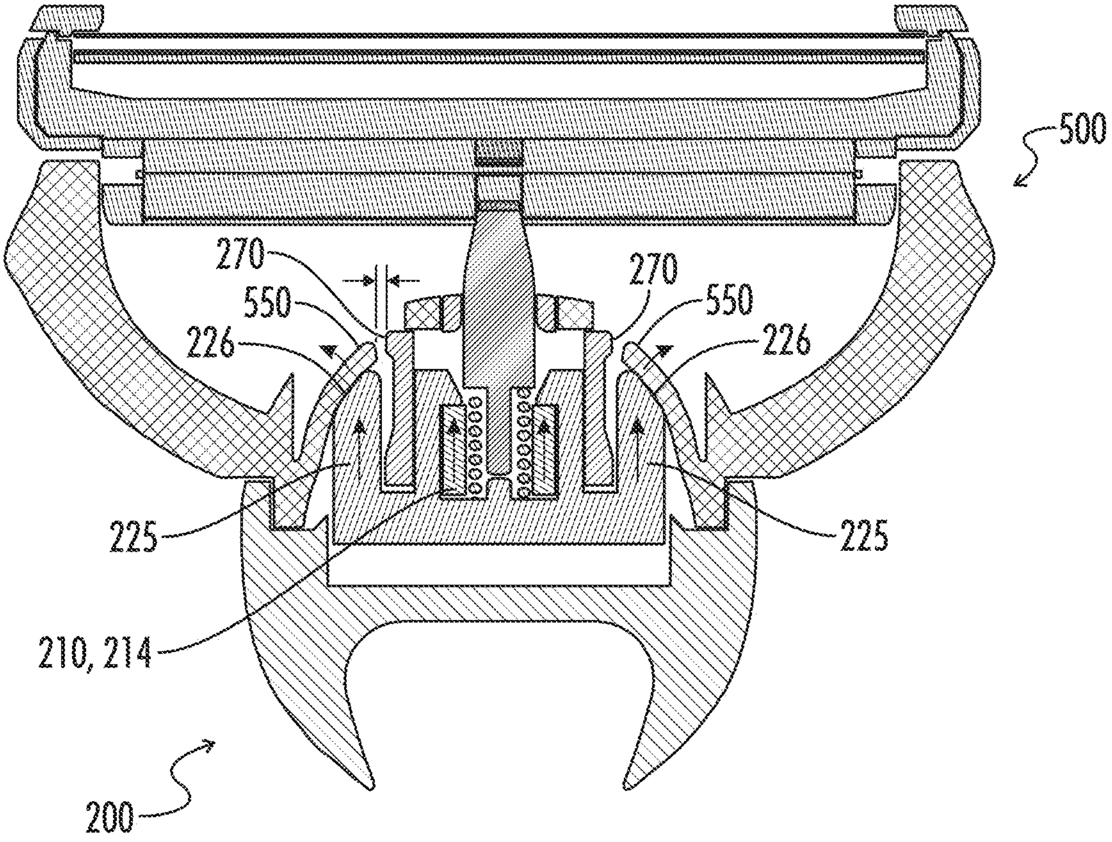
FIGS. 25A-25B illustrate one embodiment of a cross-section of a portion of a razor cartridge assembly being detached from the handle in accordance with the present disclosure.
Figure 25B:
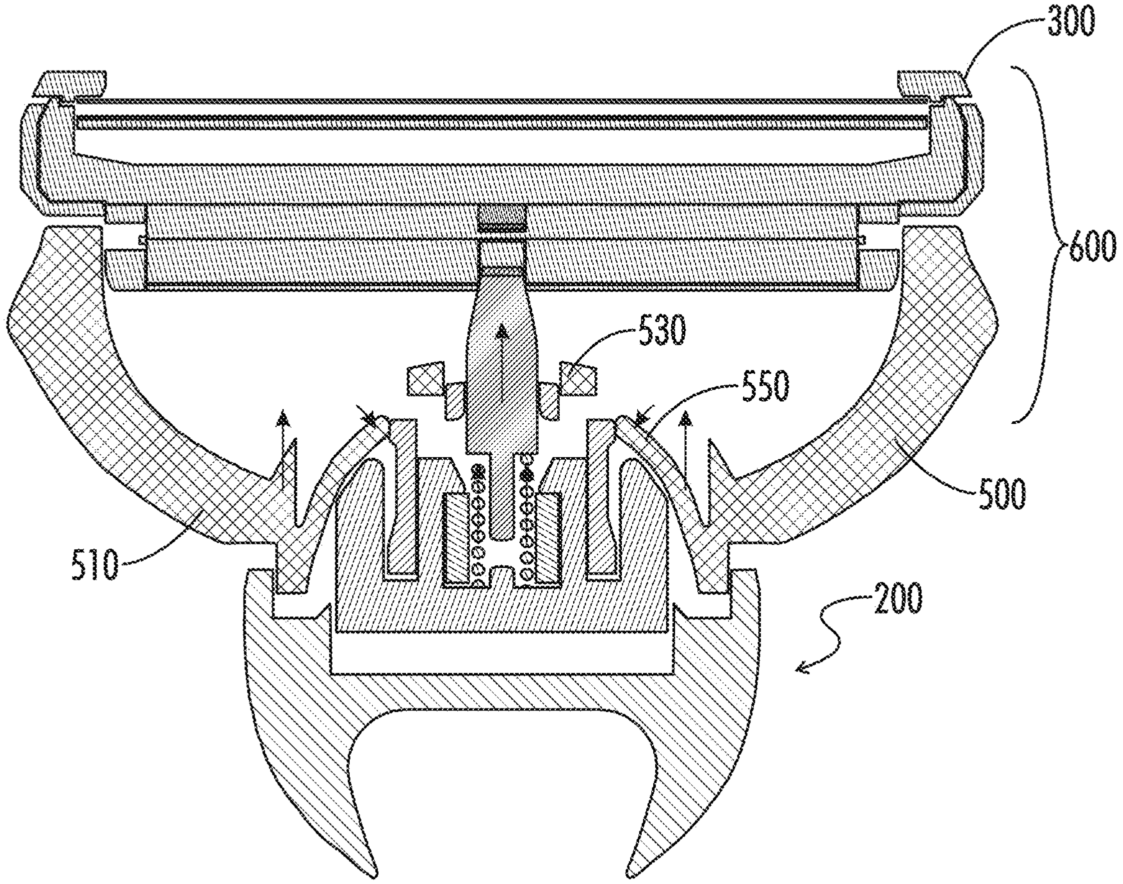

Returning to the swivel arm connection 500 (FIGS. 20A-20G), the connection body 530 further comprises an upper surface 532 having a central opening 534, a side opening 536 on either side of the central opening 534 with a wall 538 defined between the central opening 534 and each side opening 536, a hood 540 that fits within a gap 149 (FIG. 11A) defined between an upper inside wall 141 of the engagement end 140 and the connection block 250, and a plurality of spring arms 550 that engage with spring arm ledges 270 on the connection block 250, each spring arm ledge 270 having an engagement cam surface 272 and a disengagement cam surface 274. In an alternate embodiment shown in FIGS. 11B-11C, a hood 540*a* may be attached over an engagement end 140*a* of a handle in order to function somewhat as a female-type connection 540*a* that receives a male-type handle portion 140*a*, rather than, as shown in the embodiment of FIG. 11A, the hood 540 being received within the engagement end 140. As shown in FIG. 24, when the swivel arm connection 500 is pressed downward onto the connector structure 200, the pushpin 240 and upper extension 262 extend through the central opening 534, the spring arms 550 engage the engagement cam surface 272 and flex outwardly and move around the spring arm ledges 270 until the spring arms 550 are seated against the disengagement cam surfaces 274 and the spring arm ledges 270 are captured between the spring arms 550 and the walls 538. The movement of the spring arms 550 around the spring arm ledges 270 may result in a "clicking" sound, or a tactile sensation, or there might not be any noticeable sound and/or tactile sensation when the spring arms 550 become seated against the disengagement cam surfaces 274. When it is desired to disconnect the swivel arm connection 500 from the connector structure 200, a user simply pushes the button 210 and button arms 214 upward, which causes the cam end surfaces 226 on the outer arms 225 of the button release slider 220 to urge against the spring arms 550 and disengage from the spring arm ledges 270, which allows the swivel arm connection 500 to be lifted off relative to the connector structure 200.

Figure 20B:
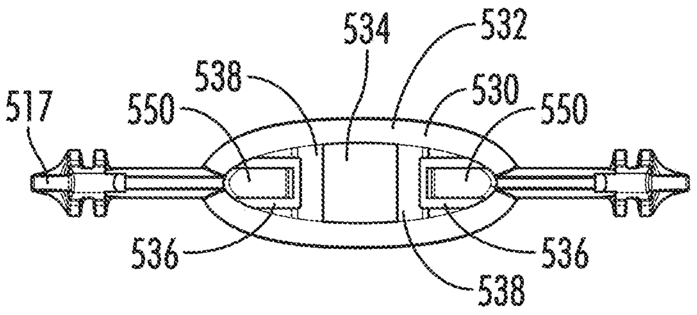
FIG. 20B is a top view.
Figure 20A:
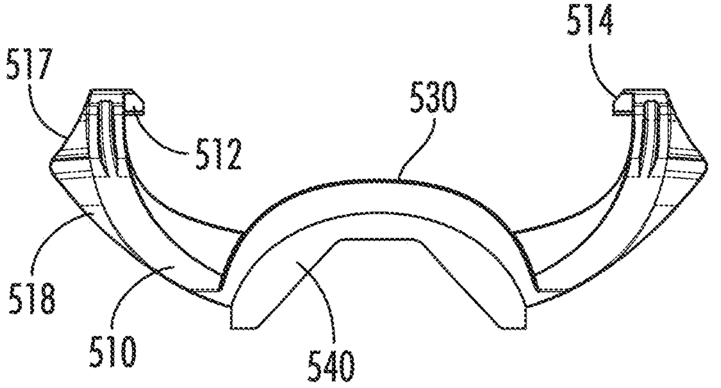
FIG. 20A is a front view.
Figure 20D:
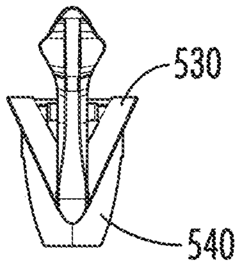
FIG. 20D is a side view.
Figure 20C:
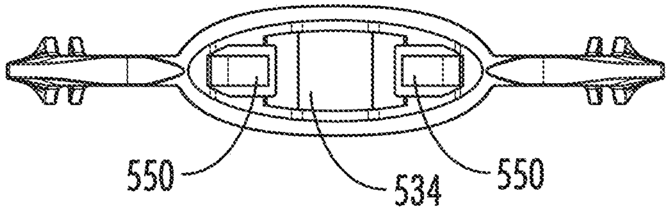
FIG. 20C is a bottom view.
Figure 20E:
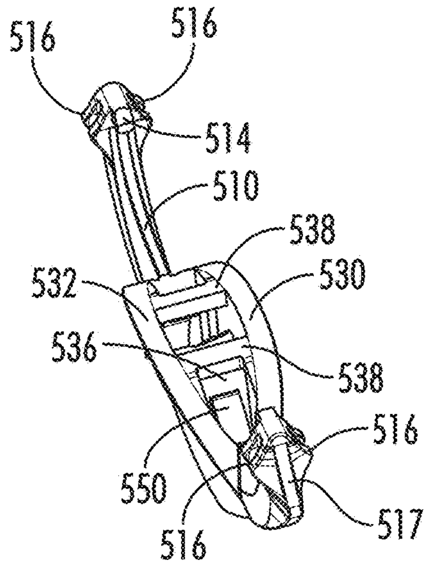
FIGS. 20E-20F are perspective views taken from the top.
Figure 20F:
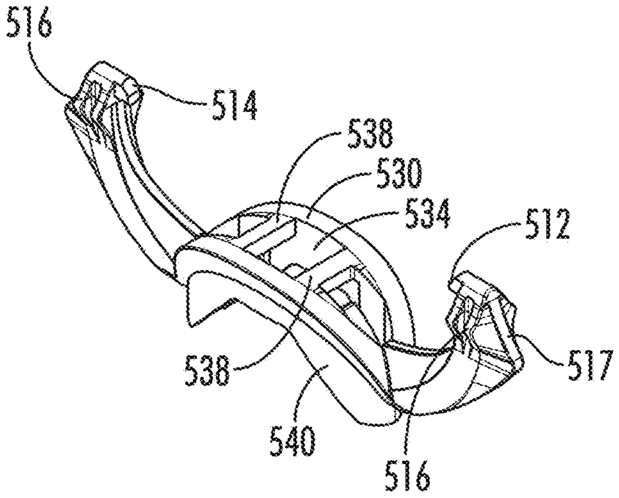
Figure 20G:
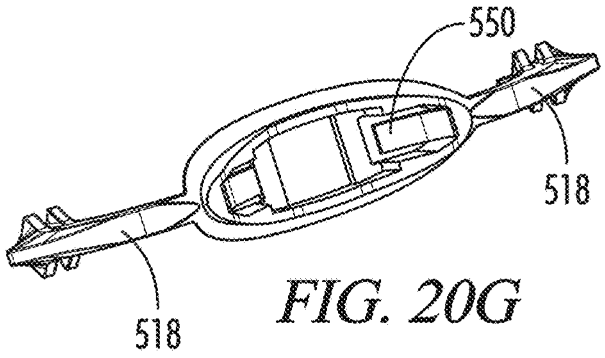
FIG. 20G is a perspective view taken from the bottom of one embodiment of a swivel arm connection in accordance with the present disclosure.
Figure 20H:
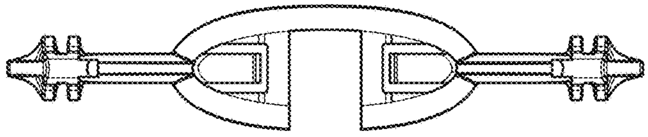
FIGS. 20H-20I show a second embodiment of a swivel arm connection in accordance with the present disclosure.
Figure 20I:
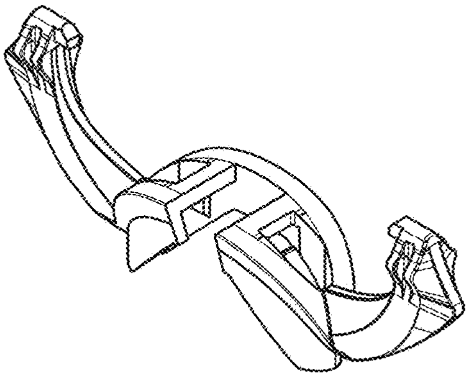
Figure 21A:
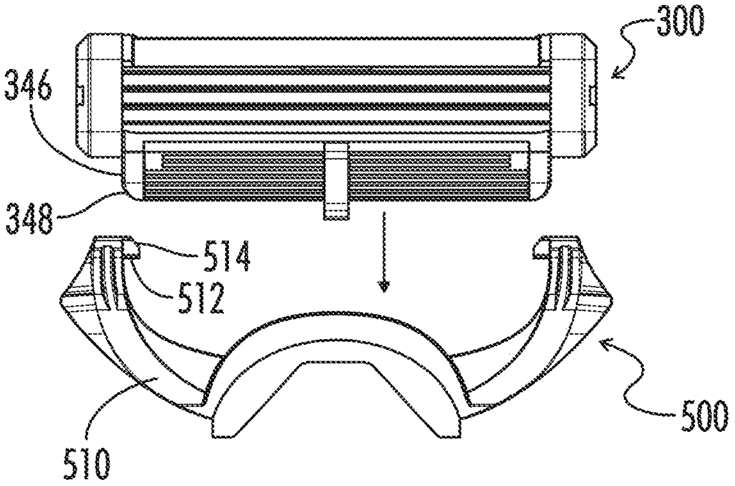
FIGS. 21A-21C illustrate one embodiment of an attachment of one embodiment of a razor cartridge with one embodiment of a swivel arm connection.
Figure 21B:
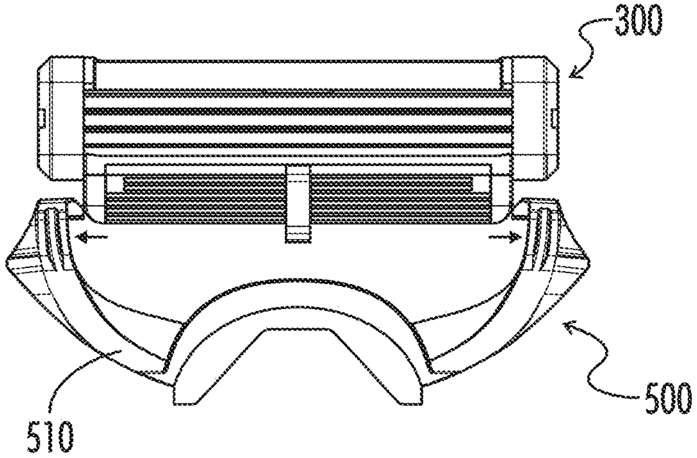
Figure 21C:
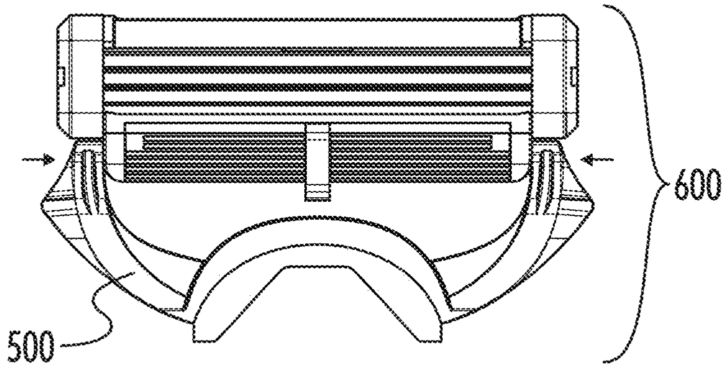

In some embodiments, the central opening 534 is open on one side, such that the upper surface 532 only exists on one side of the structure (FIGS. 20H-20I). In such embodiments, the connection body 530 retains additional flexibility, and once clicked into place is retained only by the seating of the spring arm ledges 270 between the spring arms 550 and the walls 538, without structural support from the upper surface 532. Accordingly, the swivel arm connection 500 may be reversed by flexing the connection body 530 outward such that the spring arm ledges 270 release from the connection body 530.

Figure 26A:
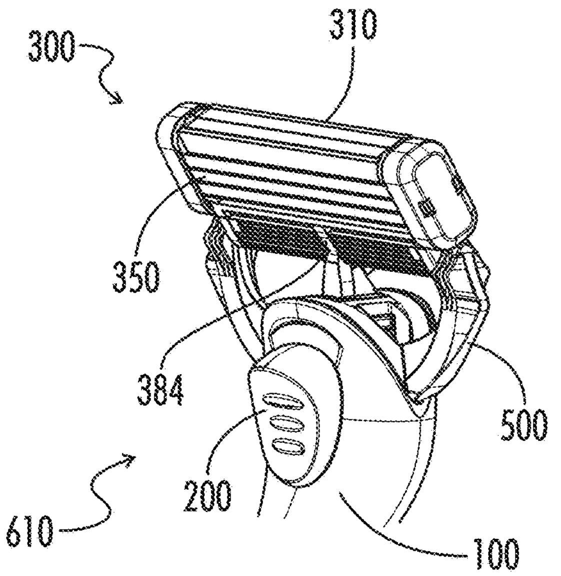
FIG. 26A is a perspective view taken from the front and FIG. 26B is a perspective view taken from the back of one embodiment of one orientation of a portion of a razor in accordance with the present disclosure.
Figure 26B:
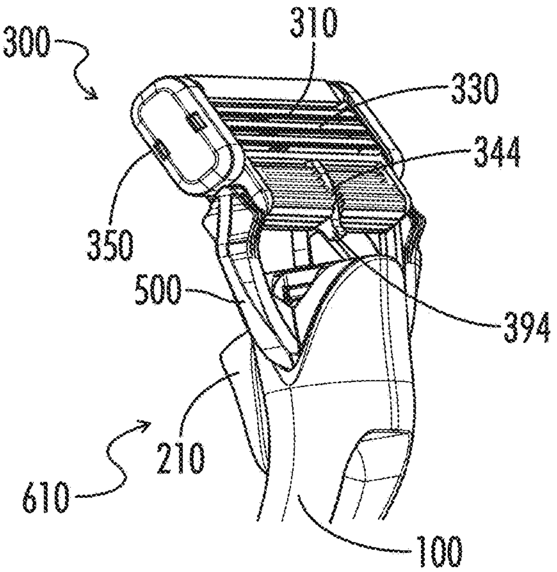
Figure 27A:
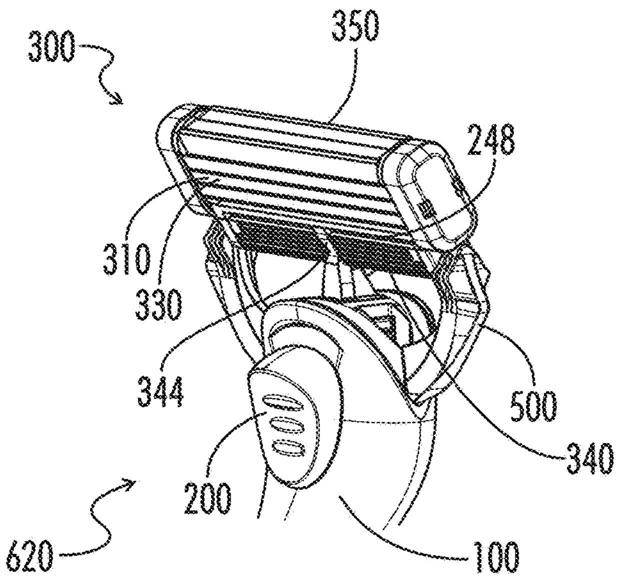
FIG. 27A is a perspective view taken from the front and FIG. 27B is a perspective view taken from the back of one embodiment of another orientation of a portion of a razor in accordance with the present disclosure.
Figure 27B:
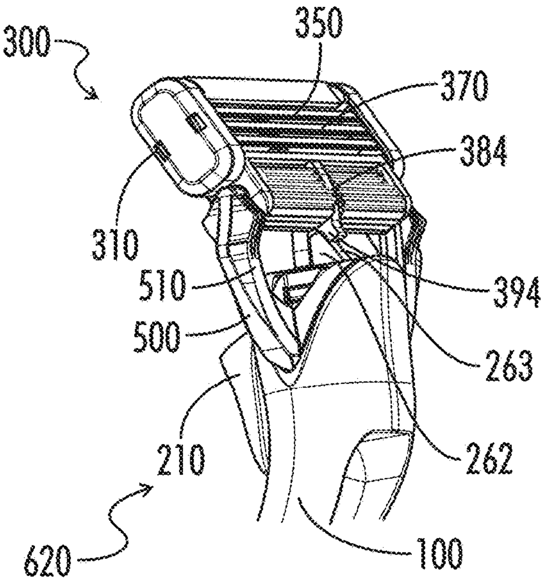

The orientation of the cartridge 300 relative to the handle 100 is switchable and reversible between a first orientation 610 (FIGS. 26A-26B) for shaving using one side of the cartridge, and a second orientation 620 (FIGS. 27A-27B) for shaving using the other side of the cartridge. The ability to reverse the orientation of the cartridge when one side gets dull allows a user to extend the life of the cartridge 300 and effectively get double the life out of a single cartridge 300. In one embodiment, in the first orientation 610, the first side 310 of the cartridge 300 and the first shaving region 330 face away from the button 210 on the handle 100, for shaving with the first shaving region 330. In one embodiment, in the second orientation 620, the second side 350 of the cartridge 300 and the second shaving region 370 face away from the button 210 on the handle 100, for shaving with the second shaving region 370. While the first and second orientations 610, 620 are defined relative to certain orientations of the cartridge 300 relative to the handle 100, it will be appreciated that the orientations may be reversed, or that different orientations may be operable.

While the assembly 600 of the cartridge 300 and the swivel arm connection 500 remains disconnected from the handle 100, the cartridge 300 may swing freely relative to the swivel arm connection or the swivel arm may swing freely relative to the cartridge 500 through the engagement of the swivel arm engagement pins 512 with the swivel arm engagement openings 346, 386. The cartridge and/or swivel arms can swing relative to each other along any angular rotation and any amount of degree from one side to the other. The cartridge may swing freely any amount of degree from one side to another. The orientation of the cartridge 300 relative to the handle 100 is determined when the assembly 600 is connected to the handle 100, whereby the guide tip 248 of the pushpin 240 extends through the central opening 534 of the connection body 530 and engages either the first track 344 or the second track 384 depending on the orientation of the cartridge 300 relative to the swivel arm connection 500.

If the assembly 600 is in the first orientation 610 (FIGS. 26A-26B), with the first side 310 of the cartridge 300 and the first shaving region 330 facing away from the button 210 on the handle 100, the guide tip 248 of the pushpin 240 engages and travels along the second track 384 on the lower pad area 380 as the cartridge 300 pivots in response to a user shaving along the first shaving region 330. As the user shaves with the first shaving region 330, the cartridge 300 pivots along the swivel arm engagement pins 512 from a fully upright orientation 612 (FIGS. 28A-28B), wherein the guide tip 248 of the pushpin 240 exerts an upward biasing force on the second track 384 that causes the cartridge 300 to pivot away from the button 210 and the interrupt 394 to abut the upper surface 263 of the upper extension 262 on the connection block 250, to a fully rotated orientation 614 (FIGS. 28C-28D), wherein the guide tip 248 of the pushpin 240 is depressed slightly and the end caps 390 impact the abutment portions 516 on the swivel arms 510 to prevent over-rotation of the cartridge 300 relative to the swivel arm connection 500. The abutment portions 516 act as stops for the rearward rotation of the cartridge 300 in the event the cartridge 300 is pivoted back far enough to impact the abutment portion 516, which may or may not happen during the normal course of shaving.

Figure 29A:
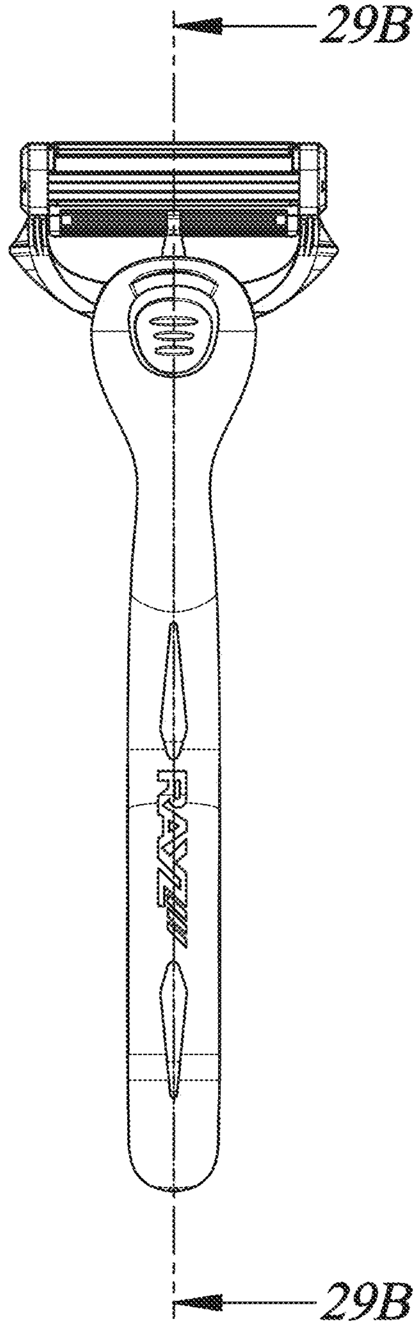
FIG. 29A illustrates the razor assembly of FIG. 28A with the cartridge in the second orientation.

Similarly, if the assembly 600 is in the second orientation 620 (FIGS. 27A-27B), with the second side 350 of the cartridge 300 and the second shaving region 370 facing away from the button 210 on the handle 100, the guide tip 248 of the pushpin 240 engages and travels along the first track 344 on the lower pad area 340 as the cartridge 300 pivots in response to a user shaving along the second shaving region 370. As the user shaves with the second shaving region 370, the cartridge 300 pivots along the swivel arm engagement pins 512 from a fully upright orientation 622 (FIGS. 29A-29B), wherein the guide tip 248 of the pushpin 240 exerts an upward biasing force on the first track 344 that causes the cartridge 300 to pivot away from the button 210 and the interrupt 394 to abut the upper surface 263 of the upper extension 262 on the connection block 250, to a fully rotated orientation 624 (FIGS. 29C-29D), wherein the guide tip 248 of the pushpin 240 is depressed slightly and the end caps 390 impact the abutment portions 516 on the swivel arms 510 to prevent over-rotation of the cartridge 300 relative to the swivel arm connection 300. The abutment portions 516 act as stops for the rearward rotation of the cartridge 300 in the event the cartridge 300 is pivoted back far enough to impact the abutment portion 516, which may or may not happen during the normal course of shaving.

Accordingly, the swivel arms 510 may include abutment portions 516 for supporting the end caps 390 of the cartridge 300. Accordingly the user may apply steady pressure while shaving, and the cartridge 300 will be applied to the user's face. Accordingly, the cartridge 300 may be any size or shape without affecting the range of travel of the cartridge head, since the cartridge head will rotate until the end caps 390 contact the abutment portions 516 in the event the cartridge is pivoted far enough to impact the abutment portions 516. The abutment portions 516 may be made up of any number of raised areas for contacting the end caps 390, and may be any size, shape, dimension and location. Typically, there may be two abutment portions 516 on each swivel arm 510 for a total of four. This allows the abutment portion 516 to be located independently for forward and backward directions. The abutment portions 516 may also be a single portion on each swivel arm 510, but with a middle portion removed, such that a two-walled section is created making up the raised abutment portions 516. The abutment portions can be any size or shape or location, so long as they are preferably symmetric for evenly supporting the cartridge 300. The abutment portions 516 may be positioned to preferably allow for 180 degrees of travel, or may allow for any other angular rotation.

In some embodiments, such as those shown in FIG. 46A-C, an end cap 900 is provided comprising a first angled surface 902 and a second angled surface 904. The angled points allow the abutment portions 516 to be smaller than they would otherwise be and may prevent larger elements from uncomfortably touching a user's skin. The end caps 900 can be part of the cartridge 300 or be connected to the cartridge 300 as a separate piece, the end caps 900 can be one to any number of pieces that can be a permanent attachment or be removable.

The interaction between the end cap 900 and the abutment portions 516 are vital for controlling the stopping of the cartridge head 300 while tilting back during shaving and when shaving pressure is applied. It creates the maximum tilting angle or stop point of the cartridge head 300. The pushpin 240 helps control the tilting back and forth of the cartridge head however this is not strong enough to have a stable stopping point when shaving pressure is applied. When shaving pressure is at its maximum pressure, it must have a strong stop point for the cartridge to rest against for a solid smooth shave. This is one of the reasons the end caps 900 and corresponding abutment portions are so important.

In the embodiment shown in FIGS. 46A-C, the end cap 900 is applied to both ends of the cartridge 300, as shown in FIG. 46C. Usually the ends caps are identically shaped however they can be shaped differently. There is an inside section 906 shaped to cover the cartridge end and configured to connect with the cartridge. In the embodiment shown, the cartridge has indents 908 and the end cap 900 has tabs 910 that fit into the indents. Accordingly, there is a snap connection shown. In other embodiments, there can be any type, or any number, of permanent connection or non-permanent connection between the end caps 900 and the cartridge 300.

The end caps 900 inside and outside areas can be any shape, size or design. The sides shown have a top flat side and the ends of the top side is rounded (or any shape) (rounded helps a smooth shaving surface) and transitions to each side. Then each side wall extends past the inner main body cavity where the cartridge goes inside. Starting from the left side and can be opposite if started from the right side, then it has rounded bottom edge or any shape (for smooth contact with skin if it touches), then the left inner side first angled surface 902 transitions at any angle upward toward the second angled surface 904. The first angled surface 902 to second angled surface 904 is the first angled portion, and the second angled point 904 is where the wall is angled toward the inner most flat middle part of the main body cavity. The second angled surface 904 to inner most middle segment 912 is the second angled portion.

The middle most segment 912 can have a flat or rounded shape and can have any shape and be any size, then it angles back downward towards the second angled point 904 which creates the second angled portion, then it angles outwards to the bottom most portion of the right inner side wall which is the first angled surface 902. The left and right inner side walls have two angles on each side and both angles go inward toward the middle most part of the main body cavity, we can call the 1st angled portion prong and angle stops. These two inner side wall added prong stops on each side of the 1st angled portion of the razor are very Important part of the invention. Usually the 1st angled portion is larger than the 2nd angled portion, however it can be any length, size or shape.

The middle segment 912 is raised relative to the first and second angled surfaces 902, 904, in order to provide clearance for the swiveling of the cartridge 300 relative to the swivel arms 510.

Without the first and second angled surfaces 902, 904, the abutment portions 516 alone are used to help stop the cartridge. The only way to decrease the angle of the stop was therefore to increase the size of the abutment portions 516. The problem is, in order to get the correct shaving angle for consumers, if the abutment portion 516 is too big, then more of the shaver will be exposed while shaving. This is a problem because these bigger or exposed surfaces will touch the user's skin while shaving because it can extend past the shaving surface, thus touching the user's skin and feeling uncomfortable.

By extending the first angled surface 902 beyond the edge of the cartridge 300, the first angled point can contact the abutment portion 516 resulting in exposing less of the abutment portion to the user's skin.

The left and right inner side walls of the first angled prongs stops each side of the cartridge, this is where the interaction happens between the swivel arm 510 and the inner left and right side of the first angle prong stops. When the first side of cartridge is used for shaving, the user shaves and when they shave and apply normal shaving pressure, the cartridge head 300 tilts back and the abutment portion 516 of the swivel arm 510 rests against each side of the first angled surface 902, preventing the cartridge from tilting back anymore and controlling the shaving degree angle. This angle can be any degree and usually can be adjusted by adjusting the angle or size of the inner first angled prong or adjusting the angle or size of the abutment portion 516 of the swivel arm 510. The contact between the abutment portion 516 of the swivel arm 510 and the first angled surface 902 of the end cap 900 occurs at both ends of the cartridge 300 simultaneously. However the end caps 900 may be configured to contact at different times, or only on one side.

When the first shaving side of the cartridge 300 is dull, the user switches to the second shaving side of the cartridge. Now when the user applies shaving pressure the swivel arm 510 stops rest and stop against the opposite side of the abutment portion 516 of the swivel arm 510 and against the second angled point 904 of the end cap 900. This controls the shaving angle and stops the cartridge from tilting back any further. One side is used when the one shaving side is being used and the other opposite side is being used when the second shaving side is being used.

It's important to know that the way we describe this can be achieved many ways with people skilled in the art, so let it be known that this function and purpose can be achieved any way known now or developed in the future.

It's important to remember that the end caps 900 are a portion of the cartridge 300 and can be connected to the cartridge 300 as a separate piece, one to any number of pieces and the end caps can be part of the cartridge and be the end portion or part of the cartridge. The cartridge 300 and end caps 900 and swivel arms 510 can have all features discussed in the application and have metal bands connecting the cartridge 300 or any way known now or developed in the future of connecting the cartridge 300 together. The end caps 900 can have rubber or any spring or cushion material on the end cap 900 stop area where it touches the cartridge head 300. This helps put pressure on the cartridge head 300 and when the cartridge head 300 is tilted back while shaving, it will compress the spring and cushion material inward. This allows pressure on the cartridge head at all times along with the pushpin 240.

In the embodiment shown in FIG. 46, the swivel arm 510 may have a swivel arm stop, or abutment portion 516 different from that in other embodiments. When the cartridge 300 tilts back and the end caps 900 or any portion of the cartridge 300 rests and stops against the swivel arm stop, or abutment portion 516, this is the maximum point where the cartridge 300 can swivel or tilt back while shaving. The abutment portion 516 stop can be any shape, design or size and in some embodiment, it may have a portion where the user can adjust the angle of the shaving by having a manual adjustment of the angle to their desired shaving angle. It can have a lever or a portion that you slide it move to reach the desired angle. Or it can be fixed item, and the only way to adjust the shaving angle is during the tooling process and the mold can be adjusted to allow more or less of the stop area material (plastic, rubber or any material) or section to be exposed which creates the shaving angle and the stopping point. The swivel arm 510 can be any shape, design or size and can be attached to the cartridge 300 any way known now or developed in the future. The swivel arm 510 can be removable or permanently connected to the cartridge.

The abutment portion 516 of the swivel arm 510 may have rubber or a cushion or spring type of material. This material or it can be an added part can help put pressure on the cartridge head 300 to be in a forward position, when not used. The added material can be part plastic and the cushion material can be TPR rubber or the added rubber material or any material injected in the mold.

In one embodiment where the connection block 250 does not include an upper extension 262, as the user shaves with the first or second shaving region, the cartridge 300 pivots along the swivel arm engagement pins 512 such that the guide tip 248 of the pushpin 240 exerts an upward biasing force on the first or second track 344, 384 that causes the cartridge 300 to pivot away from the button 210 and the interrupt 394 to abut the guide tip 248 of the pushpin 240 (FIG. 29E). The engagement of the guide tip 248 with the interrupt 394 prevents the cartridge 300 from inadvertently flipping to the other side, where the interrupt 394 acts as a stop to the angular rotation of the cartridge 300 relative to the guide tip 248.

Figure 30A:
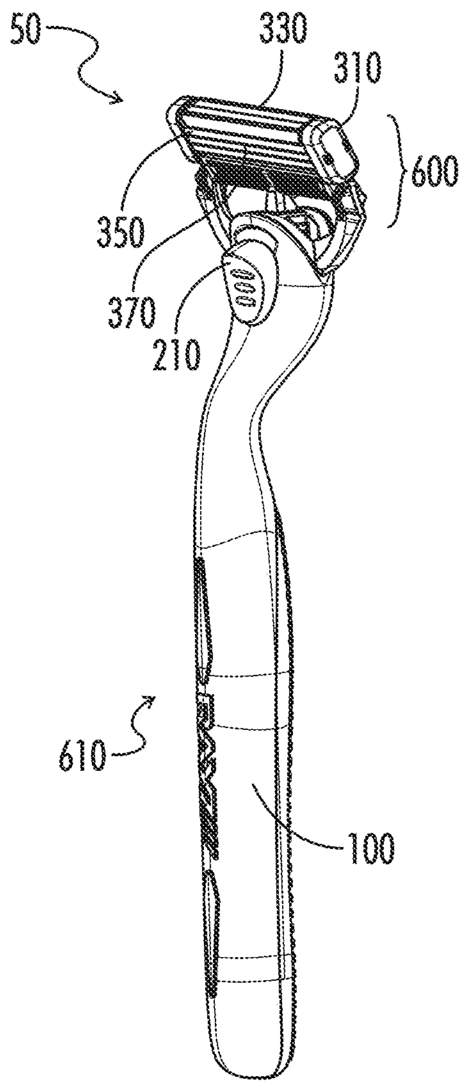
FIGS. 30A-30J illustrate the changing of the orientation of the razor portion of FIGS. 26A-26B to the orientation of FIGS. 27A-27B.
Figure 30B:
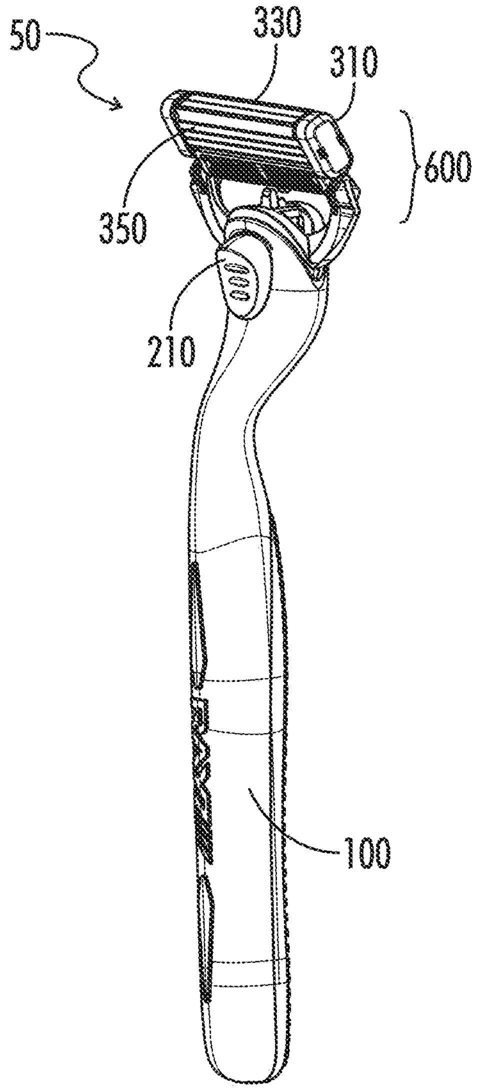
Figure 30C:
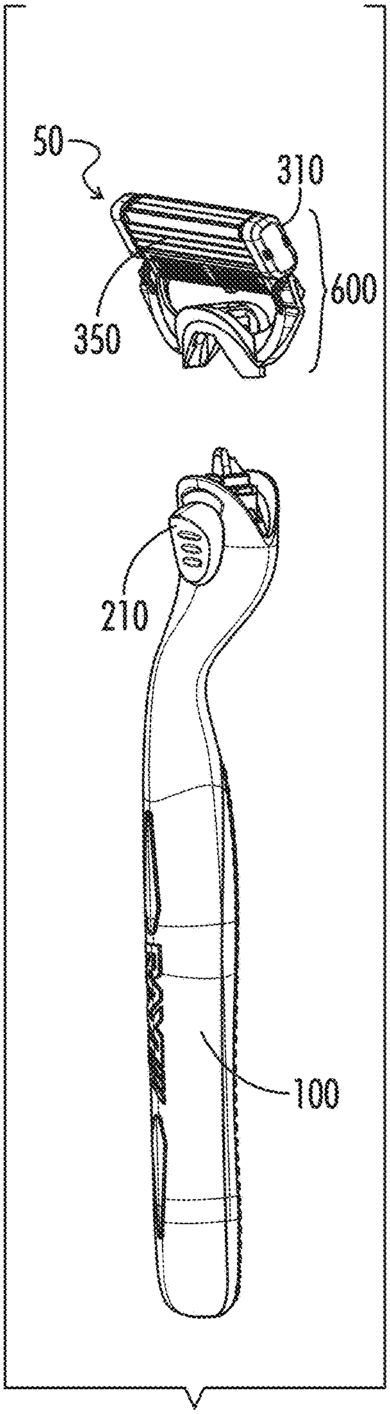
Figure 30D:
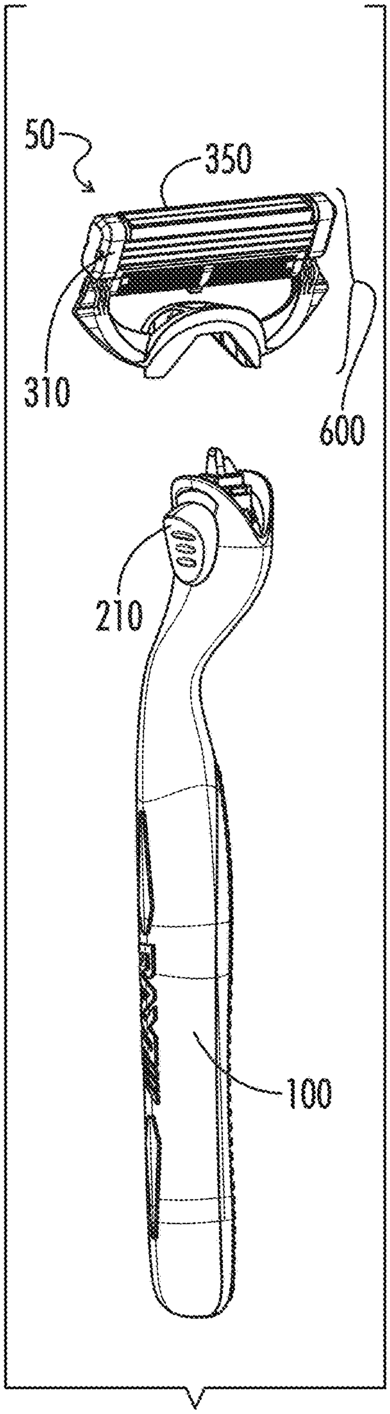
Figure 30E:
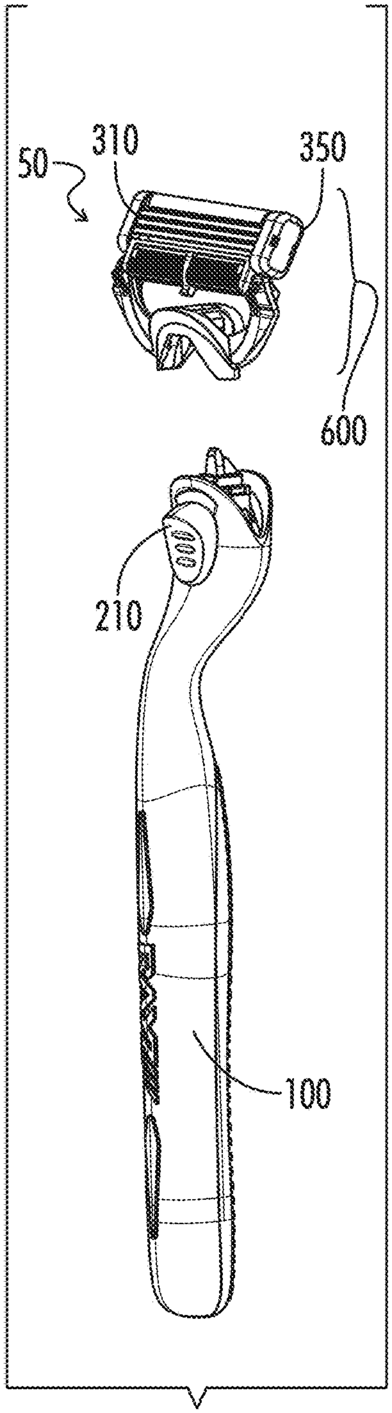
Figure 30F:
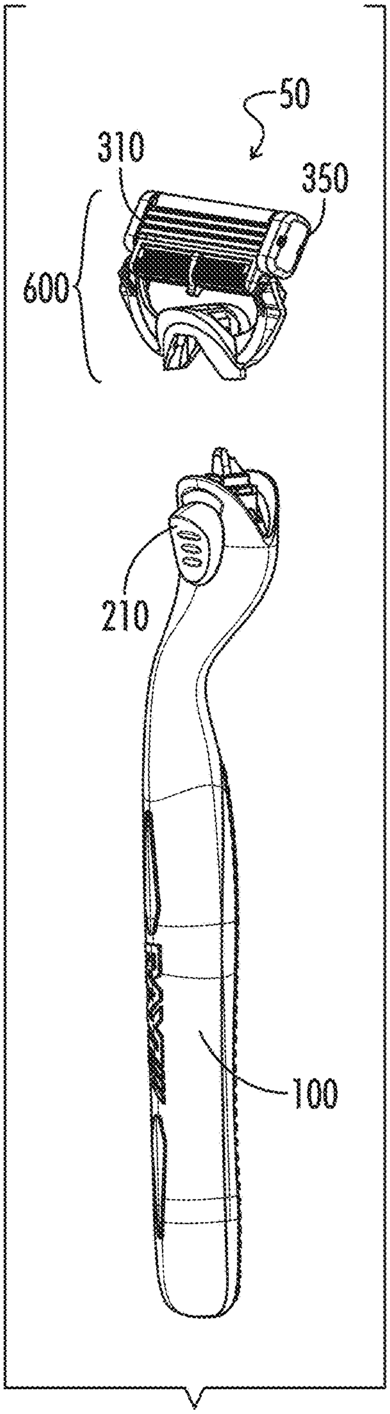
Figure 30G:
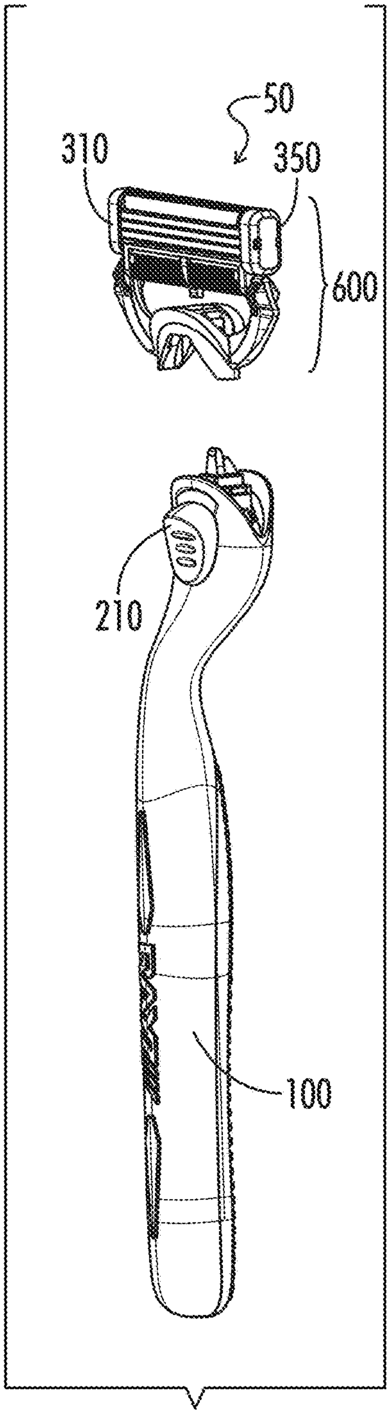
Figure 30H:
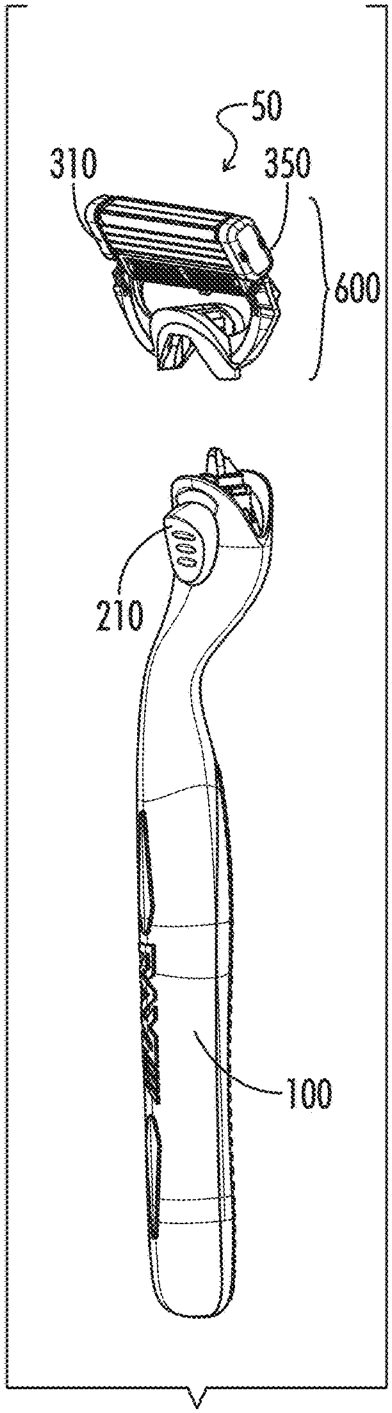
Figure 30I:
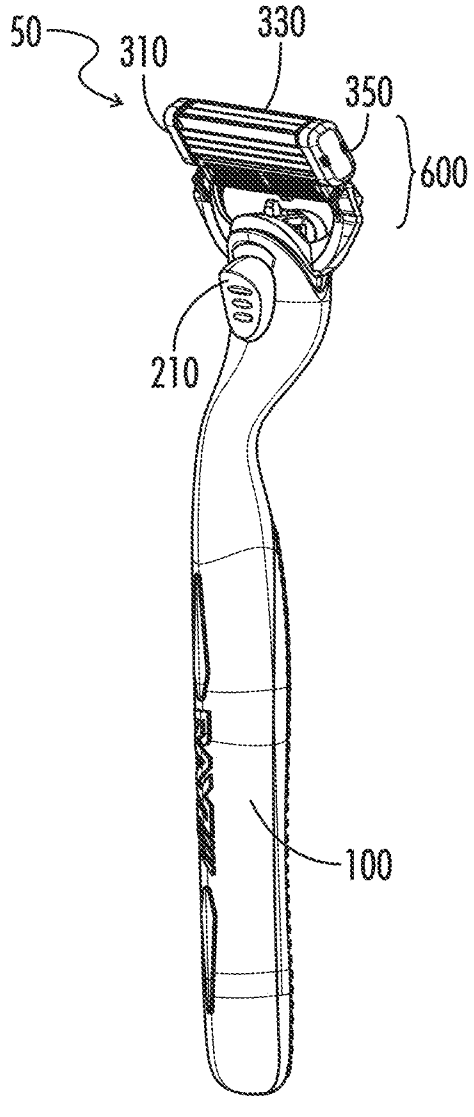
Figure 30J:
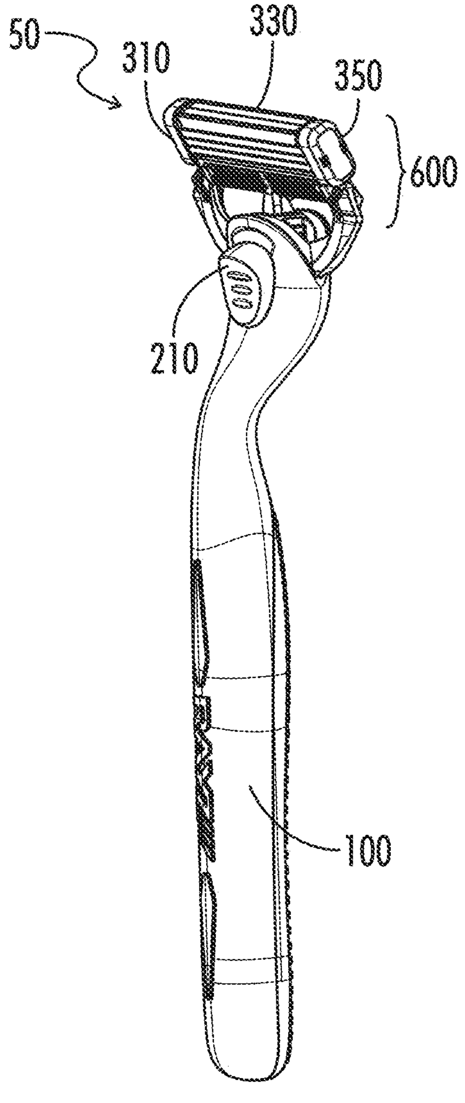
Figure 45A:
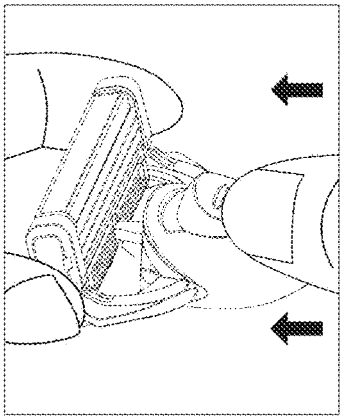
FIGS. 45A through 45E illustrate the detachment, the reversing and the re-attachment of one embodiment of a cartridge to one embodiment of a handle of the present disclosure.
Figure 45B:
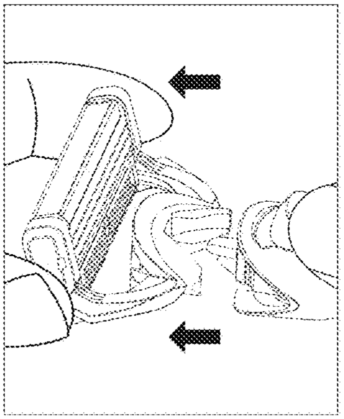
Figure 45C:
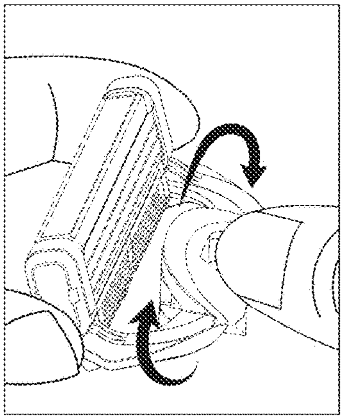
Figure 45D:
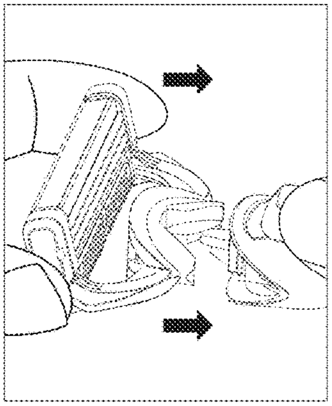
Figure 45E:
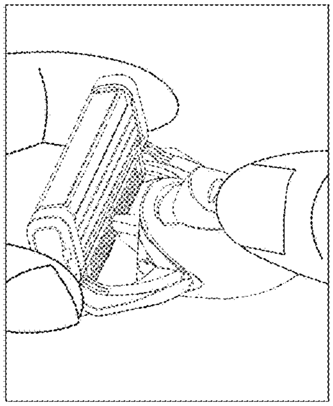

In the embodiment of FIGS. 28A-28D and 29A-29D, switching the orientation of the assembly 600 relative to the handle 100 from the first orientation 610 (FIG. 30A) to the second orientation 620 (FIG. 30I), and vice versa, in order to enable a user to shave with either the first shaving region 330 or the second shaving region 370, or vice versa, is very simple to accomplish. Starting with the razor 50 in the first orientation 610 (FIG. 30A) with the first shaving region 330 facing away from the button 210, a user would grip the handle 100 and press upward on the button 210 (FIG. 30B; FIG. 45A) with one hand, while gripping the assembly 600 with the other hand, in order to disengage and pull the assembly 600 away from the handle 100 (FIG. 30C; FIG. 45B). Once the assembly 600 is disconnected from the handle 100, the cartridge 300 floats freely relative to the swivel arm connection 500. The assembly 600 is then rotated into the second orientation 620 (FIGS. 30D-30H; FIG. 45C), with the second shaving region 370 facing away from the button 210, and positioned into alignment with the connector structure 200 on the handle 100. Prior to attaching the assembly 600 onto the handle 100, the cartridge 300 is pivoted backward (FIG. 30H; FIG. 45D) so that the interrupt 394 between the first and second tracks 344, 384 extends past the upper extension 260 and the guide tip 248 of the pushpin 240, so that when the assembly 600 is attached to the handle 100 (FIGS. 30I-30J; FIG. 45E), the interrupt 394 is positioned on the upper surface 263 of the upper extension 262 (FIG. 27B) of the connection block 250 and the guide tip 248 of the pushpin 240 engages the first track 344 (FIG. 27A) on the lower pad area 340. In a preferred embodiment, the cartridge 300 would not be able to be attached to the handle 100 while the cartridge 300 is vertically aligned with the handle 100 as shown in FIG. 30G because the interrupt 394 would impact the guide tip 248 of the pushpin 240 and prevent the connection of the assembly 600 with the handle 100. This is the reason why the cartridge 300 is preferably initially pivoted or angled relative to the swivel arm connection 500 prior to attaching to the handle 100. The pivoting or angling of the cartridge relative to the swivel arm connection should be just enough for the push pin to clear the guide tip and touch the first or second tracks.

In alternate embodiments, the process for switching the orientation of the assembly 600 relative to the handle may be similarly simple to accomplish. For example, in the embodiment shown in FIG. 23E-23F, the orientation of the assembly 600 is modified by re-orienting the cartridge 300. Accordingly, a user would first remove the cartridge 300 from the swivel arm connection 500 by gripping the handle 100 and pushing the button 210. The movement of the button 210 would then cause the swivel arms 510 to translate outwardly, releasing the cartridge 300. The user would then flip the cartridge around and reinsert the cartridge 300 in a rotated configuration so the second shaving side is the correct shaving position and release the button 210, such that the swivel arms 510 translate inwardly and grasp the cartridge 300. In positioning the cartridge 300, the user pivots the cartridge 300 so that the interrupt 394 between the first and second tracks 344, 384 extends past the upper extension of the guide tip 248 of the pushpin 240, as discussed relative to FIGS. 30H-J such that when the cartridge 300 is grasped by the swivel arms 510, the interrupt 394 is positioned on the upper surface 263 of the upper extension 262 as show, for example, in FIG. 27B.

Figure 31:
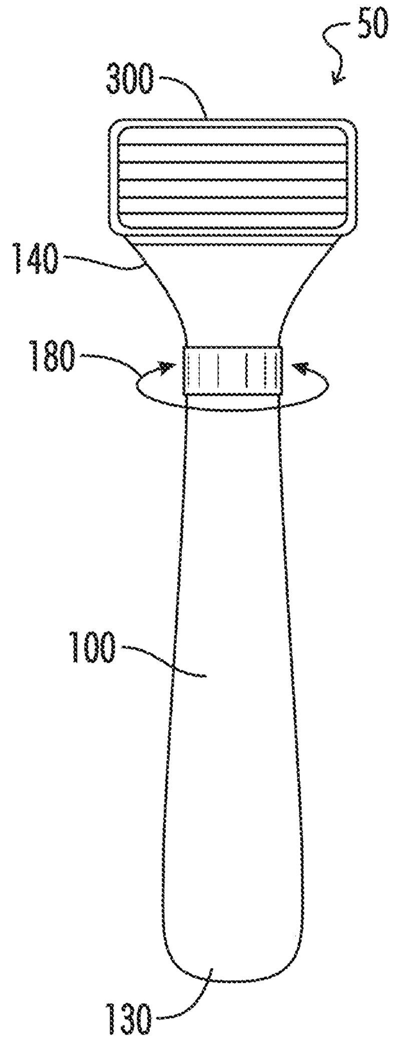
FIG. 31 is one embodiment of a razor of the present disclosure.

In another embodiment (FIG. 31), the handle 100 may contain a rotating joint 180 such that the engagement end 140 may be rotated relative to the free end 130. Such a configuration allows the connector structure 200 to be simplified by allowing for only a single orientation, or eliminated altogether and allowing for a fully disposable razor 50 including both a handle 100 and a reversible dual sided cartridge 300. Such a rotating joint 180 may be placed in various locations along the length of the handle 100 or neck section or any location such that the handle may still be contoured for comfortable holding without the user having to change the grip on the handle. Since the handle 100 is preferably ergonomically designed, when the user uses the first side and it becomes dull, by turning the cartridge around by the joint connection 180, it allows for the consumer to change the cartridge to the other shaving side easily and into the correct position so the ergonomic handle can be in position relative to the other shaving side. In this embodiment, the handle and grip are universal and can be used to hold the razor in any orientation of the cartridge relative to the handle 100. In such an embodiment, the orientation of the cartridge may be reversed by rotating the engagement end 140 of the handle 100 relative to the terminal end 130 about the rotating joint 180. The rotating joint 180 may further comprise a locking means (not shown) that must be released by, for example, pushing a button (not shown) to allow for rotation so that the joint 180 does not rotate during use. In one embodiment, the rotating joint may be limited to rotating 180 degrees or any other degree and may lock in place at either end of its range of motion. The rotating joint 180 may be a turntable mechanism of any kind known now or developed in the futures. Other types of joints are possible. The cartridge 300 may then be permanently connected or removable, or may be connected any of the ways described above. The embodiment of FIG. 31 can be utilized for non-disposable razors as well. The connection and rotating joint 180 can also be positioned at the junction of the cartridge with the handle. In an alternative embodiment, the rotating joint 180 can be applied to any of the other embodiment described herein, which may avoid the need to disengage and re-engage the cartridge relative to the handle. In one embodiment, after both sides of the cartridge have been used then the cartridge can be disconnected and another new cartridge be connected to the handle. The rotating joint can be any location on the handle or neck. It can be any shaper or design to accomplish this know now or developed in the future.

Figure 32A:
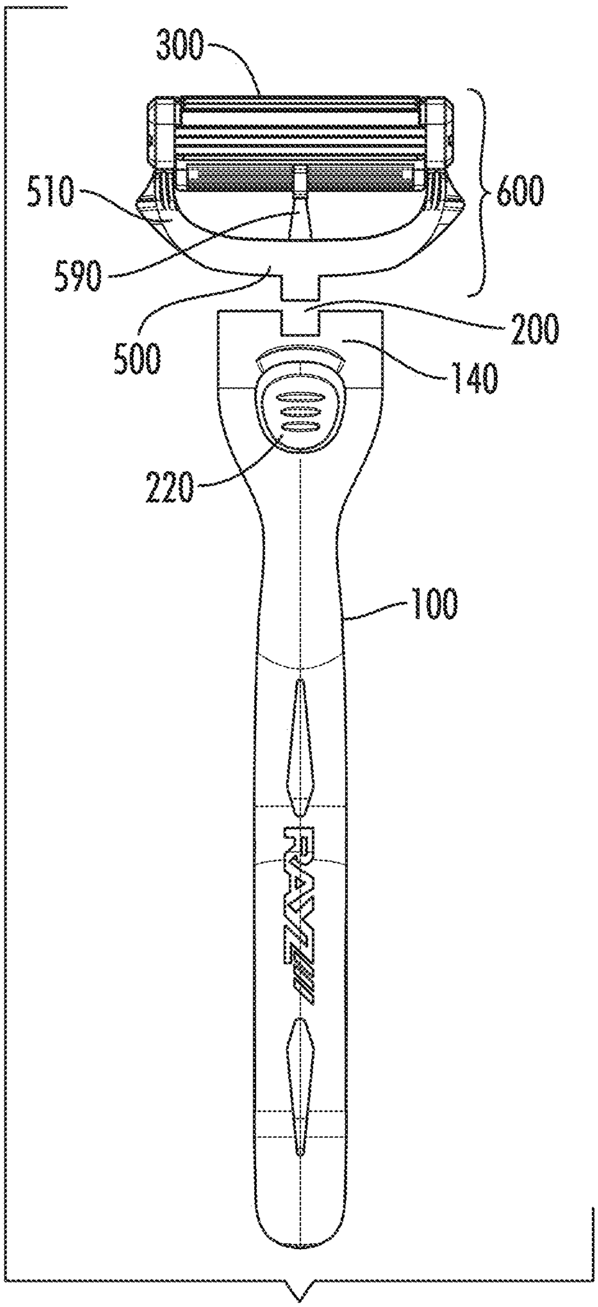
FIGS. 32A-32E illustrate one embodiment of a razor of the present disclosure.
Figure 32B:
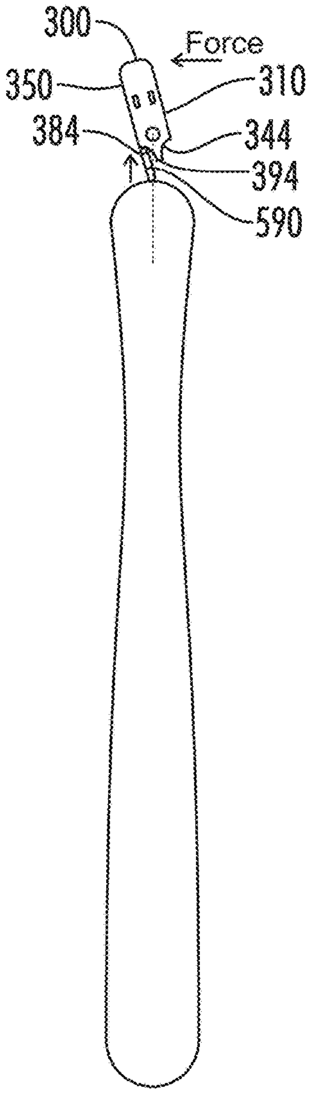
Figure 32C:
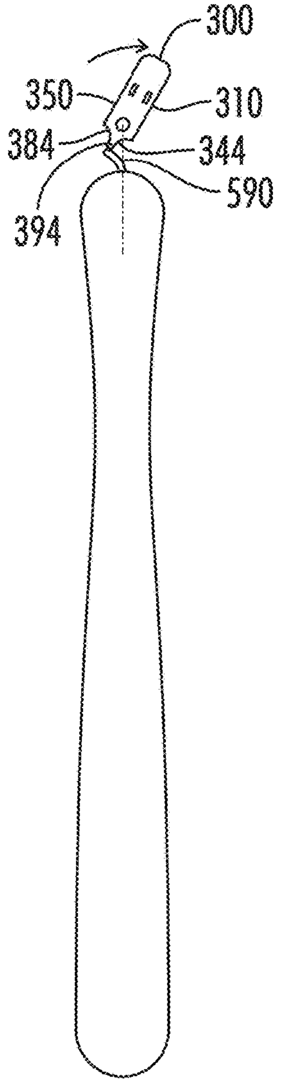
Figure 32D:
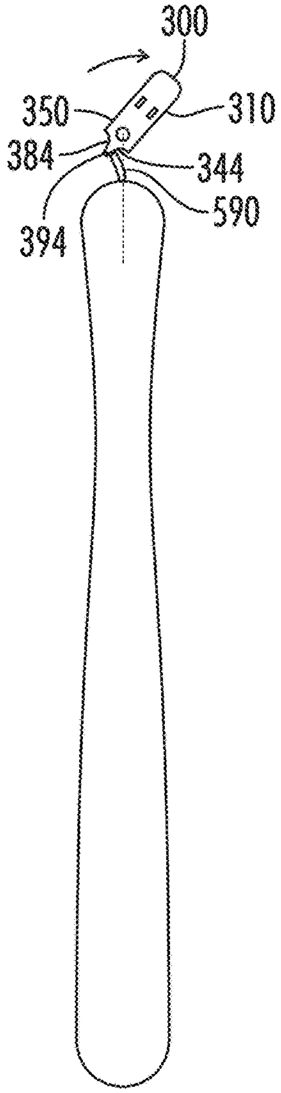

Such a rotating connection 180 may be similarly applied at an interface between a cartridge and swivel arm assembly 600 and the handle 100 in the embodiment of FIG. 32A for example, or between or a cartridge 300 and a swivel arm connection 500 as shown in the embodiments of FIGS. 33A-33D. In the embodiment of FIG. 32A, the cartridge and swivel arm assembly 600 terminate in a rotatable pin connection that interfaces with the engagement end 140 of the handle 100. In such an embodiment, the assembly 600 may be grasped by a connector structure 200 at the engagement end 140 of the handle 100. In order to reverse the orientation of the assembly 600, a user may press the button 220 to release the assembly 600, rotate the assembly 600, and reinsert the pin connection until it is grasped by the connector structure 200. In such an embodiment, the razor cartridge connects from the button side to the back side.

The embodiment of FIGS. 32A-32E further illustrates an embodiment of a razor 50 with no pushpin 240 extending from the handle 100. In this embodiment, wherein the swivel arm connection is not shown for better illustration of the relative movement of the cartridge to the handle, the handle 100 has a button 210, but does not have connection parts to connect to the swivel arms 510 and cartridge 300. Instead, the upper middle section of the swivel arm connection 500 has a flexible pin 590 that is preferably flexible although it can also be stiff. This design can be designed for disposable razors or non-disposable razors. For disposable razors, the flexible pin 590 and swivel arm connection (not shown) may be part of the handle and the cartridge can come assembled or connected to the swivel arm connection when the user buys it. Alternatively, the user may need to assemble the cartridge to the swivel arms as described herein.

Figure 32E:
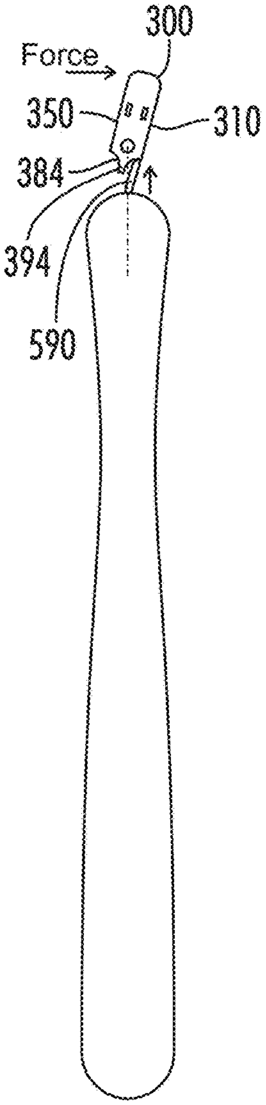

This flexible pin 590 may be located anywhere on the swivel arm assembly 500, cartridge 300, or handle 100, and may be permanently fixed or removable. It may be made of rubber, or it may be an injection molded portion of the swivel arm assembly 500. When the cartridge 300 is attached to the handle 100, the flexible pin 590 contacts the back side of the cartridge 300, such that when shaving pressure is applied, the cartridge head pushes the flexible pin 590 backwards and when pressure is relieved, the flexible pin 590 pushes the cartridge 300 back to its original position. The flexible pin 590 may extend along an axis of the handle 100, and may therefore extend vertically from the swivel arm assembly 500, or it may be bent at an angle or any location or degree of an angle. Accordingly, when the cartridge 300 is reversed so that a user may shave with the second side, the flexible pin 590 contacts the original shaving side, now the back side, of the cartridge 300. In the embodiment of FIGS. 32B-32E, the cartridge 300 may be forced past the flexible pin 590 when it is desired to switch the shaving sides of the cartridge 300, whereupon the flexible pin 590 initially contacts track 384 on the second side 350 of the cartridge 300 (FIG. 32B), and then is forced past the interrupt 394 (FIGS. 32C-32D) until the flexible pin 590 contacts the track 344 on the first side 310 of the cartridge 300 (FIG. 32E).

Figure 33A:
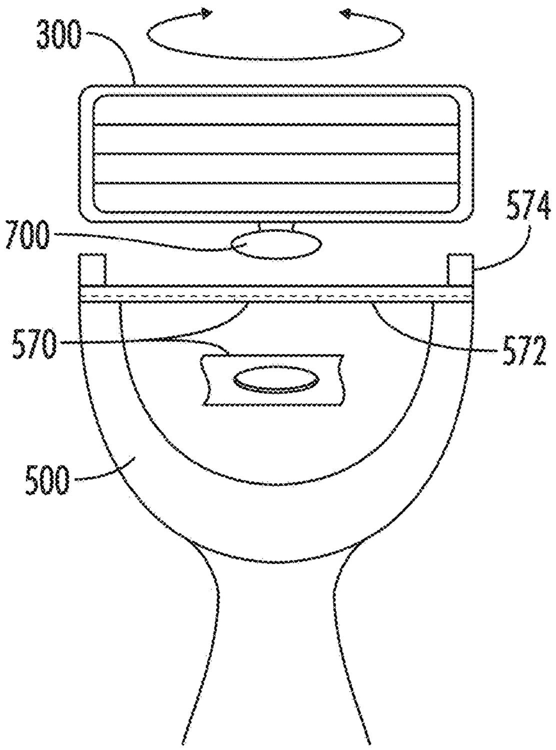
FIGS. 33A-33E illustrate the attachment of one embodiment of a cartridge to one embodiment of a handle of the present disclosure.
Figure 33B:
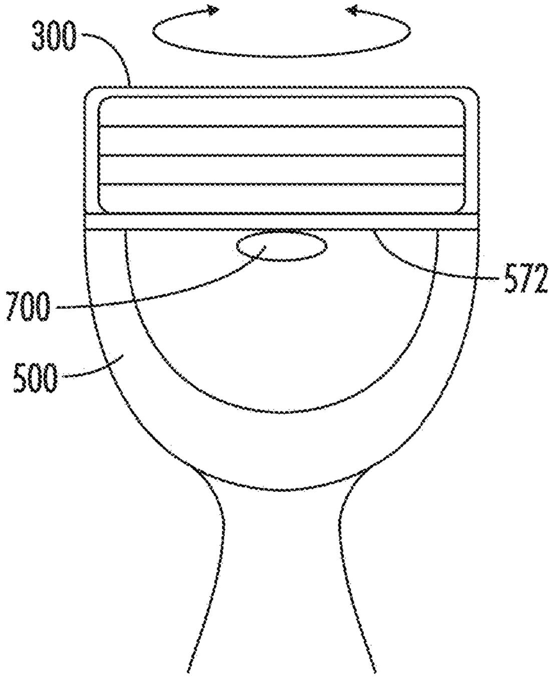
Figure 33C:
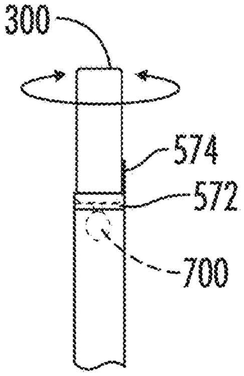
Figure 33D:
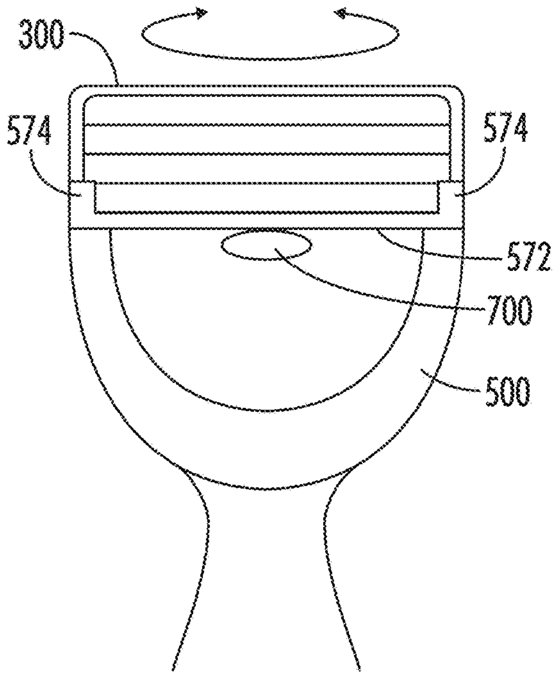
Figure 33E:
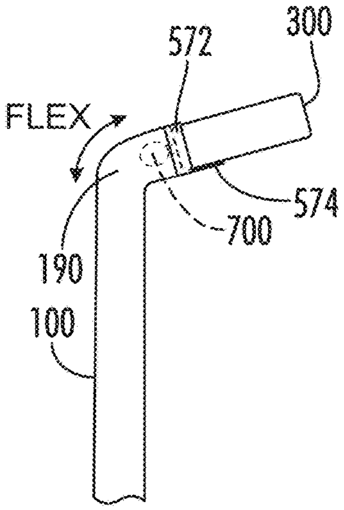
Figure 34A:
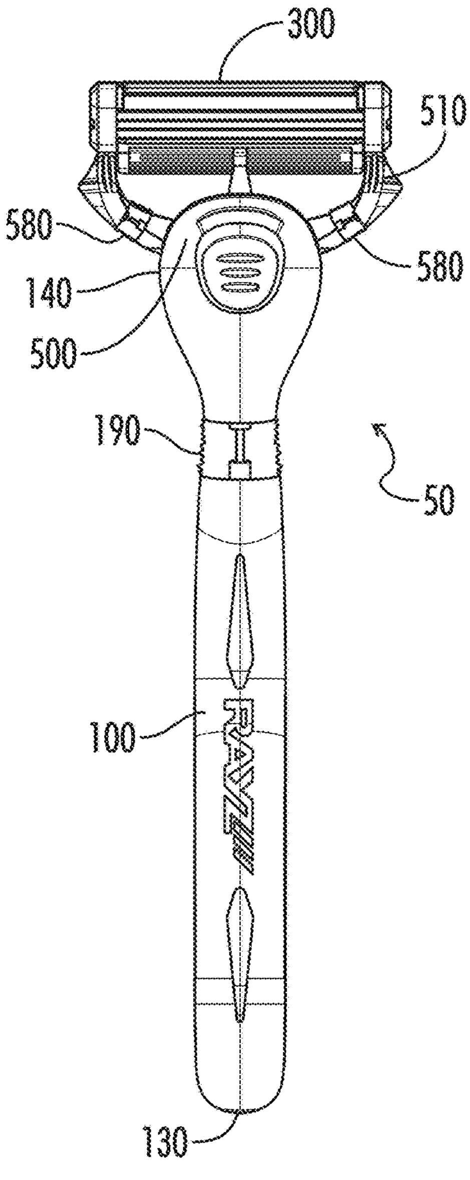
FIG. 34A is one embodiment of a razor of the present disclosure.
Figure 34B:
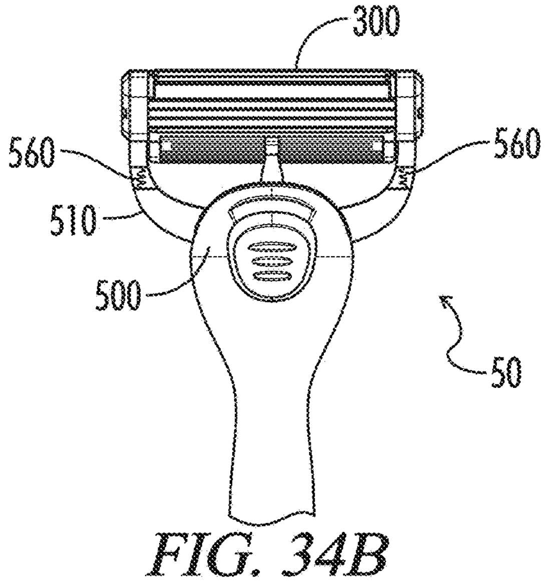
FIG. 34B is one embodiment of a razor of the present disclosure.

The embodiment of FIG. 33A-33E illustrates one embodiment of a fast and easy way to switch a dual sided razor cartridge 300 to the other side and replace cartridges. The cartridge 300, which in this embodiment is a dual-sided cartridge like any cartridge embodiment mentioned herein, with associated pads, pad areas, etc., is removably fixed to an arm assembly 500, which in this embodiment is stiff and does not swivel, at a ball and socket joint, with a ball joint 700 made of any material, or any design or shape or located anywhere and extending from a bottom of the cartridge 300 and a socket 570, that is located anywhere but is configured to mate with the ball joint 700, is maintained between the arms 510. In this embodiment, the arms 510 do not swivel, but instead flex at 574. In one embodiment, the socket 570 may simply be a hole in a surface smaller than the ball joint 700, and with one of the ball joint 700 and the socket 570 sized and manufactured from a material allowing for a snap fit assembly or some other flexible connection. In order to reverse the orientation of the assembly 600, a user may grasp the cartridge from the ends of the cartridge and pull it away from the swivel arm assembly 500 such that the ball and socket joint releases, rotate the cartridge 300, and reseat the ball joint 700 in the socket 370. The swivel arm assembly 500 may further comprise a cross bar 572 for retaining the socket 570 and braces 574 for preventing the rotation of the cartridge 300 when the ball joint 700 is seated in the socket 570. The braces 574 may be on only one side of the swivel arm assembly and can be any length or any number and any size or shape or location and be any material like plastic, rubber or the like that allows the joint to flex and bend and not break. It helps support the cartridge head while shaving and while shaving pressure is applied 500 so that they are visible from a back view (FIG. 33D) and a side view (FIG. 33C), but are not visible from a front view (FIG. 33B) and therefore do not interfere with the use of the razor 50. The embodiment shown further includes a flex point in the swivel arm assembly such that the cartridge 300 may flex relative to the handle 100 (FIG. 33E). The razor 50 or any dual sided razor may further contain a variety of flex points or swivel points (FIG. 34A-34B).

Figure 34C:
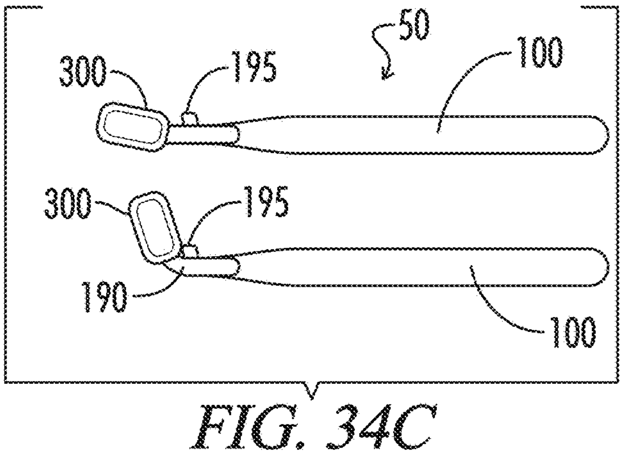
FIG. 34C is one embodiment of a razor of the present disclosure.

In some embodiments, a flex point 190 may be provided in the handle 100 such that the engagement end 140 may flex relative to the free end 130. This may be for the purpose of absorbing shocks during use, or while shaving over different contours of the shaving surface and the mechanism applied may be, for example, a spring loaded mechanism or a short segment of the handle 100 made of a flexible material or can be in any location designed or be any shape any type known now or developed in the future. In one embodiment, flex points 580 may be provided in the swivel arm connection 500, allowing the swivel arms 510 to act as shock absorbers while shaving over different contours of the shaving surface. Such flex points 580 may be provided in various configurations, and may utilize different mechanisms (FIGS. 34A-34B). Alternatively, a neck of the razor 50 may comprise a flexible material, allowing the cartridge 300 to flex relative to the handle 100 (FIG. 33E; FIG. 34C). In some embodiments, the various flex points may be provided as a hinge, and may be configured to have an appropriate resistance. Alternatively, the swivel arms 510 may be made of a flexible material, and they may taper to create the appropriate amount of flexibility at various points in the swivel arm 510. Alternatively, a portion of the connection body 530 may be flexible instead of the swivel arms 510 themselves.

A hinge area may be rubber, plastic, or have a rubber coating, or may be made of a combination of materials. There may be any number of flex hinges at different portions of the razor 50. Other embodiments including other flexible features along any portion of the razor are possible. In certain embodiments, the neck may further comprise a stop area, or block support 195 (FIG. 34C), that is designed to support the razor 50 while shaving. Accordingly, while shaving the neck of the razor 50 will flex, but it will not flex beyond the point where the cartridge 300 contacts the block support 195. In one embodiment, the block support, which can be any size or shape or be located anywhere, 195 is positioned to impact a portion of the cartridge 300 other than the blades, such as the first track 344 or the second track 384 depending on orientation of the cartridge 300 or other locations on the cartridge 300. The block support 195 may comprise a variety of materials, or a combination of materials. In some embodiments, it is configured to consistently contact the cartridge 300 such that it always resists flexing. In some embodiments the block support 195 compresses, and the compression resistance increases depending on the configuration of materials incorporated. Other constructions are possible.

Figure 35:
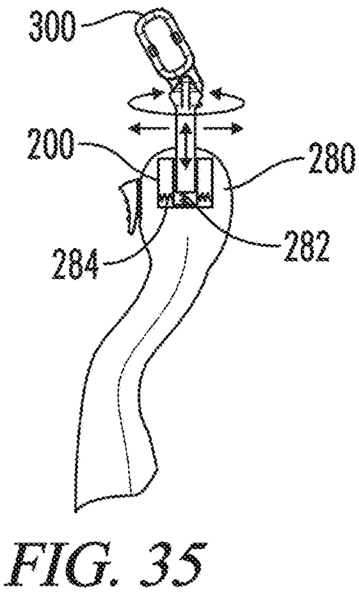
FIG. 35 is one embodiment of a razor of the present disclosure.

In one embodiment, the razor 50 may further utilize shock absorbing mechanisms in the connector structure 200 (FIG. 35). In one embodiment, the connector structure 200 may contain its own independent shock absorption mechanism 280 in the portion of the structure 200 seating the hood 540 of the swivel arm connection 500, for example. Accordingly, the connector structure 200 may contain in any location a vertical spring 282 and a plurality of horizontal springs 284 for adding some flexibility to the seating location. Accordingly, the hood 540 may be provided a stable seating, but may be flexible in the event of a shock applied to the cartridge 300. Such a mechanism may further allow for some rotation of the cartridge 300 relative to the handle 100. Other shock absorbing constructions are possible and contemplated that are known now or developed in the future.

Figure 36:
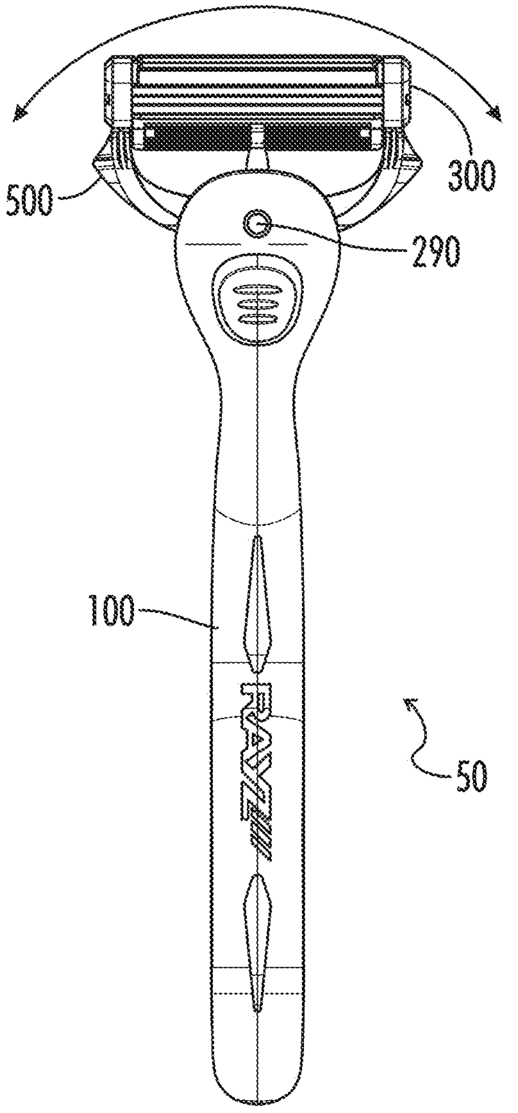
FIG. 36 is one embodiment of a razor of the present disclosure.

In one embodiment, a razor 50 may further provide a pivot 290 within the connector structure 200 (FIG. 36) such that the cartridge 300, along with the swivel arm connection 500 may swivel relative to the handle 100 from side to side, allowing for the cartridge to match contours of a user's face, for example, while shaving. Such a side-to-side movement may allow for additional shaving flexibility, and may have a pivoting point or axle, coil, or any other mechanism for allowing such a pivot 290. Pivoting such a cartridge 300 may apply tension to the mechanism at the pivot point 290, such as a coil, which forces it back to a straightened position. This may be implemented in a variety of ways, including by incorporating additional flex points, or by combining the described pivot point with other flex points described elsewhere.

Figure 37:
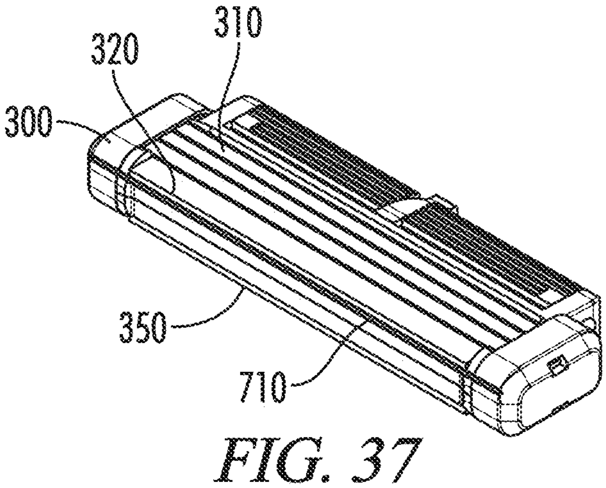
FIG. 37 is one embodiment of a cartridge for a razor of the present disclosure.

In one embodiment shown in FIG. 37, the razor 50 may further provide a trimmer blade 710 recessed into the cartridge 300. Such a trimmer blade 710 may be applied to one or both sides 310, 350 of the cartridge 300 and may be located above the upper pad area 320, or recessed behind the upper pad area 320, or in a different locations. Such a trimmer blade 710 may assist users in shaving hard to reach places, and may be used from either side of the cartridge 300. Alternatively, separate trimmer blades 710 may be provided on each side. The trimmer blade 710 may assist in straightening out a shave at particular locations, such as sideburns. The trimmer may comprise multiple blades, and may be angled and located in a variety of ways other than that specifically shown in the figure. In certain embodiments, the trimmer blade 710 may only be provided on one side of the cartridge so that, for example, a user may shave with one side and then flip the cartridge around to finish off with the trimming blade on the other side of the cartridge.

Figure 38:
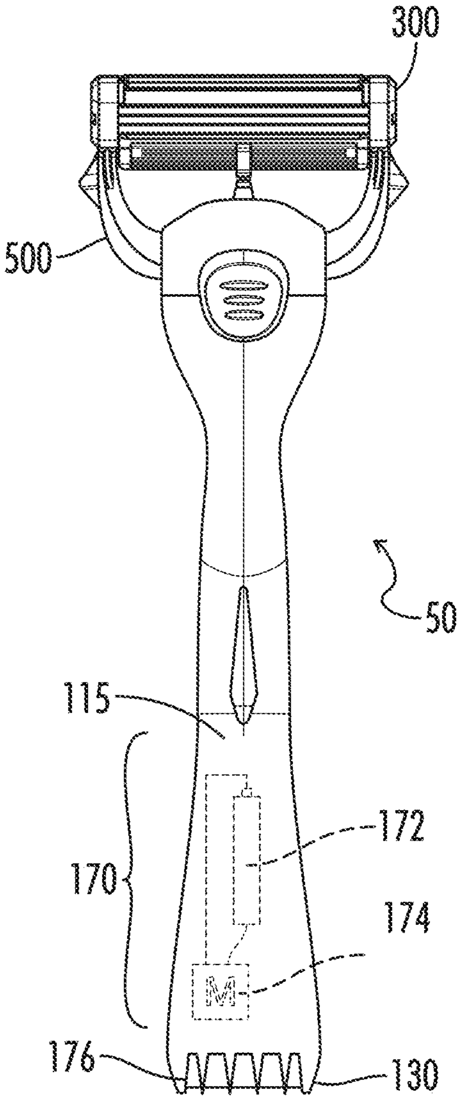
FIG. 38 is one embodiment of a razor of the present disclosure.

In one embodiment, the handle may contain a vibration assembly 170 including a power source, such as a battery 172, and a motor 174 (FIG. 38). This may be located in the chamber 115 of the handle 100. Alternatively, or in addition to a vibrating feature, a battery powered trimmer 176 may be provided, utilizing the same battery 172 as the vibration assembly 170, for example. In one embodiment, the trimmer 176 may be located at the free end 130 of the handle 100. Accordingly, one end may have a trimmer while the second end has the dual sided razor cartridge 300. In an alternative embodiment, a trimmer may be attached to the razor 50 as if it were a cartridge 300, such that the head types are interchangeable. Such a configuration may require a power system to be routed through the cartridge 300 and connector structure 200, which may be in any way now known or created in the future. In one embodiment, instead of have the trimmer on one end, another embodiment has the dual sided razor cartridge and can be replaced with a battery-operated trimmer. So the same end can be used as a dual sided razor and when need used as a trimmer.

In one embodiment, the handle 100 may be provided with an illumination feature, such as LED lights, on/off switches or buttons, and indicators for electronic purposes, such as battery level, on/off, etc. The trimmer may have a variety of designs now known or developed in the future. It can be any size or shape, and may use any number of blades. It may have adjustable guards to adjust the length of hair to be trimmed or cut. It may be permanently attached to the handle, or it may be removable and replaceable with different components, such as a nose hair trimmer designed to utilize the same battery 172 and motor 174.

In one embodiment, each end of the razor 50 may be provided with a cover or a shroud, such that the cartridge 300 may be covered when the trimmer 176 is in use, and vice versa. This prevents a user from cutting himself when holding the unit.

While the embodiments of the swivel arm connections 500 discussed herein show a pair of arms, it will be understood that other embodiments are contemplated including, but not limited to, replacing the pair of arms with a single swivel arm, such as a cantilevered swivel arm design, or a larger plurality of arms, for additional stability. Further various additional connection mechanisms are contemplated, including all those now known or developed in the future. In embodiments where the connection is engagement pins in the swivel arms 510 that are embedded into openings in the cartridge 300, any number of pins may be provided, and they may be provided in a number of shapes. For example, a shaped pin may be used to limit the rotational travel of the cartridge 300 with respect to the swivel arms, in place of an abutment portion, for example. The pins may be slanted or tapered to allow for easier deposit of the arms, and the swivel arms 510 may be configured to flex in various directions for allowing the insertion of engagement pins into the cartridge 300. In one embodiment, the connection between the cartridge and swivel arm connection may be permanent, such that consumers remove the entire cartridge and swivel arm connection assembly 600, or in one embodiment the connection between the cartridge and swivel arm connection is removable such that the consumers may replace the cartridge 300 independent of the swivel arm connection. Accordingly, in one embodiment, the engagement pins may be flattened on one side to make them more difficult to remove once placed within the cartridge 300, resulting in a permanent or semi-permanent connection.

The engagement pins may be any shape, size, location, etc., and may be shaped such that they are tapered with a slightly smaller circumference past the taper. This allows the pins to enter the cartridge 300, past the taper, and then rest on the smaller circumference, resulting in a permanent connection.

Where springs are described, it will be understood that this may be any type of spring now known or developed in the future. Any other resistance mechanism may be used as well, including various types of shock absorbers, gas springs, and compression surfaces.

Many parts described may be made of a variety of materials, including injection molded plastics or different types of rubber. This can be, for example, thermoplastic rubber, so that it may be permanently injectable into the plastic. Accordingly, many parts that are shown in the figures as single parts may comprise additional smaller parts that may be assembled, or various parts shown may be combined into single parts to ease manufacturing and assembly. Other materials or combinations of materials are contemplated.

In one embodiment, the razor 50 may be provided in a kit 800 (FIGS. 43A-43D), including, for example, a razor handle 100 with a cartridge 300 attached (optional) situated on a holder 810 with, in one embodiment, a cartridge holder 820 positioned anywhere in the kit but preferably attached to the underside of the holder 810 for retaining a plurality of cartridges. The holder 810 be capable of standing upright (FIGS. 43A-43B) or laying on a support surface such as a table or the like such as the holder 810*a* of FIGS. 43C-43D. Other combinations and kit configurations are possible.

While the cartridge 300 has typically been described as symmetric, with identical blades on both sides, it will be understood that different blades or different numbers of blades may be provided on each side. For example, one embodiment of a cartridge 300 may have three blades on one side and five blades on the other side, and one side may be provided with different moisturizing strips or pads or gel reservoir configurations. Similarly, one embodiment of a cartridge may be shaped different on each side, such as by providing a first rounded side and a second rectangular side. This may be, for example, to provide a first side of the cartridge 300 configured for men and a second side configured for women, along with appropriate lotions. Such a configuration allows for a convenient travel pack for couples, allowing them to take a single his and hers razor. Various embodiments including differently-shaped heads on each side of the cartridge 300 may allow each side to be easily identified in the event it is desired or necessary to readily distinguish between cartridge sides. For example, one side might have a different color or shape to identify even-numbered days, while the other side might have a different color or shape to identify odd-numbered days, or the appearance might be different to distinguish between different users as mentioned previously. Other variations and combinations are possible.

Further, one side may be for a pre-shave, or a first pass, while the second side may be for a final shave use. The two sides may incorporate different lotions and may have different blades, or differently angled blades, or different blade numbers, different blade configurations, and so on. For example, the blades on a first side may be configured to remove a thicker beard and remove more hair, such as by having wider spaces between blades, while the second side may be configured for a closer shave. The cartridge may be marked to identify each side and the different uses for each side. Thus, the spacing, number and/or configurations of any of the blades mentioned herein may be different between sides. Other variations and combinations are possible.

In one embodiment, the cartridge 300 may be provided with a cap for covering one shaving surface of the cartridge not in use, while the user shaves with the second shaving surface of the cartridge 300, or for covering both sides when not in use. Such a cap may be configured to leave functional portions of the cartridge 300 exposed. Such a cap may also be configured to leave clearance space between the blades and the cover such that, for example, water and hairs may rinse through the blades during use.

Caps may be provided for covering an entire cartridge 300 for traveling with multiple cartridges, such as separate cartridges for, for example, men and women. Further, trays may be provided for storing different types of razor cartridges, or cartridges may be configured to be stored in universal trays.

Various embodiments of a cartridge may be designed to provide any number of different aesthetic or functional designs. This may include a rounded head in the shape of an oval, for example, and the perimeter area may be provided with a combination of moisturizing strips, hydrating gels, pads, lubricants, water activated gels, creams, or hydrating gel reservoirs. They can be made of any material, and may provide close shave moisturizers, vitamins, or any ingredient, or any other material that would help a consumer with shaving by, for example, allowing for a closer shave or reducing irritation while shaving. The perimeter area may be removable, and may be replaced with a different perimeter area, such as, for example, by a snap on perimeter area. The entire perimeter surrounding the blades can be a pad area or any portion of it. Accordingly, a user may mix and match the cartridge required with a corresponding preferred moisturizer or shaving cream.

In certain embodiments, a portion of the perimeter area may flex out of the way like a wing, such that it may adapt to the contours of the users face. Accordingly, any product, such as moisturizer, applied by the perimeter area, may be more evenly applied during use, allowing for a smoother, closer shave.

In certain embodiments, the razor may be provided with indicators on each side that indicate which side of the razor a consumer is using, so the consumer knows what side they used first and which side has not yet been used. There can be a part or button that moves and which can show a color or any type of indicator that displays to the consumer what side is or has been used. A indicator can be as simple as using a different color rubber pad, moisturizing strip, plastic color, plastic mark, number or indent in any of the parts. It can be any kind of mark or indicator that is different from one side to the other, so the consumer can identify. In some embodiments, the indicator may be sensitive to wear, and may, for example, change color to indicate wear and indicate to a user that they should switch to the second side of the razor.

Although one particular connector structure 200 has been described in detail, it will be understood that a wide variety of such structures are possible. For example, in some embodiments, pushing the button 210 upwards on the handle 100 may generate motion in multiple parts. For example, the connector structure 200 may include two pincers for grabbing a portion of a cartridge and swivel arm connection assembly 600 along with a central pin for applying upward pressure to the assembly. In such an embodiment, pushing the button 210 upwards may apply pressure via the central pin while simultaneously releasing the pincers. As such, the force retaining the assembly 600 to the connector structure 200 is released, while simultaneously applying force to eject the assembly 600.

In some embodiments, a pair of pincers may be provided in the handle structure, and such pincers may not move relative to each other. Such pincers may be fixed into corresponding slots in the cartridge head, wherein a tab may extend from the cartridge head between the pincers in order to secure them in place. In such an embodiment, pushing the button 210 may extend a tab from the handle body in order to depress the tab in the cartridge head, thereby releasing the pincers and separating the cartridge from the handle. A wide variety of additional connection types is possible as well that are known now or developed in the future.

In one embodiment, there can be a dual sided razor stand to hold the dual sided razor cartridge on the bathroom counter, shower, drawer, or any location, for example. It can be designed to hold the dual sided razor cartridge and handle vertically (see, for example, FIGS. 43A-43B) or horizontally (see, for example, FIGS. 43C-43D). The stand can have drying pads that go in between each blade to keep them dry while not in use. Or a battery operated dryer that will turn on when the user places the razor back on the stand or holder. In one embodiment, when the user removes the razor from the stand, nothing happens, but when the user puts it back on the stand or holder, the fan turns on for an adjustable time, for example 20 seconds then it automatically shuts off. The dryer can consist of fan, motor, battery source etc. In one embodiment, there would be air ducts and outlets that point at the perfect angle into the blades and into the cartridge to help dry the cartridge after each use.

In one embodiment, there can be a dual sided razor cartridge replacement pack or compartment where any number of dual sided razor cartridges can be placed. In one embodiment, there can be a plastic tray (820 in FIG. 43A, for example) that can fit any number of cartridges. It can have guides inside to guide the dual sided razor cartridges into the exact location, so the cartridges snap in easily. The dual sided razor cartridge trays can be specially designed to fit the features of the cartridge assemblies described herein. In one embodiment, the replacement pack can be sold alone or as part of an introductory kit including a handle and a pack or a plurality of razor cartridges (FIGS. 43A-43D, for example). These replacement packs can have the dual sided replacement cartridges inside and sold to the consumer. These dual sided replacement cartridges can be used to replace the dual sided cartridge razor when they are dull on both sides. This way, the consumer does not have to keep buying new razor handles and only needs to buy the replacement packs of the dual sided razors cartridges. The dual sided razor cartridges can have a snap fit or be attached snuggly inside the replacement pack or compartments. It can be designed so the user can use the handle engagement connection area, insert it into the cartridge attachment compartment area on the cartridge face, pull out the dual sided cartridge, and begin shaving. The cartridge attachment compartment connection can be facing upward from the base of the replacement pack base, thereby being in the perfect position to be inserted by the handle engagement connection.

With a traditional disposable razor, if a consumer bought an eight piece value pack of disposable razors, it might come with eight disposable razors that include eight handles permanently attached to eight single sided shaving cartridges, for example. However, with a disposable dual sided razor kit in accordance with one embodiment of the present disclosure, a consumer might get one disposable razor handle and four disposable dual sided razor cartridges. This means that four disposable dual sided razor cartridges would give the consumers eight shaving sides of cartridges and one handle. By using this disposable dual sided razor system, the consumer would save throwing away four extra cartridges and seven other handles typically given in an eight pack of disposable razors, with a huge benefit and savings to the environment and consumer's pocket. Instead of having bags or packs of multiple single-sided disposable razors taking huge amounts of shelf space on store shelves and in consumer's homes, with the dual sided razor of the present disclosure, a consumer only needs one handle and extra dual sided razor cartridges that would take far less shelf space, which is great for retailers and the consumer.

Figure 49:
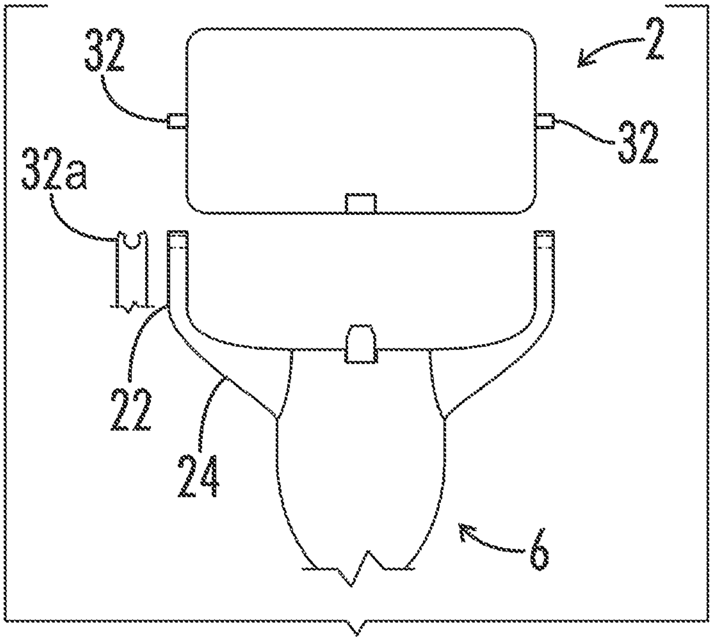
FIG. 49 is a diagrammatic view of an alternate embodiment of a swivel connection.

As seen in the embodiment of FIG. 49, a handle engagement connection 22 area extending from an arm 24 mounted on a handle 6 or handle engagement support can also be designed to attach to swivel connections that are already attached to a dual sided cartridge 2. The handle engagement connection 22 can also attach inside a swivel compartment area 32*a* of the dual sided cartridge 2. There would be and swivel compartment areas 32 on both sides of the cartridge 2. There would be a swivel bar piece 32 that goes inside each swivel compartment area 32*a* of the dual sided cartridge 2 faces and attaches (connects together) separately or as one piece. This dual sided cartridge 2 would swivel within the cartridge area such that a second side of the dual sided cartridge 2 would take the place of a first side of the dual sided cartridge 2 when swiveled about a horizontal axis at the swivel bar pieces 32. Then, the handle engagement connection 22 would attach to the swivel bar piece 32. FIG. 49 illustrates one embodiment of attaching the handle to the dual sided razor cartridge. All other specifications described can be used enclosed in this type of attachment.

The dual sided razor cartridge head can have any type of design or specifications mentioned herein or otherwise known or developed. Embodiments of the disposable dual sided razor cartridge head can have moisturizing strips or pads or any type of pad or moisturizing strip, or any type of shaving surface design or material known now or developed in the future. Embodiments of the disposable dual sided razor can have push pins, cartridge head supports, cartridge pushpin engagement areas, cartridge stops or any specifications mentioned herein. Embodiments of the dual sided razor and the disposable dual sided razor pads or shaving surfaces can have hydrating gel reservoirs or pores where moisturizing serum can come out to hydrate the skin while shaving. Embodiments of the dual sided cartridge head can flex or bend back and forth or any part surrounding the blade surface area. Embodiments of the disposable dual sided razor can be designed where the push pin is made of rubber or other flexible material and it can be shaped and designed to be used on both sides of the dual sided razor cartridge. The rubber would be flexible and can be stiff and be made of rubber or any material and can be sized and can be shaped or designed any way known now or developed in the future. Embodiments of the rubber flexible pushpin can be molded into the razor handle top area or be a separate piece or pieces that is permanent or removable. Embodiments of the connection arms can be molded into the top part of the handle and be part of the razor handle. Embodiments of the connection arms can be flexible to move inward and outward to connect with the dual sided razor cartridge, wherein the user can push the handle and the connections arms toward the razor cartridge head and the arm connectors can have prongs and the arms can flex open as the arms get in contact with cartridge head and when the prong connections of the arms reach the other female compartment area, then the cartridge head female compartment connection area the arms flex back to their normal position. This can be done by one of the arm connection put into one of the female connection area of the cartridge head first, then the other arm connection area and prongs be pushed on the other side and the arms on the one side flex outward until the prongs reach the other side cartridge head female compartment connection area, then the arms flex back to their normal position and the arms and handle is now connected to the razor cartridge.

In one embodiment, when a user is done using the first shaving side, then the user can pull one of the arms outward and the arms and handle will disconnect from the cartridge. This design with the rubber pushpin is not just for disposable razors as it could be used with any type of razor. Embodiments of the present disclosure describe cartridge arms that have flexible arms, however the arm and connection of the handle and the dual sided razor cartridge can be any type mentioned herein or developed in the future. Embodiments of the arms and connection can be button activated where the arms move inward or outward to connect to the cartridge head and can have any type of push pin, rubber or like, described herein or developed in the future.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A dual sided razor cartridge assembly comprising:

a) a cartridge having a first shaving face and a second shaving face opposite and parallel the first shaving face;

b) a plurality of razor blade edges at each of the first and second shaving faces, the razor blade edges angled relative to a blade central axis; and c) at least one handle engagement connection for movable engagement of the cartridge with a handle, such that the handle engagement connection is fixed to the handle and the cartridge has a range of motion relative to the handle during shaving use of the cartridge, d) wherein movement within the range of motion is resisted during the shaving use by an interaction between a movement limiter on or at an external surface of the cartridge and a cooperating movement limiter on the handle engagement connection or the handle.

2. The dual sided razor cartridge assembly of claim 1, wherein each of a plurality of razor blades is integrally formed with two blade edges of the plurality of razor blade edges, and with a first blade edge of the two blade edges at the first shaving face and a second blade edge of the two blade edges at the second shaving face.

3. The dual sided razor cartridge assembly of claim 2, wherein each of the two blade edges of each of the plurality of razor blades is angled relative to a support segment of the corresponding razor blade.

4. The dual sided razor cartridge assembly of claim 1, wherein the handle engagement connection includes extensions on opposite sides of the cartridge for supporting the cartridge at a horizontal axis of the cartridge, the horizontal axis being perpendicular to the handle, and wherein the first shaving face and the second shaving face have 180 degree rotational symmetry about the horizontal axis of the cartridge, such that the first shaving face and the second shaving face switch places when the cartridge is rotated 180 degrees about the horizontal axis, and wherein the cartridge is rotatable 180 degrees without removing the cartridge from the handle engagement connection.

5. The dual sized razor cartridge assembly of claim 4, wherein the movement limiter on or at the external surface of the cartridge is a first movement limiter provided at a first end of the cartridge, and wherein a second movement limiter is provided at a second end of the cartridge opposite the first end, and wherein when the cartridge is rotated 180 degrees about the horizontal axis, the second movement limiter interacts with the cooperating movement limiter on the handle in place of the first movement limiter.

6. The dual sided razor cartridge assembly of claim 1, further comprising at least one of a moisturizing strip and a gripping pad on each of the first and second shaving faces.

7. The dual sided razor cartridge assembly of claim 1, wherein the cartridge is attached to the handle by the handle engagement connection, and wherein the handle engagement connection has a swivel arm connection on which the cartridge pivots relative to the handle during the shaving use of the cartridge.

8. The dual sided razor cartridge assembly of claim 7, wherein the cooperating movement control limiter is on the swivel arm connection.

9. The dual sided razor cartridge assembly of claim 1, wherein a first shaving region of the first shaving face and a second shaving region of the second shaving face are each substantially planar.

10. A dual sided razor cartridge assembly comprising:

a) a cartridge having a first shaving face and a second shaving face opposite and parallel the first shaving face;

b) a plurality of razor blade edges at each of the first and second shaving faces, the razor blade edges angled relative to a blade central axis;

c) at least one handle engagement connection for movable engagement of the cartridge with a handle, such that the cartridge has a range of motion relative to the handle during shaving use of the razor cartridge; and d) at least one of a moisturizing strip and a gripping pad on each of the first and second shaving faces.

11. The dual sided razor cartridge assembly of claim 10, wherein movement within the range of motion is resisted during shaving use by an interaction between a movement limiter on or at an external surface of the cartridge and a cooperating movement limiter on the handle engagement connection or the razor handle.

12. A dual sided razor comprising:

a) a handle and a cartridge attached to the handle;

b) a first shaving face and a second shaving face opposite and parallel the first shaving face;

c) a plurality of razor blade edges at each of the first and second shaving faces, the razor blade edges angled relative to a blade central axis; and d) the handle comprising at least one handle engagement connection for movable engagement of the cartridge with the handle such that the cartridge has a limited range of motion relative to the handle during shaving use of the razor, e) wherein movement within the range of motion is resisted during the shaving use by an interaction between a movement limiter on or at an external surface of the cartridge and a cooperating movement limiter on the handle.

13. The dual sided razor of claim 12, wherein each of a plurality of razor blades is integrally formed with two razor blade edges of the plurality of razor blade edges, and with a first razor blade edge of the two razor blade edges at the first shaving face and a second razor blade edge of the two razor blade edges at the second shaving face.

14. The dual sided razor of claim 13, wherein each of the two blade edges of each of the plurality of razor blades is angled relative to a support segment of the corresponding razor blade.

15. The dual sided razor of claim 12, wherein the handle engagement connection includes extensions on opposite sides of the cartridge for supporting the cartridge at a horizontal axis of the cartridge, the horizontal axis of the cartridge being perpendicular to the a longitudinal axis of the handle, and wherein the first shaving face and the second shaving face have 180 degree rotational symmetry about the horizontal axis of the cartridge, such that the first shaving face and the second shaving face switch places when the cartridge is rotated 180 degrees about the horizontal axis relative to the handle, and wherein the cartridge is rotatable 180 degrees without removing the cartridge from the handle.

16. The dual sized razor of claim 15, wherein the movement limiter on or at the external surface of the cartridge is a first movement limiter provided at a first end of the cartridge, and wherein a second movement limiter is provided at a second end of the cartridge opposite the first end, and wherein when the cartridge is rotated 180 degrees about the horizontal axis, the second movement limiter interacts with the cooperating movement limiter on the handle in place of the first movement limiter.

17. The dual sided razor of claim 12, further comprising at least one of a moisturizing strip and a gripping pad on each of the first and second shaving faces.

18. The dual sided razor of claim 12, wherein the cartridge is attached to the handle by a swivel arm connection on which the cartridge pivots relative to the handle, the swivel arm connection containing the handle engagement connection.

19. The dual sided razor of claim 18, wherein the cooperating movement limiter is on the swivel arm connection.

20. The dual sided razor of claim 12, wherein a first shaving region of the first shaving face and a second shaving region of the second shaving face are each substantially planar.

21. The dual sided razor cartridge assembly of claim 1, wherein the movement limiter is a discontinuity in an otherwise linear edge of the cartridge, and wherein the cooperating movement limiter is a discontinuity in an otherwise continuous edge of the handle engagement support or the handle.

22. The dual sided razor cartridge assembly of claim 1, wherein the movement limiter is a protrusion extending from the cartridge in the direction of the blade central axis, and wherein the cooperating movement limiter is a protrusion extending from the handle engagement support or the handle.

23. The dual sided razor of claim 12, wherein the movement limiter is a discontinuity in an otherwise linear edge of the cartridge, and wherein the cooperating movement limiter is a discontinuity in an otherwise continuous edge of the handle.

24. The dual sided razor of claim 12, wherein the movement limiter is a protrusion extending from the cartridge in the direction of the blade central axis, and wherein the cooperating movement limiter is a protrusion extending from the handle.

* * * * *